(12) United States Patent
He

(10) Patent No.: US 12,137,843 B2
(45) Date of Patent: Nov. 12, 2024

(54) MULTI-STAGE COOKING SYSTEMS

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 489 days.

(21) Appl. No.: 17/233,508

(22) Filed: Apr. 18, 2021

(65) Prior Publication Data

US 2021/0321825 A1 Oct. 21, 2021

Related U.S. Application Data

(60) Provisional application No. 63/012,209, filed on Apr. 19, 2020.

(51) Int. Cl.
| | | |
|---|---|---|
| *A47J 44/00* | (2006.01) | |
| *A47J 27/04* | (2006.01) | |
| *A47J 36/32* | (2006.01) | |
| *A47J 47/01* | (2006.01) | |
| *A47J 47/02* | (2006.01) | |
| *B25J 17/02* | (2006.01) | |

(52) U.S. Cl.
CPC .............. *A47J 44/00* (2013.01); *A47J 27/04* (2013.01); *A47J 36/32* (2013.01); *A47J 47/01* (2013.01); *A47J 47/02* (2013.01); *B25J 17/02* (2013.01); *A47J 2027/043* (2013.01)

(58) Field of Classification Search
CPC ....... G05B 2219/45111; A47J 2027/043; A47J 27/04; A47J 36/321; A47J 44/00; A47J 47/01; A47J 47/02; A47J 27/14–16; A47J 36/00; A47J 44/02; B25J 11/00; B25J 11/0045; B25J 15/0206; B25J 15/02; B25J 15/10; B25J 17/02; B25J 15/08
USPC .......................... 99/325, 339, 348, 477–479
See application file for complete search history.

(56) References Cited

U.S. PATENT DOCUMENTS

| | | | | |
|---|---|---|---|---|
| 2018/0249861 | A1* | 9/2018 | Hiatt ....................... | A47J 36/00 |
| 2018/0310773 | A1* | 11/2018 | Sekar ...................... | A47J 44/00 |
| 2019/0069722 | A1* | 3/2019 | He .......................... | G07F 13/06 |
| 2021/0015290 | A1* | 1/2021 | Aboujassoum .......... | A47J 27/08 |
| 2022/0160178 | A1* | 5/2022 | Cheung ............... | A47L 15/0092 |
| 2023/0148790 | A1* | 5/2023 | Alexander .............. | A47J 36/32 |
| | | | | 99/483 |

* cited by examiner

*Primary Examiner* — Sang Y Paik
*Assistant Examiner* — Bonita Khlok

(57) ABSTRACT

A cooking system comprising two or more cooking apparatuses, each capable of cooking a food from one or more foods and/or one or more food ingredients. A semi-cooked food is produced in a first cooking apparatus and is used as an ingredient in a second cooking apparatus. The cooking apparatuses work together to produce cooked food from food or food ingredients. A computer system is used to control the cooking system.

20 Claims, 47 Drawing Sheets

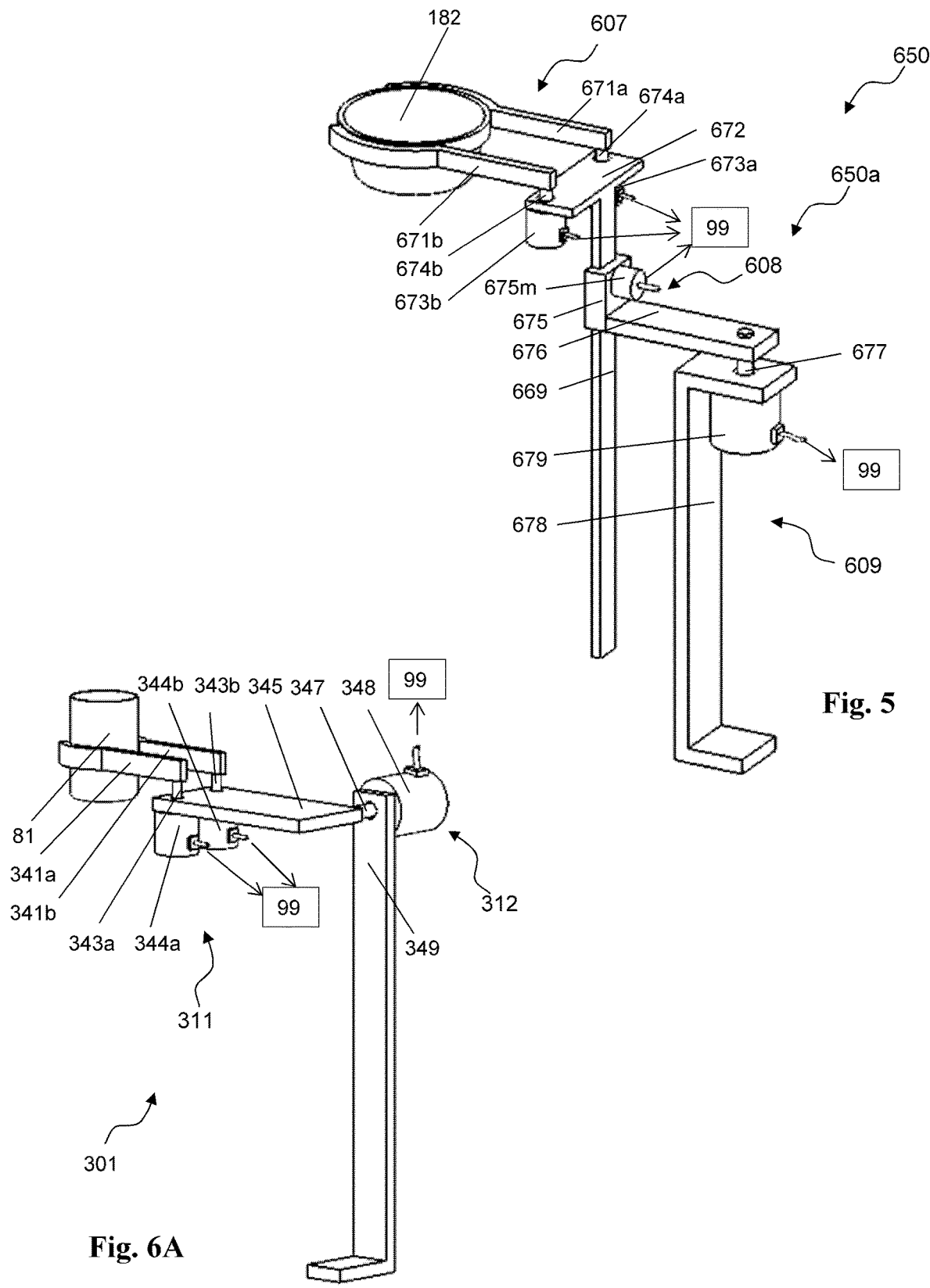

The computer system 99 is configured to store a program configured to send or receive signals to and from the motorized mechanisms, inductive stoves, motors, temperature sensors, and pumps of the cooking system 906. 921

↓

The computer system 99 comprises a database. 922

↓

The computer system 99 stores the IDs of the cooking apparatuses, receiving apparatus, cookware cleaning mechanism, liquid dispensing mechanism, ingredient dispensing mechanism, transfer mechanisms, transport system. 923

↓

The computer system 99 stores the information of the structure of each mini-vehicle of the transfer system 302 and each mini-vehicle of the transfer system 303, including the ingredient container types that can be placed on the holders of the vehicle 790. 924

↓

The computer system 99 stores a program for controlling the transport systems 302 and 303, said program configured to control a mini-vehicle 790 of the transport system 302 to move to a position near a cooking station of the cooking system 906, so that an ingredient container on a given holder of the mini-vehicle 790 is at a dispensing position relative to the cooking apparatus at a pre-scheduled time. Said program configured to control a mini-vehicle 640 the transport system 303 to move to a position near a receiving apparatus, so that the mini-vehicle 640 is at a food container transferring position relative to the support component of the receiving apparatus. 925

↓

The computer system 99 stores a list of food items which can be cooked by the cooking system 906. 926

↓

For each food item of the list of Step 926, the computer system 99 stores a cooking program configured to control the motorized mechanisms, inductive stoves, pumps and devices in the cooking system 906. 927

↓

For each food item of the list of Step 926, the computer system 99 stores types and quantities of food ingredients, relative timing of their dispensing and the respective ID of the destination cooking apparatus for each ingredient. 928

Fig. 24A

The computer system 99 takes an order of a food item. 931

The computer system 99 finds the information on the types and quantities of the ingredients needed for cooking the ordered food item, in accordance with the information stored by the computer system in Step 928. 932

The computer system 99 locates the ingredient containers that contain the ingredients. 933

The computer system 99 schedules cooking of the ordered food item at the cooking system 906, including the timing for running the program of Step 927 corresponding to the ordered food item, timing of dispensing of the food ingredients from each ingredient container into a respective cooking container or cookware of the cooking system 906. 934

The computer system 99 controls the transport system 302 so that each ingredient container of Step 932 may be moved and stopped per the schedule of Step 934. 935

The computer system 99 runs the program of Step 927 corresponding to the ordered food item, according to the schedule of Step 934, as to send or receive signals to or from the motorized mechanisms, inductive stoves, temperature sensors and pumps of the cooking system 906. The cooking of the food item is complete after all these steps. 936

Fig. 24B

MULTI-STAGE COOKING SYSTEMS

This application claims the benefit of U.S. Provisional Application Ser. No. 63/012,209 filed Apr. 19, 2020, the disclosures of which are hereby incorporated herein by reference in their entireties.

CROSS-REFERENCE TO RELATED APPLICATIONS

US Provisional Patent Application

Ser. No. 63/012,209; Filed Apr. 19, 2020, Inventor: Zhengxu He

US Patent Application

Ser. No. 15/706,136, filed Sep. 15, 2017, Inventor: Zhengxu He
Ser. No. 15/801,923, filed Nov. 2, 2017, Inventor: Zhengxu He
Ser. No. 15/798,357, filed Oct. 30, 2017, Inventor: Zhengxu He
Ser. No. 16/155,895, filed Oct. 10, 2018, Inventor: Zhengxu He
Ser. No. 16/510,982, filed Jul. 15, 2019, Inventor: Zhengxu He
Ser. No. 16/517,705, filed Jul. 22, 2019, Inventor: Zhengxu He
Ser. No. 16/997,196, filed Aug. 19, 2020, Inventor: Zhengxu He He003C
Ser. No. 16/997,933, filed Aug. 20, 2020, Inventor: Zhengxu He He011B
Ser. No. 17/069,707, filed Oct. 13, 2020, Inventor: Zhengxu He He008D
Ser. No. 17/070,059, filed Oct. 14, 2020, Inventor: Zhengxu He He013A
Ser. No. 17/072,011, filed Oct. 15, 2020, Inventor: Zhengxu He He015A US Patent U.S. Pat. No. 10,455,987, issued Oct. 29, 2019, Inventor: Zhengxu He.

BACKGROUND OF THE INVENTION

The present application relates to a cooking system for producing a cooked food from food or food ingredients. In cooking of a food item, one or more of the following steps are required: (1) a first food or food ingredient is heated in a cooking container (e.g., a bowl or cup) and then dispensed in a cookware such as a wok; (2) a second food or food ingredient is dispensed in the cookware; (3) all foods or food ingredients are then stirred and/or mixed and/or heated in the cookware, to produce a cooked food; (4) the cooked food is then dispensed into a food container, such as a dish or a bowl.

A cost-effective cooking apparatus or cooking system that does some or all of the above is very important, as it can save labor and cost.

Furthermore, cost-effective transportation of the first and second food or food ingredients to the cookware or cooking containers, respectively, is also very important for the same reason.

The automation of such a cooking system depends on new computer algorithms.

BRIEF SUMMARY OF THE INVENTION

The present patent application discloses a cooking system comprising a first cooking apparatus, a second cooking apparatus, and other apparatuses or mechanisms. The first cooking apparatus comprises one or more of the following parts: a plurality of cooking containers each configured to contain or otherwise hold food or food ingredients for the purpose of heating the latter; a connected group of container holders each configured to position or hold a said cooking container; a motion mechanism configured to produce a cyclic motion in the group of container holders; above and corresponding to each of said container holders, an enclosure mechanism comprising a lid or other enclosure member configured to help enclose a cooking chamber; heaters; a dispensing apparatus configured to grip and hold a said cooking container and to move the latter to dispense the food or food ingredients from the cooking container to said cookware of the second cooking apparatus; etc.

The second cooking apparatus comprises one or more of the following parts: a cookware configured to contain or otherwise hold food or food ingredients for the purpose of cooking a food; a motion apparatus comprising a stirring motion mechanism configured to move the cookware to stir or mix the food or food ingredients contained in the cookware and a motion mechanism configured to directly or indirectly move the cookware, to dispense a cooked food into a food container; a transfer apparatus configured to grip and hold a food container to allow said motion apparatus to dispense a cooked food from the cookware into a food container; a plurality of cooking containers configured to contain or otherwise hold food or food ingredients; and a dispensing apparatus configured to move a cooking container, said dispensing apparatus configured to dispense a semi-cooked food held in the cooking container to the cookware.

The cookware may be a wok, a pan, or any container configured to contain or otherwise hold food or food ingredients during cooking. A cooking container may be a wok, a pan, a bowl, a basket, etc.

Implementations of our cooking system may include one or more of the following. The stirring motion mechanism may comprise a support component and a mechanism configured to produce a motion of the cookware relative to the support component, to stir or mix the food or food ingredients in the cookware. The stirring motion mechanism may comprise: a first shaft; a second shaft; a third shaft; a fourth shaft; and a fifth shaft; wherein the axes of the shafts may be configured to be parallel to each other.

Implementations of our cooking system may include one or more of the following. A motion mechanism is configured to produce an axial rotation of the support component of said stirring motion mechanism to dispense a cooked food from the cookware, wherein the axis of the axial rotation is configured to be horizontal.

Our cooking system may further comprise a dispensing apparatus which dispenses food or food ingredients into the cookware and/or a cooking container. The cooking system may also comprise a transfer apparatus which may move a food container containing a cooked food to an area accessible by a person or a robot.

Implementations of our cooking system may include one or more of the following. A dispensing apparatus may comprise: (1) a gripping mechanism comprising a first support component, grippers, and a motion mechanism configured to produce a controlled rotation of said gripper relative to the first support component to grab or release a container; (2) a second support component; (3) a motion mechanism configured to produce a rotation of the first support component relative to the second support component.

A computer is used to control the above-described mechanisms and apparatus.

BRIEF DESCRIPTION OF THE SEVERAL VIEWS OF THE DRAWINGS

FIG. 5 shows an aerial view of a transfer apparatus.

FIG. 6A shows an aerial view of an ingredient dispensing apparatus.

FIG. 24A is a flow chart showing the procedures performed by the computer system of the cooking system of FIG. 20A prior to cooking of a food. FIG. 24B is a flow chart showing the procedures performed by the computer system of the cooking system of FIG. 20A during the cooking of a food.

DETAILED DESCRIPTION OF THE INVENTION

For the present patent application, a food ingredient refers to any of the foods or substances that are combined to make a particular cooked food. A food ingredient can be raw or pre-cooked. A food ingredient can be solid, powder, liquid, or a mixture, etc. A food ingredient can be raw meat, sausage, fresh vegetable, dry vegetable, cooking oil, vinegar, soy sauce, water, salt, etc.

For the present patent application, a computer system means a system that includes one or more computers. A computer system may or may not include a database. A computer system may or may not include a network. A computer system may or may not include a memory shared by several computers. A computer system may include software. A single computer with software can be considered to be a computer system.

For the present patent application, a shaft always comprises an axis. A shaft can have different shapes at different sections. A sectional shape of a shaft can be round or rectangular, or another shape. For the present patent application, a rotational movement refers to a rotational movement around an axis. A rotational mechanism refers to any mechanism comprising two mating parts which are constrained to rotate relative to each other. An example of a rotational mechanism comprises a shaft and a bearing housing as mating parts, wherein the shaft and bearing housing are connected by bearings and accessories.

In some applications or embodiments, a motor comprises a base component (e.g., a frame) which is a stationary member of the motor, and a shaft which is a moving member of the motor, wherein a (usually rotational) motion of the shaft relative to the base component can be produced. A motor may be connected to a computer via wires, and/or through a driver, and/or a controller and/or a relay and/or a wireless communication device. The base component of a motor may be referred to as the support component of the motor.

Similarly, an encoder may comprise a base component, and a shaft which is rotatable relative to the base component, where the encoder can detect the degree of rotation of the shaft relative to the base component, and then inform a computer of the degree of rotation by sending signals to the computer.

Various parts of our cooking apparatuses and cooking systems are described below.

Figure 1:
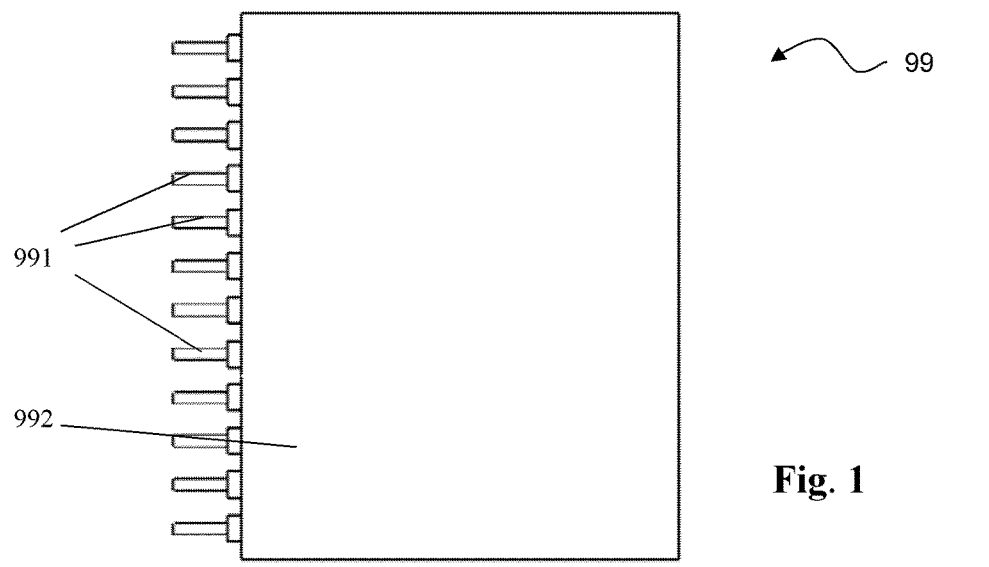
FIG. 1 shows an aerial view of a computer system.

Referring to FIG. 1, a computer system 99 comprises a computer 992 with I/O ports 991. Via said I/O ports 991, said computer 992 may be connected to other electric or electronic devices including but not limited to: motors (including motors with controllers); actuators; inductive stoves; sensors; etc., so that the computer may communicate with said devices by known techniques. The communications can optionally be one way or two ways (to and from). For example, the signals of the electrical or electronic devices may be sent to the computer 992; the computer 992 may control the operations of the electrical or electronic devices by sending signals to those devices. The connection of the computer 992 to said electric or electronic devices may comprise wires, wireless communication devices, controllers, drivers, and/or circuit boards. The computer system 99 comprises a memory. The computer system 99 may store data in the computer system's memory. The computer system 99 may control motors, actuators, stoves or heaters, and other devices by known techniques.

It should be noted that the computer system 99 may further comprise additional computers, a computer network, a database, computer programs, wireless communication ports, and/or other electric and electronic components.

A connection of said computer system 99 to an electric or electronic device may comprise a (wired or wireless) connection of a computer of said computer system to said device. Thus, a device is connected to said computer system 99 if said device is connected to a computer of said computer system.

Figures 2A, 2B:
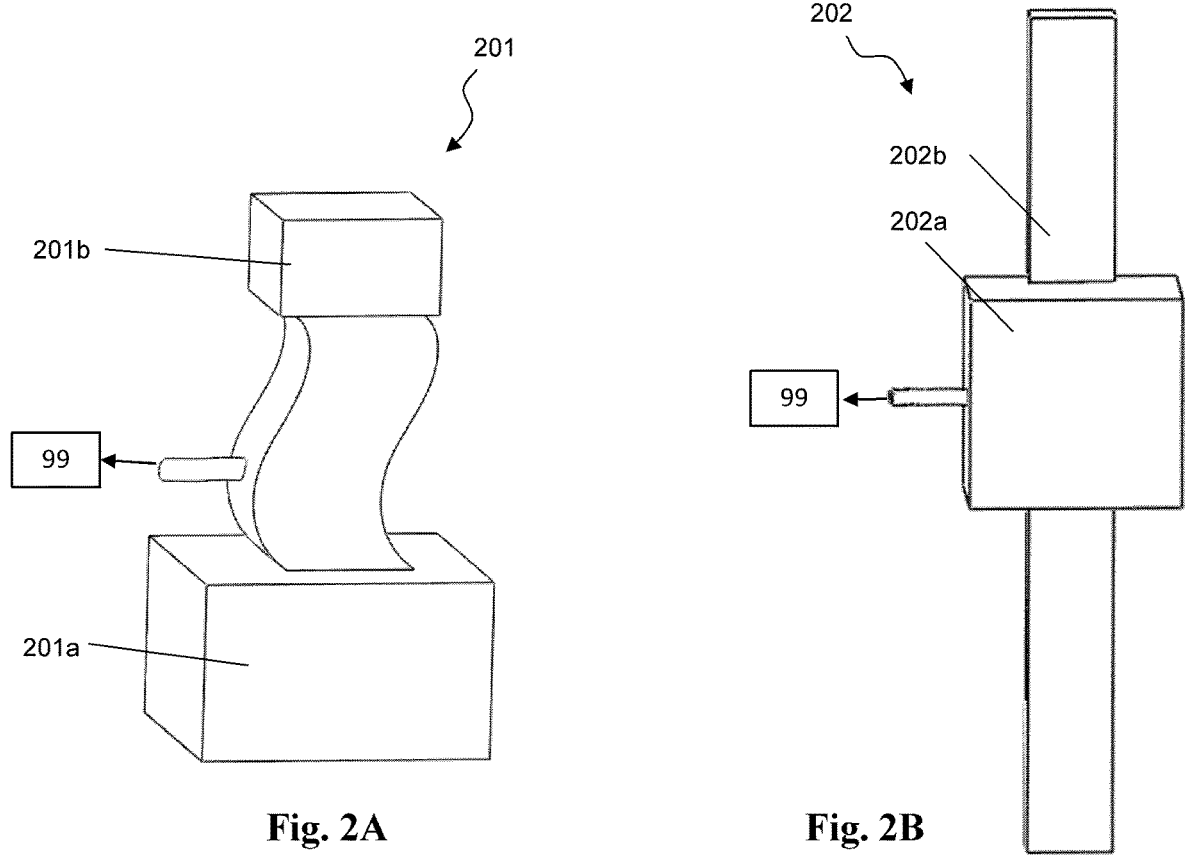
FIG. 2A shows an aerial view of a motion mechanism.
FIG. 2B shows an aerial view of a linear motion mechanism.

Referring to FIG. 2A, a motion mechanism 201 comprises a stationary member 201a and a moving member 201b, which is connected (but not rigidly connected) to the stationary member. In many applications the movement of the moving member 201b is constrained relative to the stationary member 201a. The motion mechanism 201 comprises a driving mechanism (not shown in figure) configured to produce a motion of the moving member 201b relative to the stationary member 201a. The motion mechanism 201 may be connected to the computer system 99 of FIG. 1 via wires or by wireless means and the computer system 99 may be configured to control the timing and speed of the motion mechanism 201.

The motion mechanism 201 is a generic motion mechanism. Implicitly, the motion mechanism 201 includes a connection configured to connect the moving member to the stationary member, wherein said connection may often comprise bearings, sliders, kinematic pairs, and/or transmission mechanisms. The driving mechanism may be connected to the computer system 99 (via wires or by wireless means). The driving mechanism may be powered by electricity or other energy sources. A typical example of a driving mechanism is a motor.

Referring to FIG. 2B, a linear motion mechanism 202 comprises a stationary member 202a and a moving member 202b, wherein the moving member 202b is constrained to move linearly relative to the stationary member 202a. The linear motion mechanism 202 comprises a driving mechanism (not shown in figure) configured to produce a linear motion of the moving member 202b relative to the stationary member 202a. The linear motion mechanism 202 may be connected to the computer system 99 of FIG. 1 via wires or by wireless means, and the computer system 99 may be configured to control the timing and speed of the linear motion mechanism 202.

The linear motion mechanism 202 is a generic one. Examples of linear motion mechanisms include but are not limited to: a linear actuator; a mechanism comprising linear rail, a slider configured to slide linearly on the linear rail, and a driving mechanism configured to drive the linear motion of the slider.

It should be noted that the linear motion mechanism 202 may comprise an electric (or pneumatic, hydraulic) putter, or other types of putter. The linear motion mechanism 202 may include a motor which produces a rotational motion and a transmission mechanism configured to convert a rotation into a linear motion; wherein the transmission mechanism may optionally comprise a gear and rack, a screw rod and nut, or a sprocket and chain, etc.

A linear motion mechanism (such as the mechanism 202) is called a vertical motion mechanism if the direction of the linear motion is vertical. A linear motion mechanism (such as the mechanism 202) is called a horizontal motion mechanism if the direction of the linear motion is horizontal.

It should be noted that the rotation produced by a rotational motion mechanism may be a continuous rotation, an intermittent motion, or a rotation between two end-positions.

Figure 2C:
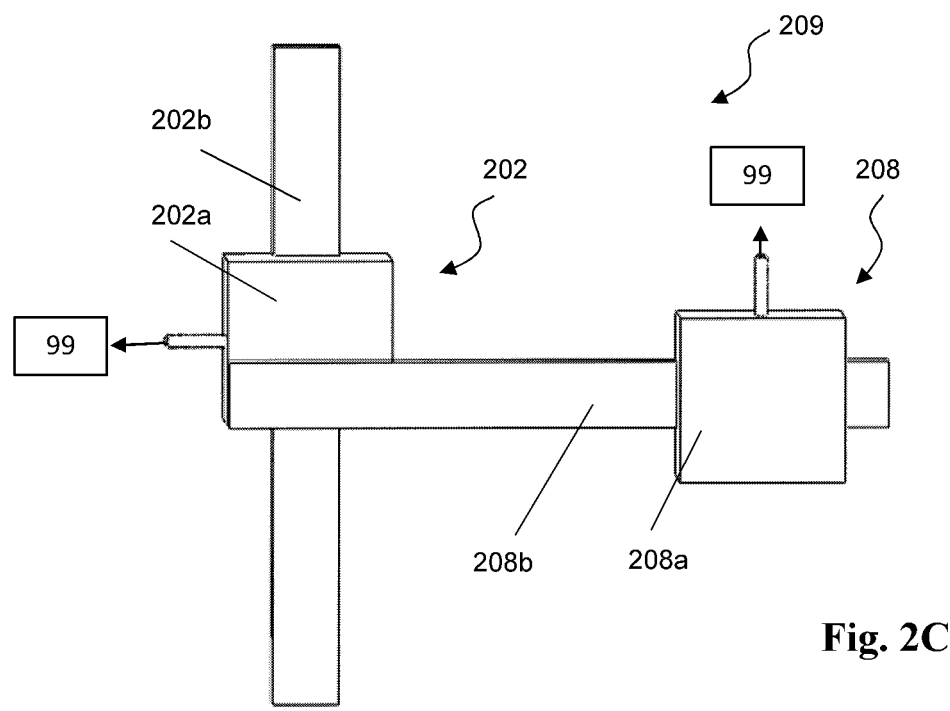
FIG. 2C shows an aerial view of a combination motion mechanism.

Referring to FIG. 2C, a combination motion mechanism 209 comprises two linear motion mechanisms 202 and 208, which may also be referred to as motion sub-mechanisms. The motion mechanism 202 is shown in FIG. 2B: the motion mechanism 208 is a linear motion mechanism comprising a stationary member 208a, a moving member 208b which is constrained to move linearly relative to the stationary member 208a, and a driving mechanism (not shown in figure) configured to produce a linear motion of the moving member 208b relative to the stationary member 208a. The moving member 208b of the linear motion mechanism 208 is rigidly or fixedly connected to the stationary member 202a of the linear motion mechanism 202, so the linear motion mechanism 208 can produce a linear motion of the stationary member 202a relative to the stationary member 208a. The combination motion mechanism 209 may be connected to the computer system 99 of FIG. 1 in the sense that the motion sub-mechanisms 202 and 208 are connected to the computer system 99 via wires or by wireless means, and the computer system 99 may be configured to control the motions produced by the motion sub-mechanisms of the combination motion mechanism 209.

Figure 2D:
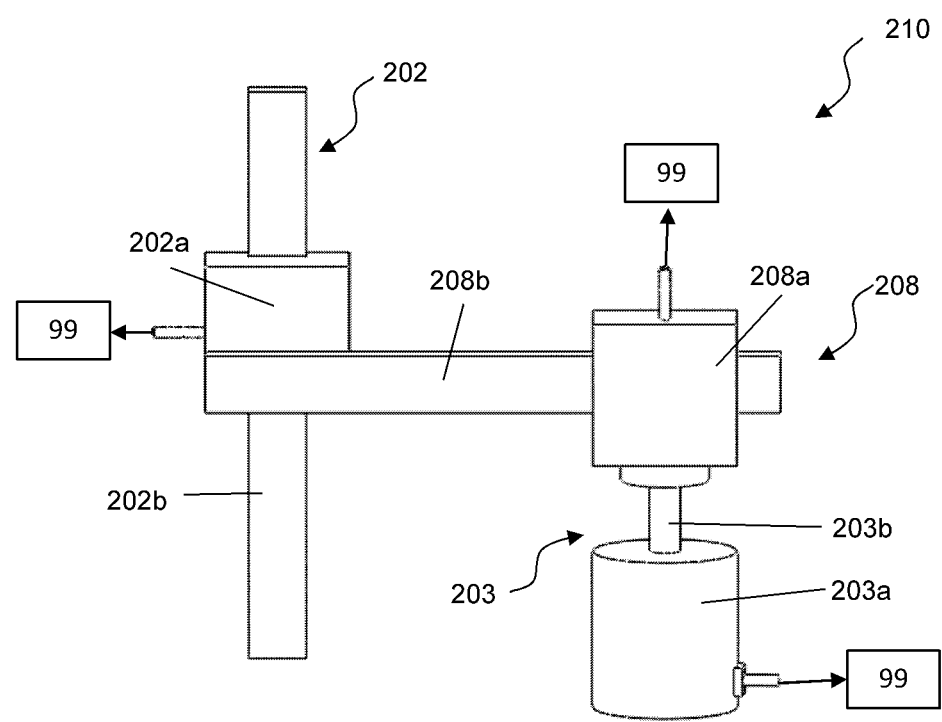
FIG. 2D shows an aerial view of a combination motion mechanism.

Referring to FIG. 2D, a combination motion mechanism 210 comprises a rotational motion mechanism 203 and two linear motion mechanisms 202 (as in FIG. 2B) and 208 (as described in the previous paragraph), wherein motion mechanisms 203, 202 and 208 are referred to as motion sub-mechanisms. The rotational motion mechanism 203 comprises a stationary member 203a and a moving member 203b which is constrained to rotate relative to the stationary member 203a. The rotational motion mechanism 203 comprises a driving mechanism (not shown in figure) configured to produce a rotation of the moving member 203b relative to the stationary member 203a around an axis, wherein the axis of the rotation is referred to as the axis of the rotational motion mechanism. The moving member 208b of the linear motion mechanism 208 is rigidly or fixedly connected to the stationary member 202a of the linear motion mechanism 202, so the linear motion mechanism 208 can produce a linear motion of the stationary member 202a relative to the stationary member 208a of the linear motion mechanism 208. The moving member 203b is rigidly connected to the stationary member 208a of the linear motion mechanism 208, so the rotational motion mechanism 203 can produce a rotation of the stationary member 208a relative to the stationary member 203a. The combination motion mechanisms 210 may be connected to the computer system 99 of FIG. 1 in the sense that the motion sub-mechanisms 202, 203 and 208 are connected to the computer system 99 via wires or by wireless means, and the computer system 99 may be configured to control the motions produced by the motion sub-mechanisms of the combination motion mechanism 210.

Figure 2E:
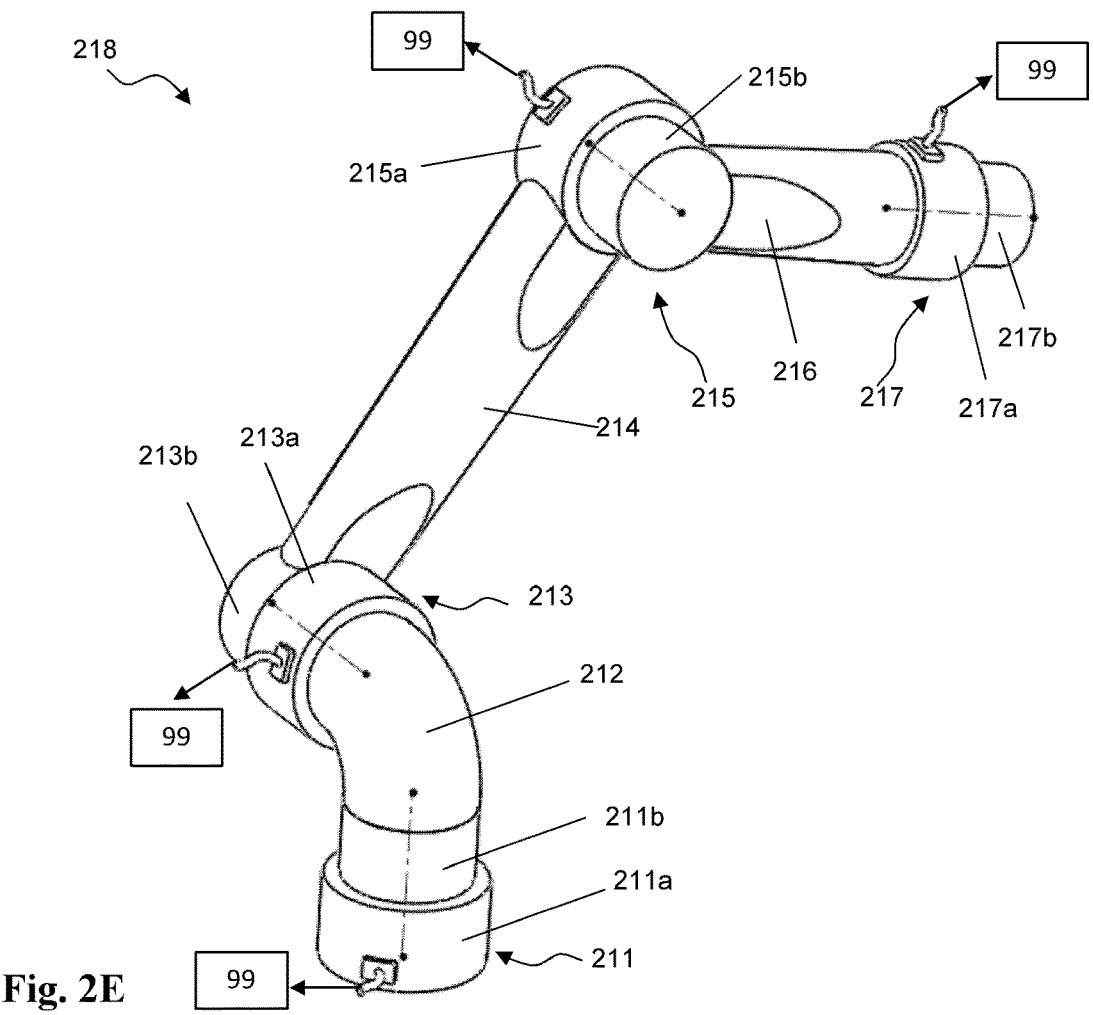
FIG. 2E shows an aerial view of a robot arm.

Referring to FIG. 2E, a robot arm 218 comprises rotational motion mechanisms 211, 213, 215 and 217, wherein the motion mechanisms 211, 213, 215 and 217 are referred to as motion sub-mechanisms. The rotational motion mechanism 211, 213, 215 or 217 comprises: a stationary member 211a, 213a, 215a, or respectively 217a; a moving member 211b, 213b, 215b, or respectively 217b which is constrained to rotate relative to the respective stationary member; and a driving member comprising a motor (not shown in figure) configured to drive a rotation of the respective moving member relative to the respective stationary member around an axis. The moving member 211b of the rotational motion mechanism 211 is rigidly connected to the stationary member 213a of the rotational motion mechanism 213 via a connector 212; wherein the axis of the rotational motion mechanism 211 may optionally be perpendicular to the axis of the rotational motion mechanism 213. Thus, the rotational motion mechanism 211 can produce a rotation of the stationary member 213a relative to the stationary member 211a. The moving member 213b of the rotational motion mechanism 213 is rigidly connected to the stationary member 215a of the rotational motion mechanism 215 via a rigid connector 214; wherein the axis of the rotational motion mechanism 213 may optionally be parallel to the axis of the rotational motion mechanism 215. The rotational motion mechanism 213 can produce a rotation of the stationary member 215a relative to the stationary member 213a. The moving member 215b of the rotational motion mechanism 215 is rigidly connected to the stationary member 217a of the rotational motion mechanism 217 via a connector 216; wherein the axis of the rotational motion mechanism 215 may optionally be perpendicular to the axis of the rotational motion mechanism 217, and the rotational motion mechanism 215 can produce a rotation of the stationary member 217a relative to the stationary member 215a. The robot arm 218 may be connected to the computer system 99 of FIG. 1 in the sense that the motion sub-mechanisms 211, 213, 215 and 217 are connected to the computer system 99 via wires or by wireless means, and the computer system 99 may be configured to control the motions produced by the motion sub-mechanisms of the robot arm 218.

The robot arm 218 is a combination motion mechanism which is a combination of the motion sub-mechanisms 211, 213, 215 and 217. Any robot arm of prior art may be used as a motion mechanism for our applications. Any motion mechanism of prior art may be used for our applications.

It should be possible to construct a combination motion mechanism from a rather arbitrary sequence of motion mechanisms, referred to as motion sub-mechanisms.

More examples of motion mechanisms are described in U.S. patent application Ser. Nos. 17/070,059 and 17/072,011. The entire contents of these applications are incorporated herein by reference.

Figure 3A:
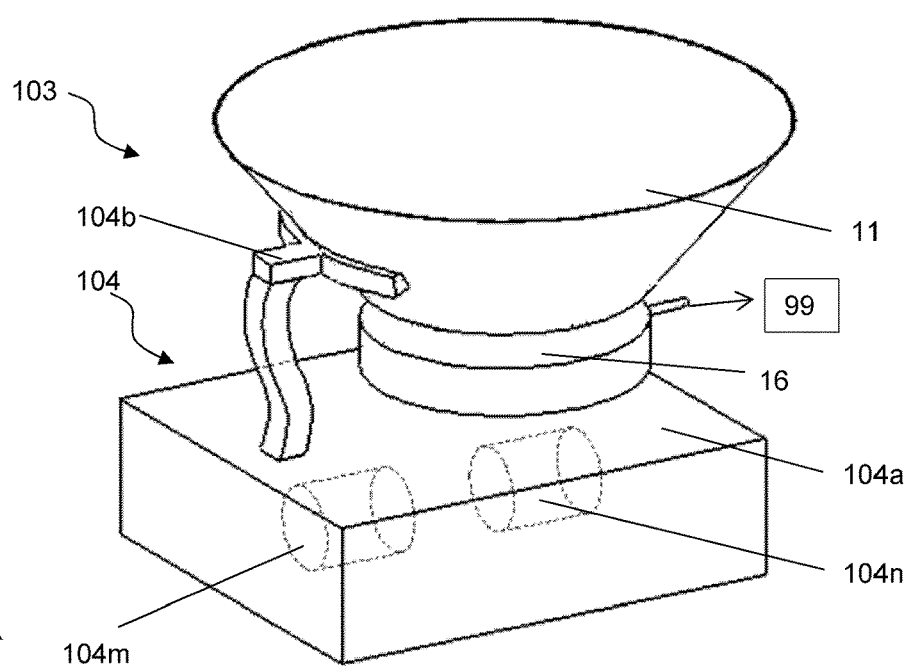
FIG. 3A shows an aerial view of parts of a cooking apparatus.

Referring to FIG. 3A, a cooking apparatus 103 comprises: a cookware 11; a heater (such as inductive stove, gas burner, electric burner, etc.) 16; and a motion mechanism 104 comprising a stationary component 104a and a moving component 104b. The moving component 104b is rigidly, fixedly, or otherwise connected to the cookware 11 at least during time of operation. The heater 16 is configured to heat the cookware 11 and hence the food or food ingredients held in said cookware. The motion mechanism 104 may produce a motion of the cookware to stir or mix the food or food ingredients in the cookware, using known techniques. The motion mechanism 104 may also be able to produce a motion (e.g., a rotation around a horizontal axis) of the cookware 11 to dispense a cooked food from the cookware 11, using known techniques. The motion mechanism 104 is driven by motors 104m and 104n, which are connected to the computer system 99 of FIG. 1 by wires or by wireless means.

As an example, the motion mechanism 104 may comprise a robot arm, wherein a moving part of the robot arm is connected to the cookware. The connection to the cookware may be temporary or permanent, depending on the particular application.

It should be noted that the heater may optionally be fixedly connected to the cookware. See, for example, U.S. patent application Ser. No. 15/801,923, the disclosures of which are hereby incorporated herein by reference in its entirety. In other applications, the heater may optionally be fixedly connected to the floor of a building or the ground wherein the building is where the kitchen is located (the same applies to comments below).

The motion mechanism 104 of the cooking apparatus 103 may be substituted by the stirring motion mechanism, the unloading motion mechanism (or unloading apparatus in the terms of some patent applications), the dispensing apparatus, or the combination of the above, as disclosed in U.S. patent application Ser. Nos. 16/997,196, 15/706,136, 15/801,923, 16/155,895, and 17/069,707. The entire contents of these applications are incorporated herein by reference.

Figure 3B:
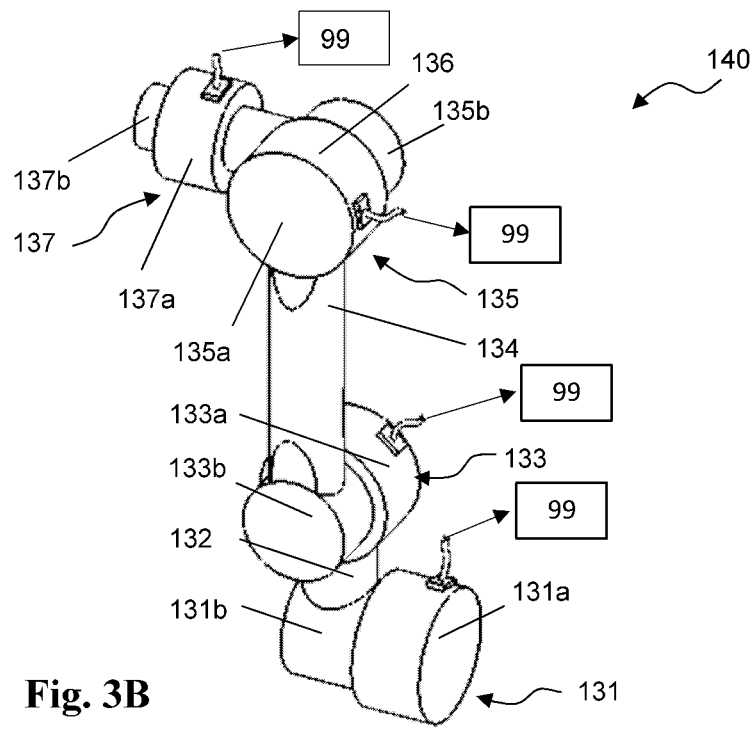
FIG. 3B shows an aerial view of a robot arm.

Referring to FIG. 3B, a robot arm 140 comprises a plurality of rotational motion mechanisms 131, 133, 135 and 137, referred to as motion sub-mechanisms. The rotational motion mechanism 131, 133, 135 or 137 comprises: a stationary member 131a, 133a, 135a, or respectively 137a; a moving member 131b, 133b, 135b, or respectively 137b which is constrained to rotate relative to the respective stationary member; and a driving member comprising a motor (not shown in figure) configured to drive a rotation of the respective moving member relative to the respective stationary member around a respective axis. The moving member 131b of the rotational motion mechanism 131 is rigidly connected to the stationary member 133a of the rotational motion mechanism 133 via a connector 132; wherein the axis of the rotational motion mechanism 131 may optionally be perpendicular to the axis of the rotational motion mechanism 133. Thus, the rotational motion mechanism 131 can produce a rotation of the stationary member 133a relative to the stationary member 131a. The moving member 133b of the rotational motion mechanism 133 is rigidly connected to the stationary member 135a of the rotational motion mechanism 135 via a rigid connector 134; wherein the axis of the rotational motion mechanism 133 may optionally be parallel to the axis of the rotational motion mechanism 135. The rotational motion mechanism 133 can produce a rotation of the stationary member 135a relative to the stationary member 133a. The moving member 135b of the rotational motion mechanism 135 is rigidly connected to the stationary member 137a of the rotational motion mechanism 137 via a connector 136; wherein the axis of the rotational motion mechanism 135 may optionally be perpendicular to the axis of the rotational motion mechanism 137, and the rotational motion mechanism 135 can produce a rotation of the stationary member 137a relative to the stationary member 135a. The robot arm 140 may be connected to the computer system 99 of FIG. 1 in the sense that the motion sub-mechanisms 131, 133, 135 and 137 are connected to the computer system 99 via wires or by wireless means, and the computer system 99 may be configured to control the motions produced by the motion sub-mechanisms of the robot arm 140.

Figure 3C:
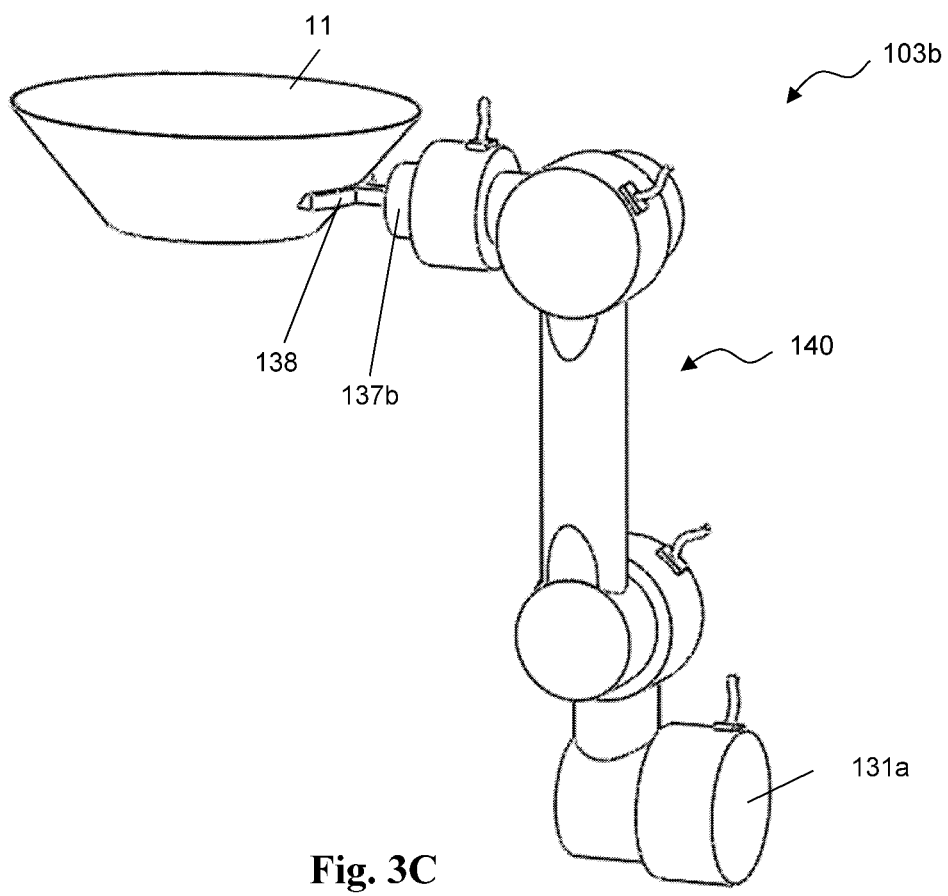
FIG. 3C shows a cooking apparatus comprising and the robot arm of FIG. 3B.

Referring to FIG. 3C, a cooking apparatus 103b comprises: a cookware 11 (as in FIG. 3A) configured to contain or hold a food or a food ingredient; and a robot arm 140 (as in FIG. 3B). The cookware 11 is fixedly or rigidly connected to the moving member 137b of the motion mechanism 137 of the robot arm 140 via a rigid component 138. The robot arm 140 can produce a cyclic and oscillatory motion (of the rigid component 138 and) of the cookware 11 as to stir and distribute a food or a food ingredient evenly in the cookware 11. The robot arm 140 can also produce a motion of (the rigid component 138 and) the cookware 11 wherein the cookware 11 may be turned by an angle in the motion so as to dispense a cooked food.

It should be noted that the robot arm 140 is capable of producing two types of motion of the cookware 11: a stirring motion of cyclic or oscillatory type to mix and distribute a cooked food or a food ingredient in the cookware 11; and an unloading motion to turn the cookware 11 in order to dispense a cooked food from the cookware 11.

The cooking apparatus 103b may substitute the cooking apparatus 103 in any cooking system, kitchen system, or automated restaurant described in the present patent application. This applies to the cooking system, kitchen system, or automated restaurant described in the following.

It should be further noted that the robot arm 140 in the cooking apparatus 103b may be substituted by other type of robot arm.

Figure 4A:
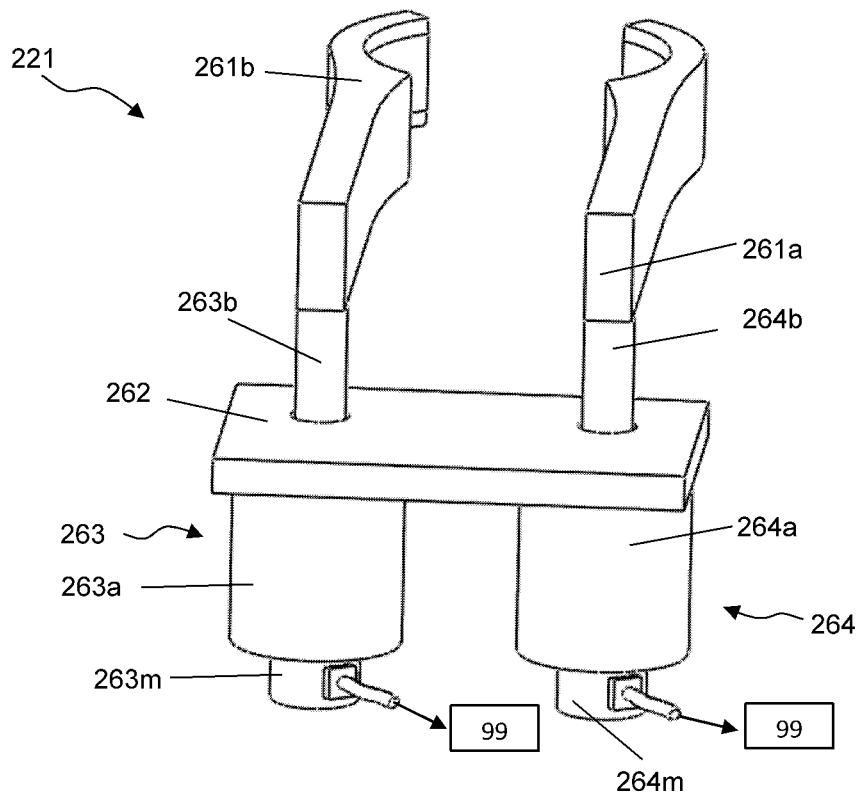
FIG. 4A shows an aerial view of a gripping mechanism.

Referring to FIG. 4A, a gripping mechanism 221 comprises: grippers 261a and 261b which can optionally be rigid or elastic components; rotational motion mechanisms 263 and 264. The rotational motion mechanism 263 comprises a stationary member 263a and a moving member 263b; and the rotational motion mechanism 263 is configured to produce a rotation of the moving member 263b relative to the stationary member 263a. The rotational motion mechanism 264 comprises a stationary member 264a and a moving member 264b; and the rotational motion mechanism 264 is configured to produce a rotation of the moving member 264b relative to the stationary member 264a. The stationary members 263a and 264a are rigidly connected to a support component 262. The gripper 261a is rigidly or fixedly connected to the moving member 264b. The rotational motion mechanism 264 can produce a rotation of the gripper 261a around the axis of the rotational motion mechanism 264 relative to the stationary member 264a. Similarly, the gripper 261b is rigidly or fixedly connected to the moving member 263b. The rotational motion mechanism 263 can produce a rotation of the gripper 261b around the axis of the rotational motion mechanism 263 relative to the stationary member 263a. As the gripper 261a or 261b is rigidly connected to the moving member 264b or 263b respectively, the rotational motion mechanism 264 or 263 can produce a rotation of the gripper 261a or 261b respectively. The axis of rotation of the rotational motion mechanism 264 is parallel to the axis of rotation of the rotational motion mechanism 263, and the rotational motion mechanisms 264 and 263 are configured to rotate the respective grippers 261a and 261b in opposite directions simultaneously. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanisms 263 or 264 is driven by a motor 263m or 264m respectively. The gripping mechanism 221 may be connected to the computer system 99 of FIG. 1 in the sense that the motors 263m and 264m are connected to the computer system 99 via wires or by wireless means, and the computer system 99 may be configured to control the motions of the grippers 261a and 261b produced by the motion mechanisms 263 and 264. Thus, the gripping mechanism 221 may be controlled by the computer system 99 to grip or loosen a container or other object.

Figure 4B:
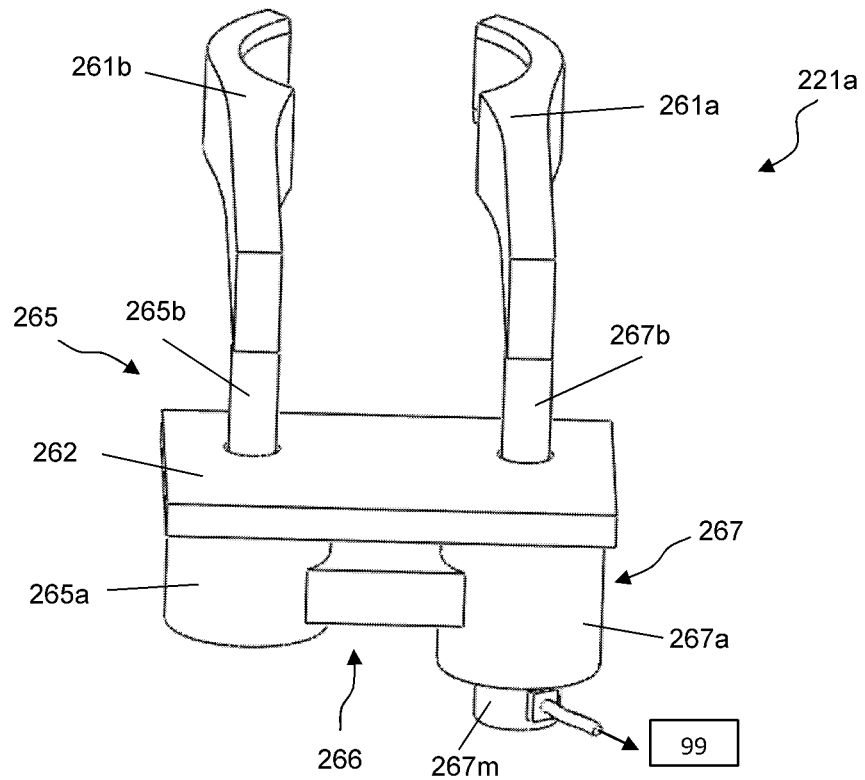
FIG. 4B shows an aerial view of a similar gripping mechanism.

Referring to FIG. 4B, a gripping mechanism 221a comprises: grippers 261a and 261b which are optionally rigid or elastic components; a rotational motion mechanism 267 comprising a stationary member 267a and a moving member (a shaft) 267b; a rotational mechanism 265 comprising a first mating part 265a and a second mating part (a shaft) 265b which is constrained to rotate relative to the first mating part 265a. The rotational motion mechanism 267 is configured to produce a rotational motion of the moving member 267b relative to the stationary member 267b. The stationary members 267a and the first mating part 265a are rigidly or fixedly connected to a support component 262. The gripper 261a is rigidly or fixedly connected to the moving member 267b. The gripper 261b is rigidly or fixedly connected to the second mating part (a shaft) 265b. The axis of rotation of the rotational motion mechanism 267 and the axis of the rotational mechanism 265 are configured to be parallel to each other. A transmission mechanism 266 is configured to connect the rotational motion mechanism 267 and the rotational mechanism 265, so that a rotation of the shaft 267b relative to the stationary member 267a is transmitted to an anti-synchronous rotation of the shaft 265b. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open up and release the container or other object. The motion mechanism 267 is driven by a motor 267m. The gripping mechanism 221a may be connected to the computer system 99 of FIG. 1 in the sense that the motor 267m is connected to the computer system 99 via wires or by wireless means, and the computer system 99 may be configured to control the motions of the grippers 261a and 261b produced by the motion mechanism 267. Thus, the gripping mechanism 221a may be controlled by the computer system 99 to grip or loosen a container or other object.

For examples of gripping mechanism 221a described above, see FIGS. 39A-39B ("gripping mechanism 701"), or FIGS. 47A-47C ("gripping mechanism 905") of U.S. patent application Ser. No. 16/517,705. The entire content of the US Patent Application is hereby incorporated herein by reference.

Figure 4C:
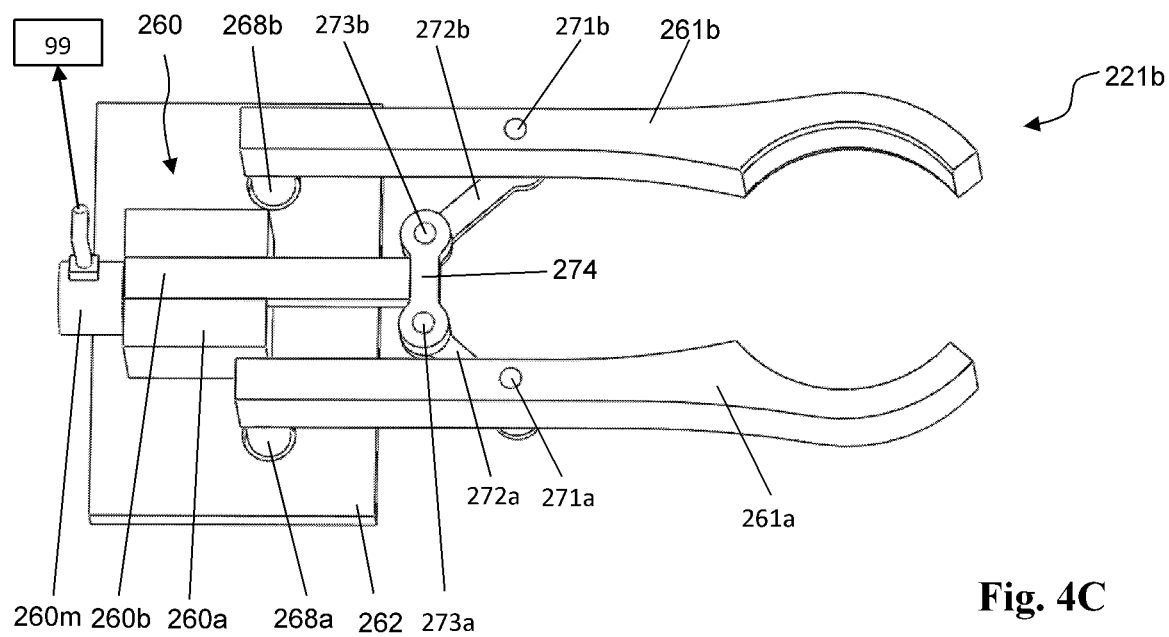
FIG. 4C shows an aerial view of another gripping mechanism.

Referring to FIG. 4C, a gripping mechanism 221b comprises: a support component 262 which is a rigid component; grippers 261a and 261b; a linear motion mechanism 260; a rigid component 274; shafts 273a and 273b; links 272a and 272b; shafts 271a and 271b. The linear motion mechanism 260 comprises a stationary member 260a and a moving member 260b which is constrained to move linearly (along a horizontal direction) relative to the stationary member 260a. Shafts 268a and 268b are constrained to rotate relative to the support component 262 respectively around some vertical axes. The shaft 273a (or respectively 273b) connects the link 272a (or respectively 272b) to the rigid component 274 so that the link 272a (or respectively 272b) is constrained to rotate relative to the rigid component 274 around the axis of the shaft 273a (or respectively 273b). The shaft 271a (or 271b) connects the link 272a (or respectively 272b) to the gripper 261a (or respectively 261b) so that the gripper 261a (or respectively 261b) is rotatable relative to the link 272a (or respectively 272b). The gripper 261a (or 261b) is rigidly or fixedly connected to the shaft 268a (or respectively 268b). Thus, the gripper 261a (or respectively 261b) is constrained to rotate relative to the support component 262 around the axis of the shaft 268a (or respectively 268b). The parts 268a, 271a, 272a, and 273a are mirror images of the parts 268b, 271b, 272b, and 273b about a vertical plane which is parallel to the direction of the linear motion of the moving member 260b relative to the stationary member 260a, wherein said stationary member 260a is rigidly or fixedly connected to the support component 262. The rigid component 274 is rigidly or fixedly connected to the moving member 260b. Thus, the linear motion mechanism 260 may produce a horizontal motion of the rigid component 274 and hence anti-synchronous rotations in the grippers 261a and 261b. Each of the grippers 261a and 261b is rotated between a first end-position and a second end-position. At the first end-positions, the grippers 261a and 261b may together grip a container or other object. At the second end-positions, the grippers 261a and 261b can open up and release the container or object. The motion mechanism 260 is driven by a motor 260m. The gripping mechanism 221b may be connected to the computer system 99 of FIG. 1 in the sense that the motor 260m is connected to the computer system 99 via wires or by wireless means, and the computer system 99 may be configured to control the motions of the grippers 261a and 261b produced by the motion mechanism 260. Thus, the gripping mechanism 221b may be controlled by the computer system 99 to grip or loosen a container or other object.

A gripping mechanism may also be referred to as a gripper mechanism.

Figure 4D:
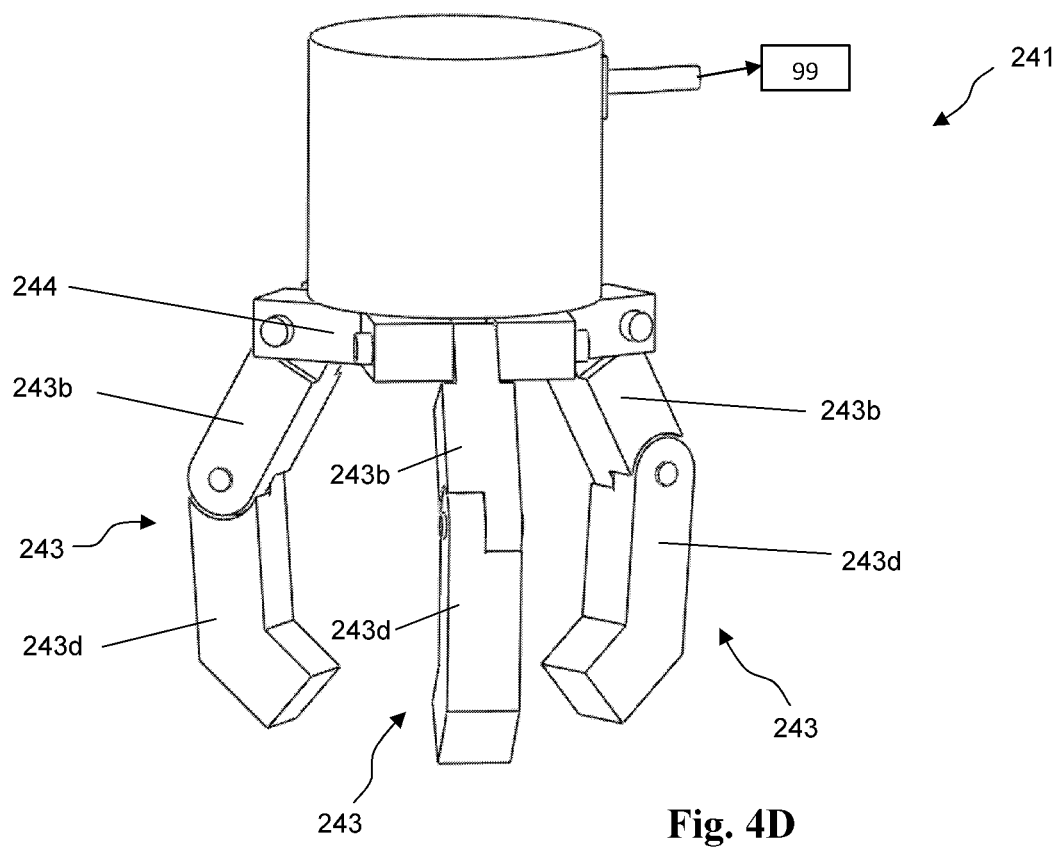
FIG. 4D shows an aerial view of a gripping mechanism which is a robot hand comprising robot fingers.

Referring to FIG. 4D, a gripping mechanism 241 comprises a support component (or base component) 244 and a plurality of gripper sub-mechanisms 243 which are referred to as robotic fingers. Each gripper sub-mechanism 243 comprises: grippers 243d and 243b wherein the gripper 243d is rotatable relative to the gripper 243b and the gripper 243b is rotatable relative to the support component 244; a motion mechanism comprising a motor (hidden in figure) which drives a rotation of the gripper 243d relative to the gripper 243b; a motion mechanism comprising a motor (hidden in figure) which drives a rotation of the gripper 243b relative to the support component 244. (It should be noted that an optional transmission mechanism may be used to link the rotation of the grippers 243d and 243b and then only one motor is needed to drive the rotations of both grippers). The gripping mechanism 241 may be connected to the computer system 99 of FIG. 1 in the sense that all motors are connected to the computer system 99 via wires or by wireless means, and the computer system 99 may be configured to control the motions produced by the motors in the gripping mechanism 241. The gripping mechanism 241 may be controlled by the computer system 99 to grip or release a container or other object.

Figure 4E:
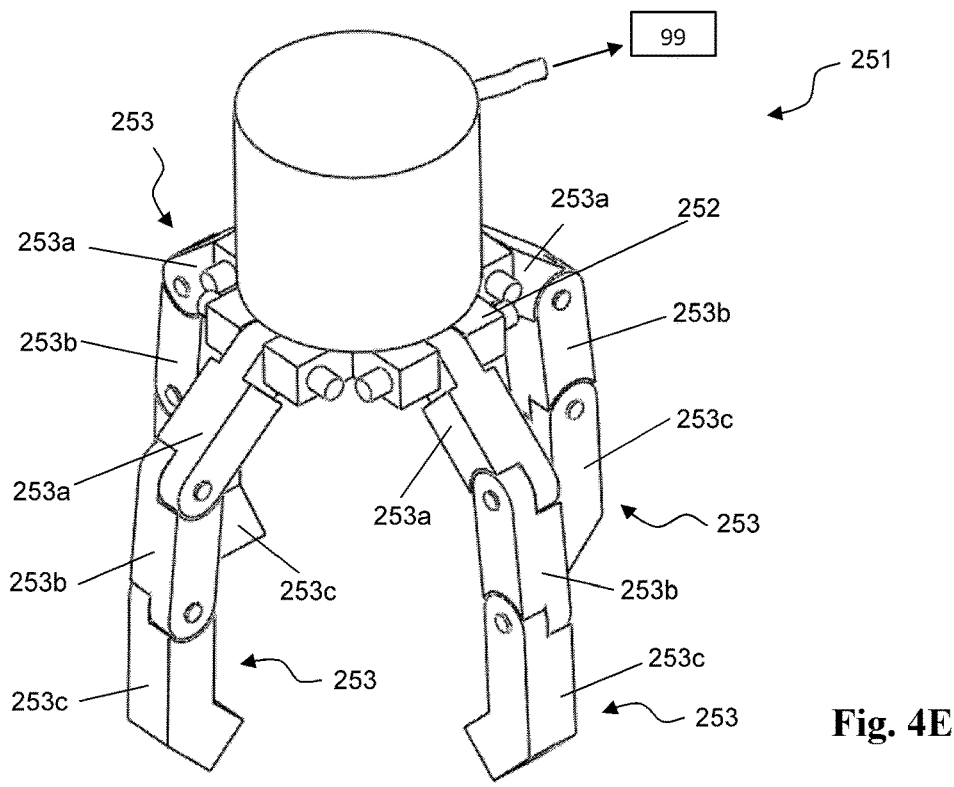
FIG. 4E shows an aerial view of another gripping mechanism which is a robot had.

Referring to FIG. 4E, a gripping mechanism 251 comprises: a support component (or base component) 252 and a plurality of gripper sub-mechanisms 253 which are referred to as robotic fingers. Each gripper sub-mechanism 253 comprises: grippers 253a, 253b and 253c, wherein the gripper 253c is rotatable relative to the gripper 253b, the gripper 253b is rotatable relative to the gripper 253a, and the gripper 253a is rotatable relative to the support component 252; a motion mechanism comprising a motor (hidden in figure) which drives a rotation of the gripper 253c relative to the gripper 253b; a motion mechanism comprising a motor (hidden in figure) which drives a rotation of the gripper 253b relative to the gripper 253a; a motion mechanism comprising a motor (hidden in figure) which drives a rotation of the gripper 253a relative to the support component 252. (It should be noted that an optional transmission mechanism may be used to link the rotation of the grippers 253a, 253b and 253c and then only one motor is needed to drive the rotations of the grippers). The gripping mechanism 251 may be connected to the computer system 99 of FIG. 1 in the sense that all motors are connected to the computer system 99 via wires or by wireless means, and the computer system 99 may be configured to control the motions produced by the motors in the gripping mechanism 251. The gripping mechanism 251 may be controlled by the computer system 99 to grip or release a container or other object.

The gripping mechanisms 241 (FIG. 4D) and 251 (FIG. 4E) are commonly referred to as robot hands. The gripper sub-mechanisms 243 and 253 are referred to as robot fingers. In fact, any robot hand may be used as a gripping mechanism for our purposes here. Robot hands may also be referred to as robot end effectors. Similarly, any robot arm may be used as a motion mechanism for our purpose.

Figure 4F:
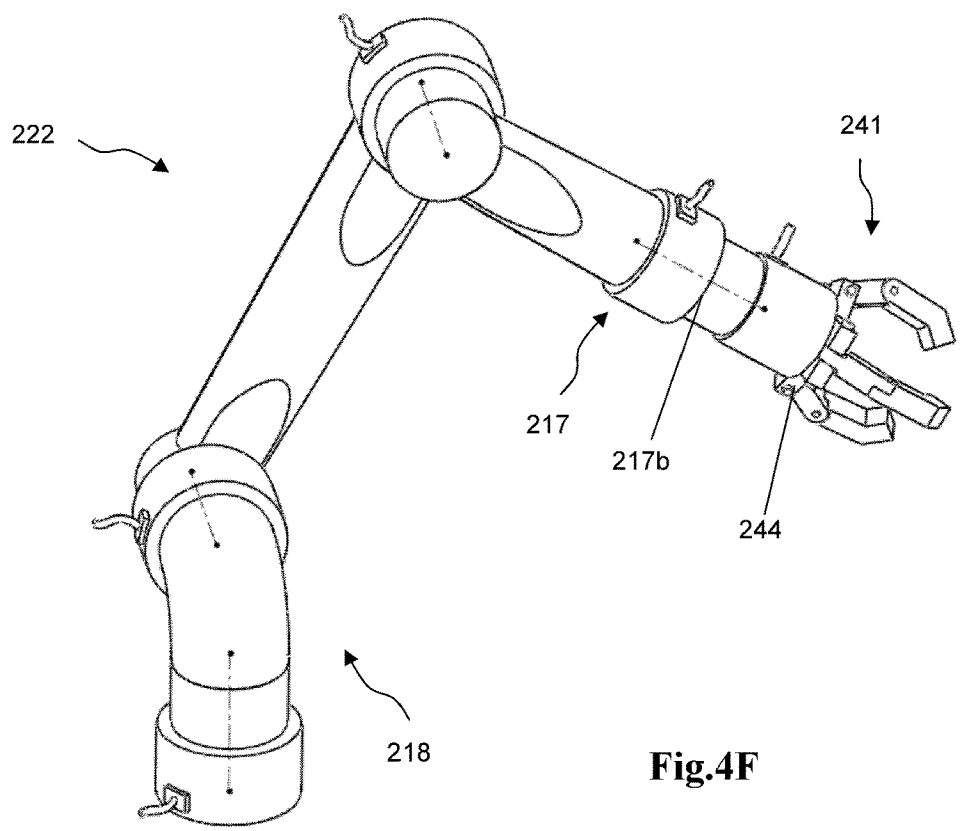
FIG. 4F shows an aerial view of a robotic apparatus.

Referring to FIG. 4F, a robotic apparatus 222 comprises a robot arm 218 and a gripping mechanism 241. The gripping mechanism 241 is configured to grip or release a container or other object. The support component 244 of the gripping mechanism 241 is fixedly connected to the moving member 217b of the rotational motion mechanism 217 of the robot arm 218, so the robot arm can move the gripping mechanism 241. When the gripping mechanism 241 grips a container or other object, the robotic apparatus 222 can transfer the container or object to another position. The robot arm 218 and the gripping mechanism 241 may be connected to the computer system 99 of FIG. 1 via wires or by wireless means, and the computer system 99 may be configured to control the motions produced the motion mechanism in the robotic apparatus 222. The robotic apparatus 222 may be controlled by the computer system 99 to grip a container or other object, and then move the container or object, and then release the container or object at a different position. The robotic apparatus 222 may substitute a transfer apparatus to grip and move a container or other object. The robotic apparatus 222 may also substitute a dispensing apparatus to grip and move a container as to dispense food or food ingredients from the container.

It should be noted that the gripping mechanism 241 of the robotic apparatus 222 may be substituted by the gripping mechanism 251 or other gripping mechanism.

It should be noted that the gripping mechanisms 221, 221a, 221b, 241 and 251 are variants of gripping mechanisms. They may be substituted by other types of gripping mechanism such as an electric gripper, a pneumatic gripper, etc.

Referring to FIG. 5, a transfer apparatus 650 comprises a gripping mechanism 607 comprising: a rigid component 672 referred to as a support component; grippers 671a and 671b which can optionally be rigid or elastic components; shafts 674a and 674b; motors 673a and 673b. Each of the motors 673a and 673b comprises a base component which is fixedly connected to the rigid component 672. The gripper 671a is rigidly of fixedly connected to the shaft 674a. The motor 673a can produce a rotation of the shaft 674a and hence of the gripper 671a around the axis of the shaft 674a relative to the rigid component 672. Similarly, the gripper 671b is rigidly or fixedly connected to the shaft 674b. The motor 673b can produce a rotation of the shaft 674b and hence of the gripper 671b around the axis of the shaft 674b relative to the rigid component 672. The motors 673a and 673b are configured to rotate the respective grippers 671a and 671b anti-synchronously around a pair of parallel axes. The gripper 671a or 671b is rotated between two end-positions. At some first end-positions, the grippers 671a and 671b may grip a food container 182 when the food container is placed in a certain position relative to the rigid component 672. At some second end-positions, the grippers 671a and 671b can release the food container 182.

The transfer apparatus 650 further comprises a motion mechanism 650a comprising: a vertical motion mechanism 608 and a rotational motion mechanism 609. Said vertical motion mechanism 608 comprises a stationary member 675; a moving member 669 which is constrained to move vertically relative to the stationary member 675; and a motor 675m configured to drive a motion of said moving member relative to said stationary member. Said rotational motion mechanism 609 comprises: a stationary member 678; a shaft 677 referred to as a moving member which is constrained to rotate around the axis of the shaft 677 relative to the stationary member 678; and a motor 679 configured to drive a rotation of said moving member relative to said stationary member. The rigid component 672 of the gripping mechanism 607 is rigidly, fixedly, or otherwise connected to the moving member 669, so that the vertical motion mechanism 608 is configured to produce a vertical motion of both the moving member 669 and the rigid component 672 between two end-positions. A connector 676 rigidly, fixedly, or otherwise connects the shaft 677 to the stationary member 675. The motor 679 comprises a base component which is fixedly connected to the stationary member 678. The motor 679 can produce a rotation of both the shaft 677 and the connector 676 between two end-positions. The transfer apparatus 650 is configured to grip a cooking container 190 and transfer it in a combination of vertical motion and rotational motion to another position. The motors 673a, 673b, 675m, and 679 are all connected to the computer system 99 of FIG. 1, so that the computer system 99 may control timings and speeds of their produced motions. The stationary member 678 may be referred to as the support component of the transfer apparatus 650.

Referring to FIG. 6A, an ingredient dispensing apparatus 301 comprises a gripping mechanism 311 comprising: a rigid component 345 referred to as a support component; grippers 341a and 341b which can optionally be rigid or elastic components; shafts 343a and 343b; motors 344a and 344b. Each of the motors 344a and 344b comprises a base component which is fixedly connected to the rigid component 345. The gripper 341a is rigidly or fixedly connected to the shaft 343a. The motor 344a is configured to produce a rotation of the shaft 343a and hence of the gripper 341a around the axis of the shaft 343a relative to the rigid component 345. Similarly, the gripper 341b is rigidly or fixedly connected to the shaft 343b. The motor 344b is configured to produce a rotation of the shaft 343b and hence of the gripper 341b around the axis of the shaft 343b relative to the rigid component 345. The shafts 343a and 343b have parallel axes, and the motors 344a and 344b are configured to rotate the respective grippers 341a and 341b anti-synchronously around said parallel axes. The gripper 341a or 341b is rotated between two end-positions. At some first end-positions, the grippers 341a and 341b are configured to work together to grip an ingredient container 81 when the ingredient container is placed in a certain position relative to the rigid component 345, wherein the ingredient container 81 is configured to hold food or food ingredients. The ingredient container is not part of the ingredient dispensing apparatus 301.

The ingredient dispensing apparatus 301 further comprises a motion mechanism 312 comprising: a rigid connector 349 referred to as a stationary member; a shaft 347 referred to as a moving member which is constrained to rotate around the axis of the shaft 347 relative to the stationary member 349; and a motor 348 configured to drive a rotation of said moving member relative to said stationary member. The shaft 347 comprises a horizontal axis; and said axis is perpendicular to the axes of the shafts 343a and 343b, although these are not strict requirements. The motor 348 comprises a base component which is fixedly connected to the rigid connector 349. The rigid connector 349 is referred to as the support component of the ingredient dispensing apparatus 301.

The shaft 347 is rigidly, fixedly, or otherwise connected to the rigid component 345 of the gripping mechanism 311. The motor 348 can produce a rotation of the rigid component 345 between two end-positions. When the rigid component 345 is rotated to a first end-position (such that the axes of the shaft 343a and 343b are vertical) and when the grippers 341a and 341b are rotated to their first end-positions relative to the rigid component 345, the grippers 341a and 341b are configured to grip an ingredient container under the condition that the ingredient container is at a certain position relative to the support component 349. Said position of the ingredient container is referred to as the dispensing position relative to the support component 349. Then, the rigid component 345 is rotated to the second end-position while the ingredient container is gripped by the grippers 341a and 341b, so that the ingredient container is turned by an angle to dispense the food or food ingredients from the ingredient container into a cookware. Virtually the entire contents of the ingredient container are dispensed by the turning of the ingredient container. The angle between the first end-position and the second end-position in the rotation of the rigid component 345 is usually between 90 degrees and 180 degrees. The motors 344a, 344b and 348 are connected to the computer system 99 of FIG. 1 via wires, so that the computer system 99 may control the timing and speed of the motors.

Figure 6B:
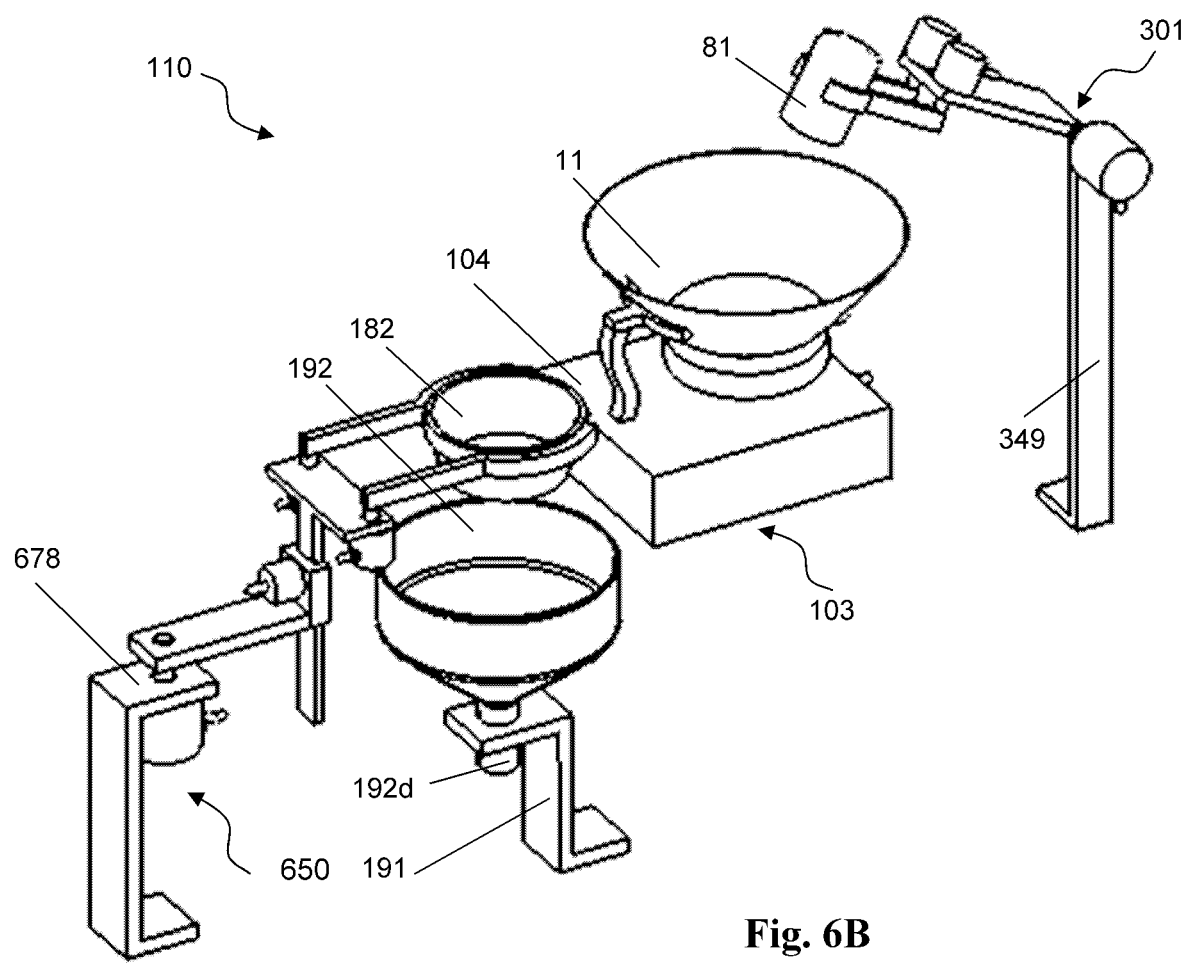
FIGS. 6B-6C show aerial views of a cooking apparatus comprising the cooking apparatus of FIG. 3A, the transfer apparatus of FIG. 5 and the ingredient dispensing apparatus of FIG. 6A.
Figure 6C:
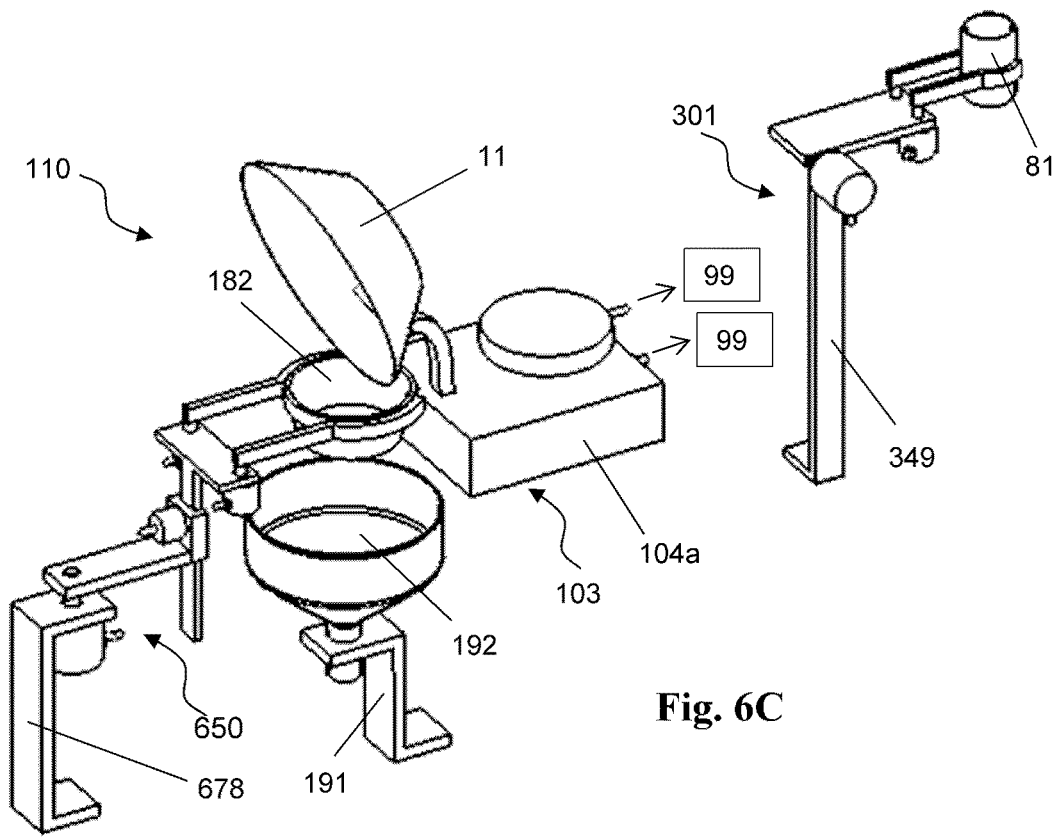

Referring to FIGS. 6B-6C, a cooking apparatus 110 comprises: a cooking apparatus 103 (as in FIG. 3A); a transfer apparatus 650 (as in FIG. 5); a sink 192; a garbage disposal 192d connected to the sink wherein the garbage disposal is below the sink; and an ingredient dispensing apparatus 301 (as in FIG. 6A). The sink 192 and the garbage disposal 192d are fixedly connected to the floor of the building or the ground via a connector 191. A liquid pipe (not shown in figures) connects an exit of the garbage disposal 192d to a sewage (or a storage tank of wastewater). The positions of the support component 678 of the transfer apparatus 650, the connector 191, the support component of the cooking apparatus 103 and the support component 349 of the ingredient dispensing apparatus 301 are fixed relative to each other. When the rigid component 345 of the ingredient dispensing apparatus 301 is rotated to the second end-position, the food or food ingredients in the ingredient container 81 gripped by the ingredient dispensing apparatus 301 can be dispensed into the cookware 11 of the cooking apparatus 103 (see FIG. 6B). When a food container 182 gripped by the gripping mechanism 607 is moved by the motion mechanism 650a to a receiving position relative to the support component of the cooking apparatus 103, the cookware 11 can be rotated to a certain "dispensing position" by the motion mechanism 104 of the cooking apparatus 103, so that a cooked food held in the cookware 11 can be dispensed into the food container 182 (optionally through a funnel) (see FIG. 6C). When the food container 182 gripped by the gripping mechanism 607 is moved away from the receiving position, and when the cookware 11 contains wastewater (say, from cleaning after a food is cooked), the cookware 11 of the cooking apparatus 103 can be rotated to the dispensing position by the motion mechanism 104, to dispense the wastewater held in the cookware 11 into the sink 192.

Figure 6D:
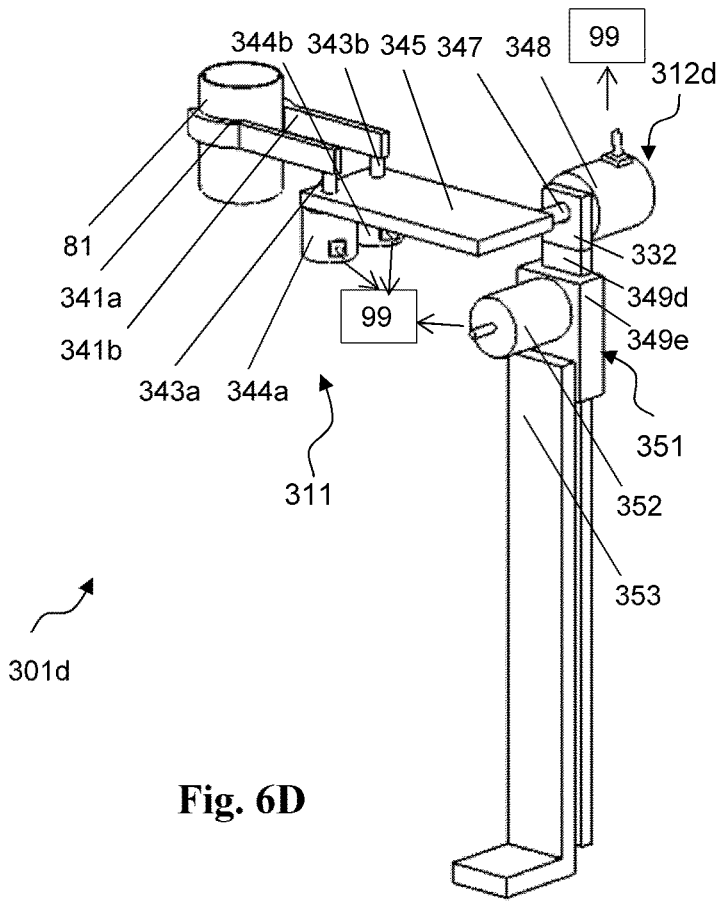
FIG. 6D shows an aerial view of another ingredient dispensing apparatus.

Referring to FIG. 6D, an ingredient dispensing apparatus 301d comprises a gripping mechanism 311 (as in FIG. 6A) and a motion mechanism 312d. As explained earlier, the grippers 341a and 341b of the gripping mechanism 311 may be rotated between two end-positions (a first end-position and a second end-position) to grip or release an ingredient container 81. The motion mechanism 312d comprises: a support component 332; a shaft 347 which is constrained to rotate relative to the support component 332; and a motor 348 configured to drive the rotation of the shaft 347 relative to the support component 332. The shaft 347 comprises a horizontal axis, which is perpendicular to the axes of the shafts 343a and 343b of the gripping mechanism 311, although these are not strict requirements. The shaft 347 is rigidly, fixedly, or otherwise connected to the rigid component 345 of the gripping mechanism 311 so that the motor 348 can produce a rotation of the rigid component 345 between two end-positions. When the rigid component 345 is rotated to a first end-position, the axes of the shaft 343a and 343b are vertical so that the gripping mechanism 311 may grip an ingredient container which is at upright position. When the rigid component 345 is rotated to the second end-position, the gripped ingredient container can be turned by an angle to dispense the food or food ingredients (into a cookware). Virtually the entire contents of the ingredient container are dispensed by the turning of the ingredient container. The angular degree between the first end-position and the second end-position in the rotation of the rigid component 345 is usually between 90 degrees and 180 degrees. The ingredient container is not part of the ingredient dispensing apparatus 301d.

The ingredient dispensing apparatus 301d further comprises a vertical motion mechanism 351 comprising: a stationary member 349e; a moving member 349d which is constrained to move vertically relative to the stationary member 349e wherein the direction of motion is vertical; and a motor 352 configured to drive the motion of the moving member 349d relative to the stationary member 349e. The support component 332 of the motion mechanism 312d is fixedly or rigidly connected to the moving member 349d, so that the vertical motion mechanism 351 can drive a vertical linear motion of the support component 332 between two end-position. The motor 352 is referred to as a driving member. The ingredient dispensing apparatus 301d further comprises a support component 353 which is rigidly or fixedly connected to the stationary member 349e. The support component 353 may be referred to as the support component of the ingredient dispensing apparatus 301d. The ingredient dispensing apparatus 301d is configured to grip an ingredient container 81 and transfer it via a combination of vertical motion and rotational motion to dispense the food or food ingredients in the ingredient container 81 into a cookware.

The motors 344a, 344b, 348 and 352 of the ingredient dispensing apparatus 301d are all connected to the computer system 99 of FIG. 1, so that the computer system 99 may control timings and speeds of their produced motions.

Figure 7A:
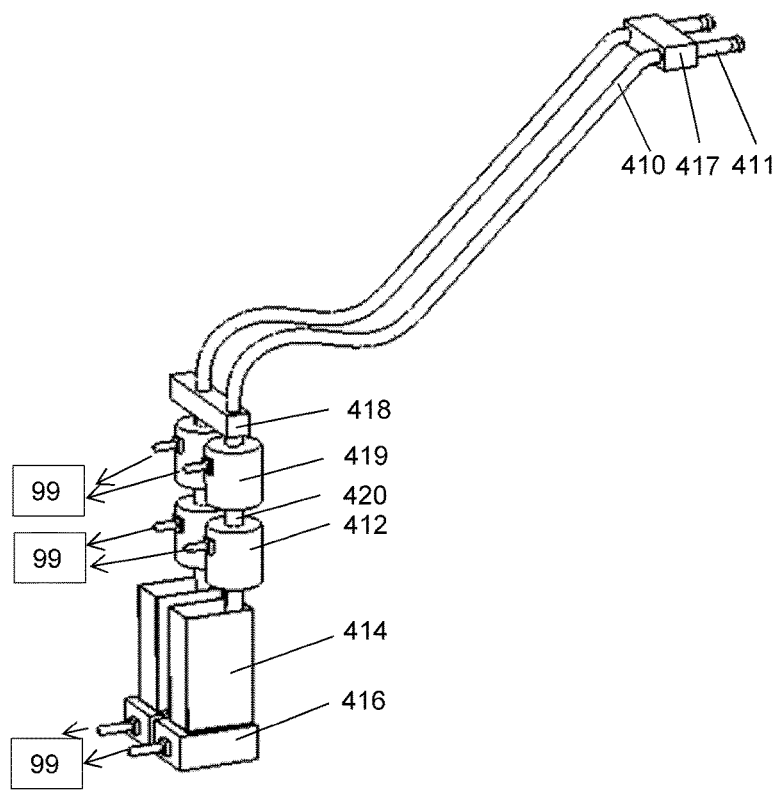
FIG. 7A shows an aerial view of the parts of a liquid dispensing mechanism.
Figure 7B:
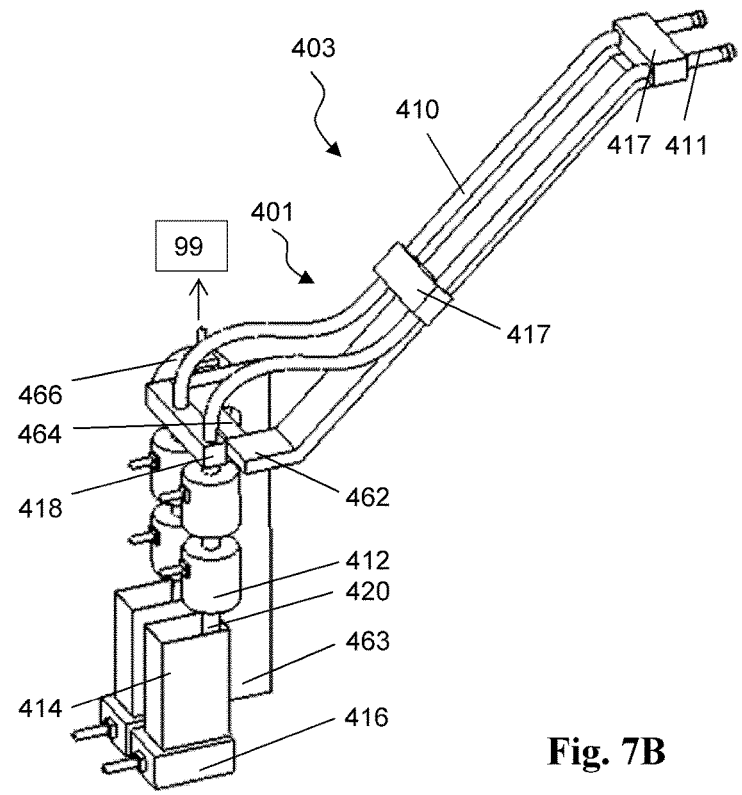
FIG. 7B shows an aerial view of the liquid dispensing apparatus.

Referring to FIGS. 7A-7B, a liquid dispensing mechanism 403 comprises a rotational motion mechanism 401 comprising: a support component 463 referred to as a stationary member; a shaft 464 referred to as a moving member which is constrained to rotate around the axis of the shaft 464 relative to the stationary member 463; and a motor 466 configured to drive a rotation of said moving member relative to said stationary member. The axis of the shaft 464 is configured to be horizontal. A rotatable component 462 is rigidly or fixedly connected the shaft 464. The motor 466 comprises a base component which is fixedly connected to the support component 463. The motor 466 can produce a rotation of the shaft 464 and the rotatable component 462 between two end-positions relative to the support component 463. The motor 466 is connected to the computer system 99 of FIG. 1 via wires, so that the computer system 99 may control the timing and speed of the motor 466.

The liquid dispensing mechanism 403 further comprises: a plurality of sprayers 411; a plurality of liquid pipes 420; a plurality of flexible pipes 410; and a plurality of liquid containers 414. Each liquid container 414 is configured to contain a liquid ingredient, e.g., cooking oil, vinegar, soy sauce, or water, etc. Each flexible pipe 410 connects a sprayer 411 to a corresponding liquid pipe 420 and each liquid pipe 420 is inserted into a corresponding liquid container 414, and a pump 412 can pump liquid contained in the liquid container 414 to the outlet of the sprayer 411 wherein the liquid flow may be measured by a flowmeter 419. Each liquid container 414 is positioned on an electronic scale 416 and the electronic scale 416 can weigh the corresponding liquid container 414. A plurality of connectors 417 are configured to fixedly connect the pipes 410 to improve their stability. The connectors 417 are fixedly or rigidly connected to the rotatable component 462, so that the rotational motion mechanism can produce a rotation of the shaft, the connectors 417 and the pipes 410 and 411 between two end-positions relative to the support component 463 around the axis of the shaft 464. A connector 418 fixedly connects the pipes 410 to the support component 463. The pumps 412, flowmeters 419, and electronic scales 416 are connected by wired or wireless means to the computer system 99 of FIG. 1, so that the computer system may control the timing and amount of liquid to be drawn from the corresponding liquid container.

It should be noted that the electronic scales 416 may be substituted by other types of scales, such as electronic balances.

It should be noted the flowmeters 419, the pumps 412, the electronic scale 416 may be fixedly connected to the floor of the building or the ground.

Figure 8A:
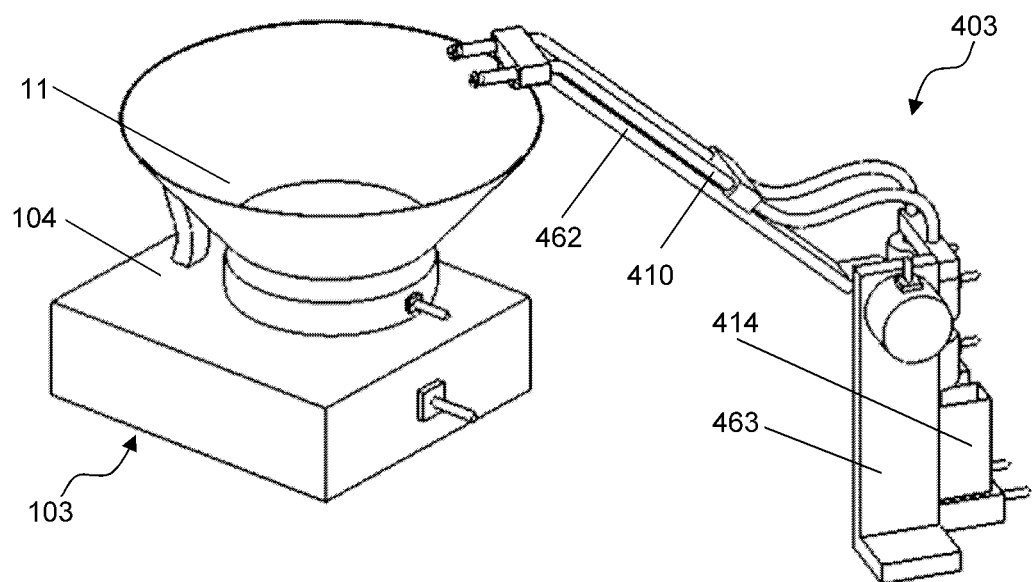
FIGS. 8A-8B show aerial views of the relative positions of the cooking apparatus of FIG. 3A and the liquid dispensing apparatus of FIG. 7B.
Figure 8B:
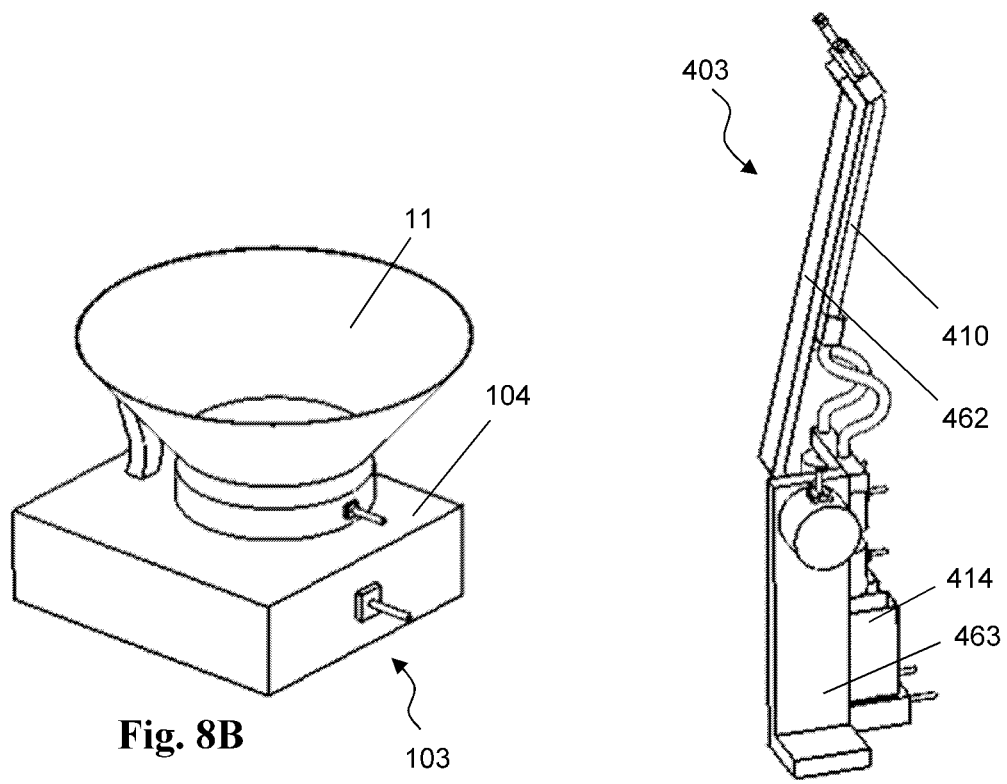

FIGS. 8A-8B show two end-positions of the rotatable component 462 of the liquid dispensing mechanism 403 relative to the cookware 11 of a cooking apparatus 103. When the rotatable component 462 is moved to a first end-position, the open ends of the sprayers 411 are positioned above the cookware 11 when the cookware 11 is at the upright position (see FIG. 8A), so that the liquid may flow and be dispensed into the cookware 11. The liquid dispensing mechanism 403 is used to dispense a plurality of liquid ingredients into the cookware 11 of a cooking apparatus 103 when the rotatable component 462 is at the first end-position and the cookware 11 is at the upright position.

When the rotatable component 462 is rotated to the second end-position, the rotatable component 462 and the sprayers 411 are all away from the cookware 11. The angle between the first end-position and the second end-position may be about 90 degrees, although this is not a strict requirement.

Figure 9A:
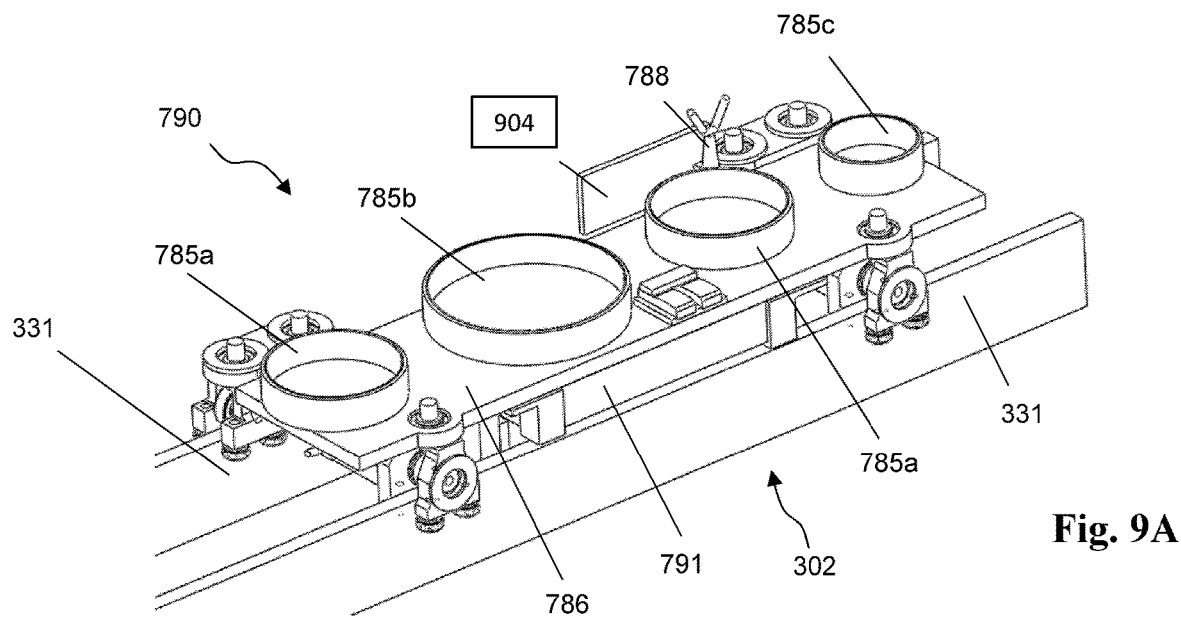
FIG. 9A shows an aerial view of a transport system which includes a vehicle on tracks.

Referring to FIG. 9A, a vehicle 790 comprises: a support component 786; a computer 904; a plurality of wheels; motors configured to drive rotations of some of the wheels; a rechargeable battery 791; a plurality of container holders 785a, 785b and 785c wherein each container holder 785a, 785b or 785c is rotationally symmetrical with a vertical axis. Each container holder 785a, 785b or 785c is configured to hold an ingredient container 81 of a specific diameter. Each container holder 785a on a vehicle 790 may hold an ingredient container 81 so that the movement of said ingredient container may be restricted or limited when the vehicle 790 is moving.

It should be noted that the vehicle 790 may move on a pair of curved rail tracks whose widths are smaller than the widths of straight rail tracks. The vehicle 790 can carry and transport a plurality of ingredient containers. When the vehicle 790 moves, it can transport the ingredient containers held by the container holders of the vehicle.

It should be noted that the any of container holders in the vehicle 790 may be substituted by a solid shape which can position or hold an ingredient container.

Referring to FIG. 9A, a transport system 302 comprises tracks each comprising pairs of mini-rails 331 and a plurality of vehicles 790. Each mini rail 331 of the transport system 302 is fixedly connected to the floor of the building or the ground. The vehicle 790 and the container holders 785a on the vehicle 790 may move along the mini-rails 331. The transport system 302 is configured to transfer the ingredient containers. The computer 904 is connected to the computer system 99 of FIG. 1 via a wireless communication device 788, and the computer system 99 is configured to control the timing and speed of the vehicle 790.

See U.S. patent application Ser. Nos. 16/517,705 and 16/997,933 for more details of the vehicle 790. The entire contents of these applications are hereby incorporated herein.

Figure 9B:
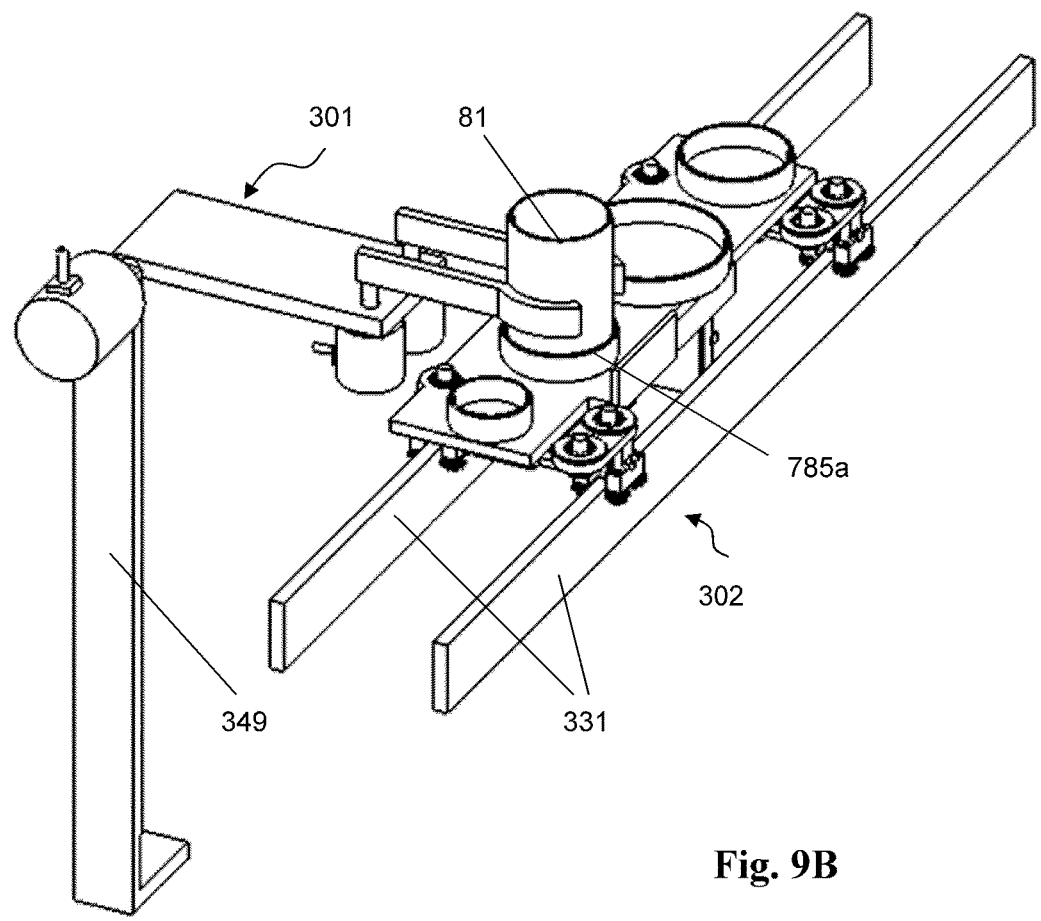
FIG. 9B shows an aerial view of some tracks, a vehicle on the tracks and the ingredient dispensing apparatus of FIG. 6A.

Referring to FIG. 9B, a vehicle 790 in the transport system 302 may move an ingredient container 81 to a dispensing position relative to the support component 349 of the ingredient dispensing apparatus 301. Then the rigid component 345 of the gripping mechanism 311 may be rotated to the first end-position relative to the support component 349 while the grippers 341a and 341b are kept at their second end-positions, and then, the grippers 341a and 341b are rotated to their first end-position to grip the ingredient container 81.

Figure 10:
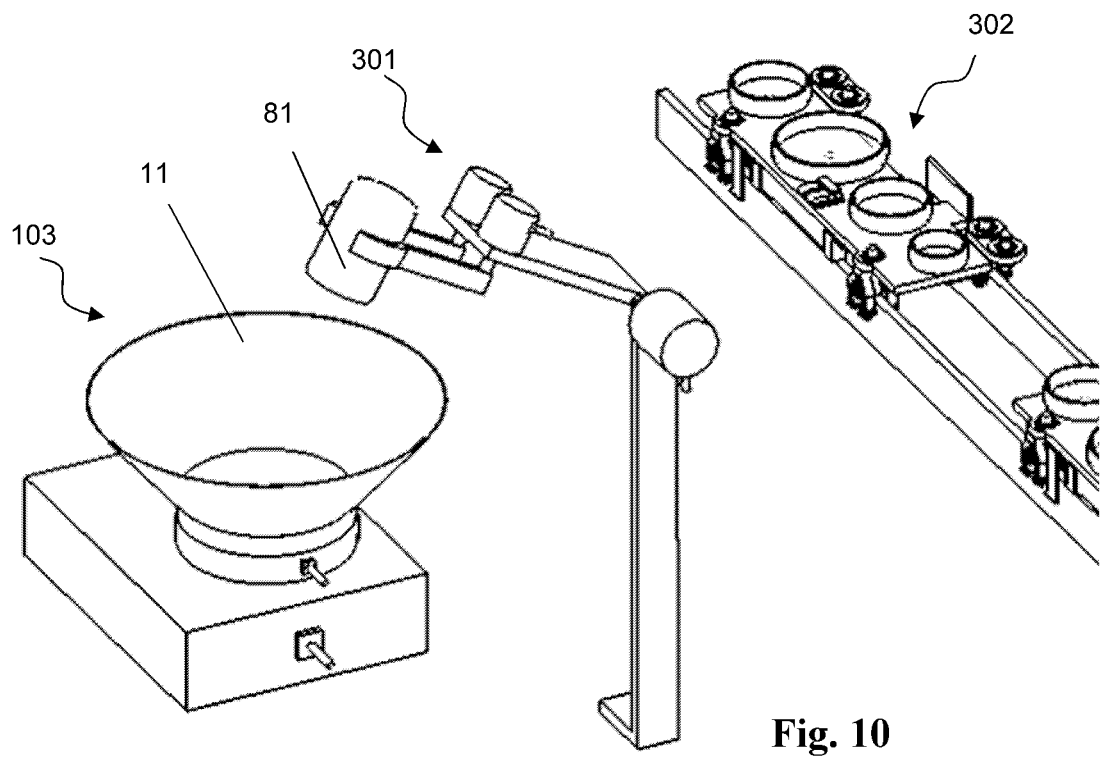
FIG. 10 shows an aerial view of the relative positions of the cooking apparatus of FIG. 3A, the ingredient dispensing apparatus of FIG. 6A and the transport system of FIG. 9A.

FIG. 10 shows the relative positions of the cooking apparatus 103, the ingredient dispensing apparatus 301 and the transport system 302. A vehicle 790 of the transport system 302 moves an ingredient container 81, which contains food or food ingredients, to a dispensing position relative to the support component 349 of the ingredient dispensing apparatus 301. The rigid component 345 of the ingredient dispensing apparatus 301 may be rotated to the first end-position, and then the grippers 341a and 341b can move to their first end-positions to grip the ingredient container 81. Then the rigid component 345 is rotated to the second end-position, to dispense the food or food ingredients from the ingredient container 81 into the cookware 11 of the cooking apparatus 103. The ingredient dispensing apparatus 301 is configured to dispense virtually the entire contents held in the ingredient container 81 into the cookware 11; an exception may be a very small quantity of ingredients which are undesirably stubbornly sticking to a surface of the ingredient container 81 and this small quantity of ingredients will be waste. Afterwards, the rigid component 345 is rotated back to the first end-position, and after that, the grippers 341a and 341b can move to their second end-positions to release the emptied container 81, to be placed on a container holder 785a of the vehicle 790. It should be noted that the vehicle 790 is braked by brakes during the time of the above procedures.

Figure 11:
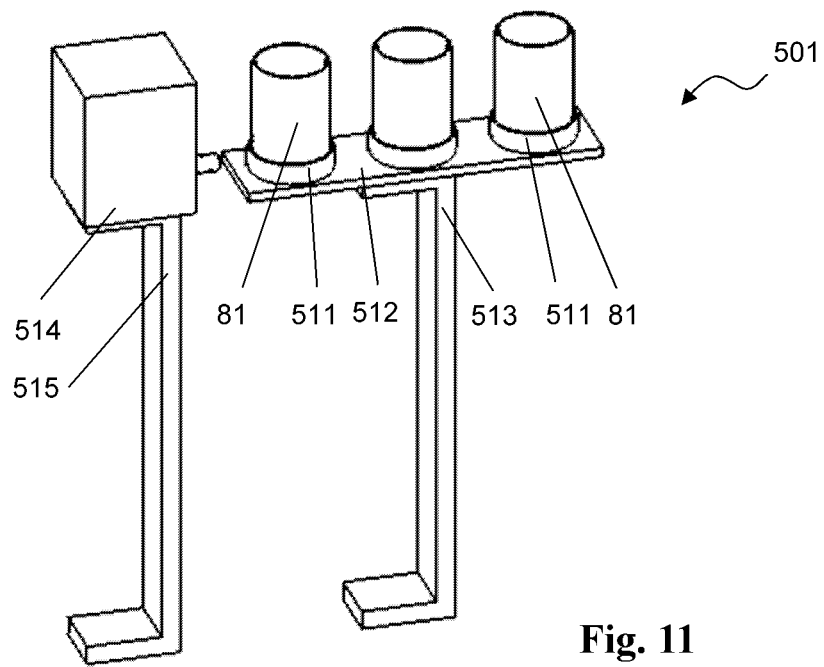
FIG. 11 shows an aerial view of a storage which can store ingredient containers.

Referring to FIG. 11, a storage 501 comprises: a plurality of container holders 511; and a support component 512; wherein each container holder 511 is configured to position or hold one or more ingredient containers 81. Each container holder 511 is fixedly connected to the support component 512. The support component 512 is fixedly connected to the floor of the building or the ground by a rigid connector 513. The storage 501 also comprises a refrigeration mechanism 514 configured to refrigerate the ingredient containers 81 to keep the food ingredient in the ingredient containers fresh. The refrigeration mechanism 514 is fixedly connected to the floor of the building or the ground by a rigid connector 515.

Note that the storage 501 may be substituted by the storage system 560 of FIGS. 20A-24 of U.S. patent application Ser. No. 16/517,705 and similar storage systems disclosed in U.S. patent application Ser. No. 16/997,933. The entire contents of the application are incorporated herein by reference.

Figure 12:
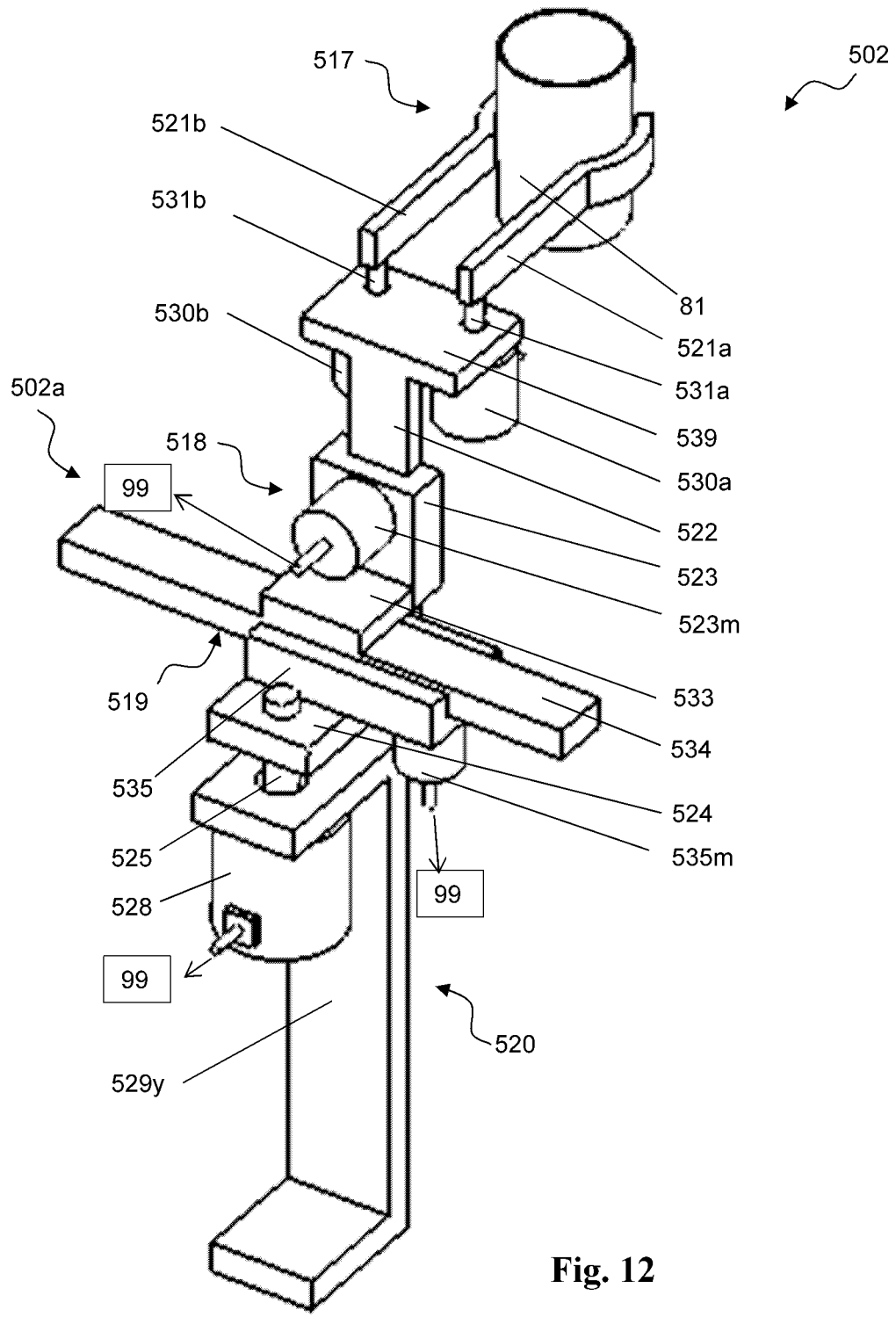
FIG. 12 shows an aerial view of a transfer apparatus.
Figure 13A:
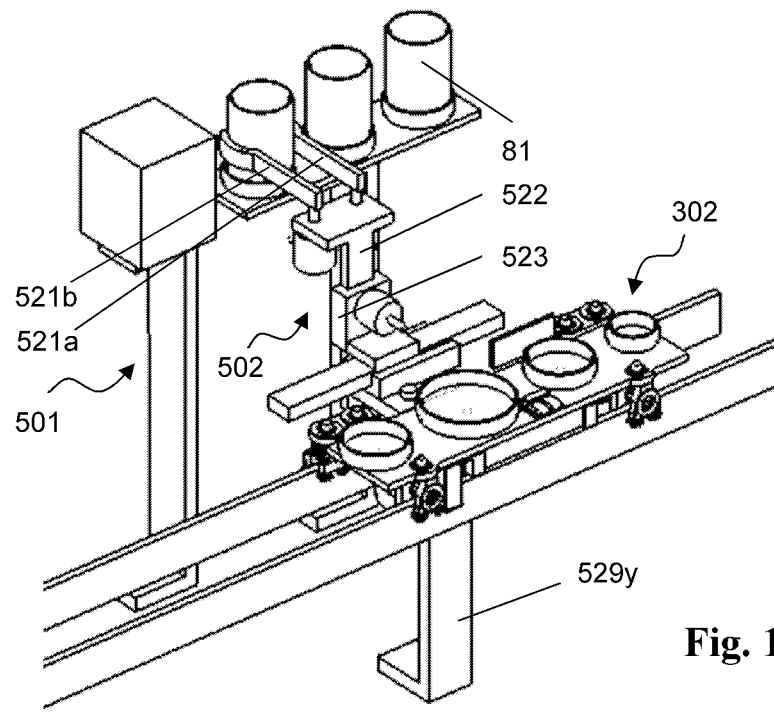
FIGS. 13A-13D show aerial views of the relative positions of the storage of FIG. 11, the transfer apparatus of FIG. 12, and the transport system of FIG. 9A.
Figure 13B:
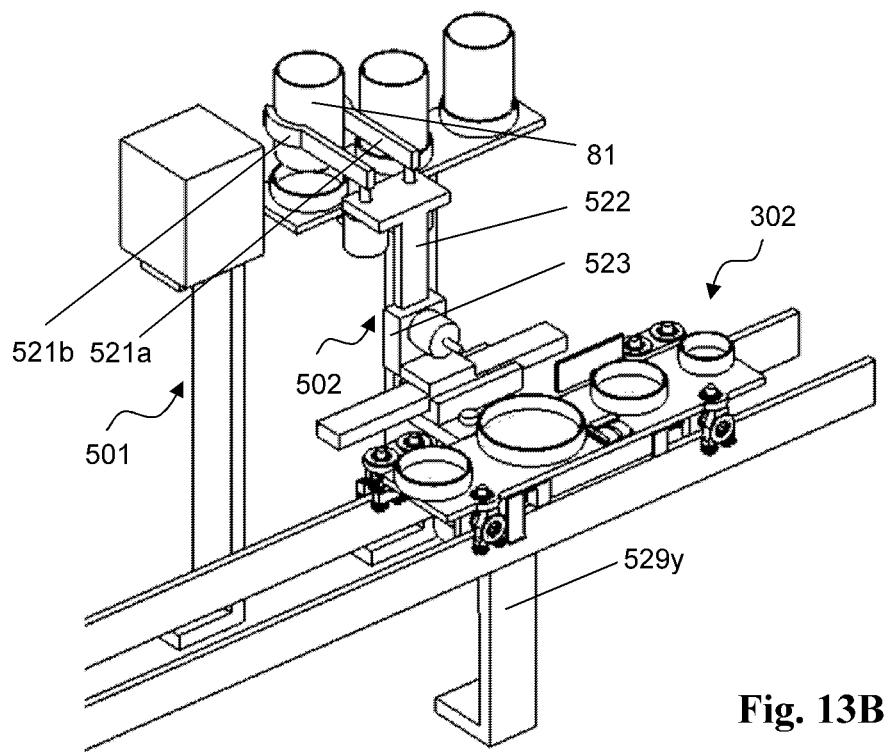
Figure 13C:
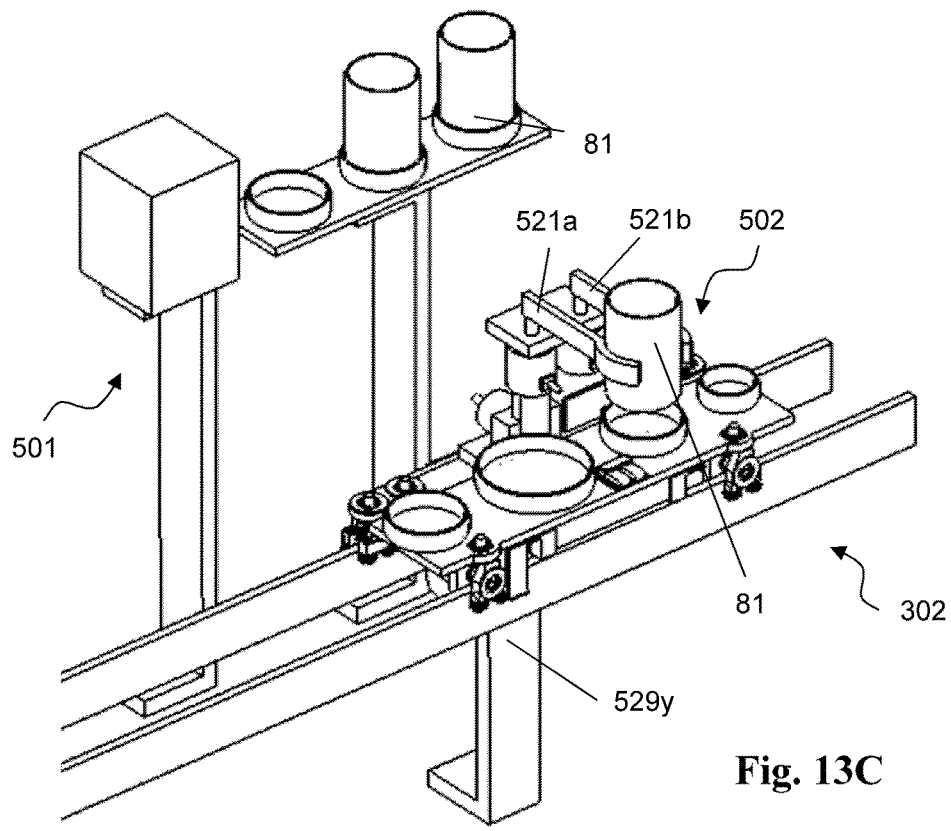
Figure 13D:
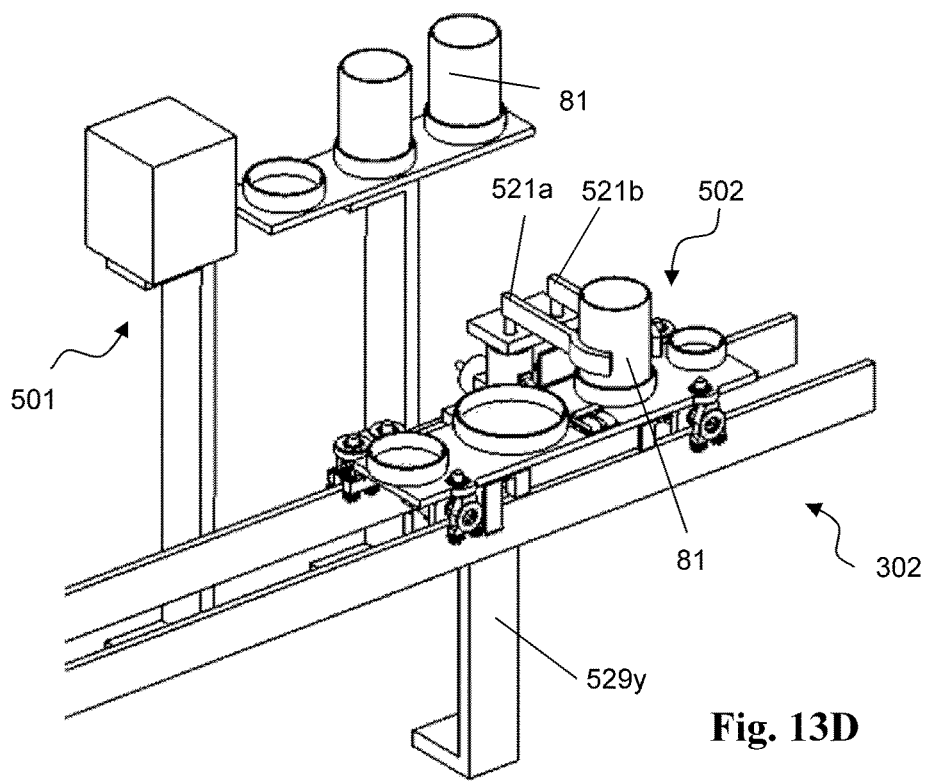

Referring to FIG. 12, a transfer apparatus 502 comprises a gripping mechanism 517 comprising: a rigid component 539 referred to as a support component; grippers 521a and 521b which can optionally be rigid or elastic components; shafts 531a and 531b; motors 530a and 530b. Each of the motors 530a and 530b comprises a base component which is fixedly connected to the rigid component 539. The gripper 521a is rigidly or fixedly connected to the shaft 531a. The motor 530a can produce a rotation of the shaft 531a and hence of the gripper 521a around the axis of the shaft 531a relative to the rigid component 539. Similarly, the gripper 521b is rigidly or fixedly connected to the shaft 531b. The motor 530b can produce a rotation of the shaft 531b and hence of the gripper 521b around the axis of the shaft 531b relative to the rigid component 539. The motors 530a and 530b are configured to rotate the respective grippers 521a and 521b anti-synchronously around a pair of parallel axes. The gripper 521a or 521b is rotated between two end-positions. At some first end-positions, the grippers 521a and 521b may grip an ingredient container 81 when the ingredient container is placed in a certain position relative to the rigid component 539. At some second end-positions, the grippers 521a and 521b can release the ingredient container 81.

The transfer apparatus 502 further comprises a motion mechanism 502a comprising: a vertical motion mechanism 518; a linear motion mechanism 519; and a rotational motion mechanism 520. Said vertical motion mechanism 518 comprises a stationary member 523; a moving member 522 which is constrained to move vertically relative to the stationary member 523; and a motor 523m configured to drive a motion of said moving member relative to said stationary member. Said linear motion mechanism 519 comprises a stationary member 535; a moving member 534 which is constrained to move linearly relative to the stationary member 535; and a motor 535m configured to drive a motion of said moving member relative to said stationary member. Said rotational motion mechanism 520 comprises: a rigid component 529y referred to as a stationary member; a shaft 525 referred to as a moving member which is constrained to rotate relative to the stationary member 529y; and a motor 528 configured to drive a rotation of said moving member relative to said stationary member. The rigid component 539 of the gripping mechanism 517 is fixedly or rigidly connected to the moving member 522, so that the vertical motion mechanism 518 is configured to produce a vertical motion of the moving member 522 and the rigid component 539. A connector 533 fixedly or rigidly connects the stationary member 523 and the moving member 534, so that the linear motion mechanism 519 is configured to produce a linear motion of the moving member 534 and the stationary member 523 between two end-positions. A connector 524 fixedly or rigidly connects the shaft 525 and the stationary member 535 so that the rotational motion mechanism 520 can produce a rotation of the shaft 525 and the stationary member 535 between two end-positions. The transfer apparatus 502 can grip one or more ingredient containers 81, move them to another position, and then release them to place them at the "other position." The motors 530a, 530b, 523m, 535m, and 528 are all connected to the computer system 99 of FIG. 1, so that the computer system 99 may control timings and speeds of their produced motions. The rigid component 629y may be referred to as the support component of the transfer apparatus 502.

FIGS. 13A-13D show the relative positions of the storage apparatus 501, the transfer apparatus 502 and the transport system 302. If a vehicle 790 of the transport system 302 moves to a certain position relative to the support component 529y of the transfer apparatus 502, if the shaft 525 (or the horizontal motion mechanism 519) is at a first end-position of the shaft 525 in the rotation produced by the motion mechanism 520, if the moving member 522 is at a lower end-position in the vertically linear sliding produced by the vertical motion mechanism 518, if the moving member 534 is moved to a certain position by the horizontal motion mechanism 519, and if an ingredient container 81 (which contains food or food ingredients and which is at an upright position) is at a certain position relative to the support component 529y, the grippers 521a and 521b can be moved to their first end-positions to grip the ingredient container (see FIG. 13A). Then, the moving member 522 is moved to an upper end-position while the ingredient container is being gripped by the grippers 521a and 521b (see FIG. 13B). Then, the shaft 525 and the stationary member 535 of the horizontal motion mechanism 519 are rotated by the motor 528 to a second end-position while the ingredient container is being gripped by the grippers 521a and 521b (see FIG. 13C). Then, the moving member 522 is moved to the lower end-position and then, the grippers 521a and 521b, when rotated to their second end-positions, may release the ingredient container to a container holder 785a of a vehicle 790 (see FIG. 13D). The computer system 99 may control the timing and speed of the motor 528, the horizontal motion mechanism 519 and the vertical motion mechanism 518. It should be noted that the vehicle 790 is braked during the time of the above procedures.

Figure 14:
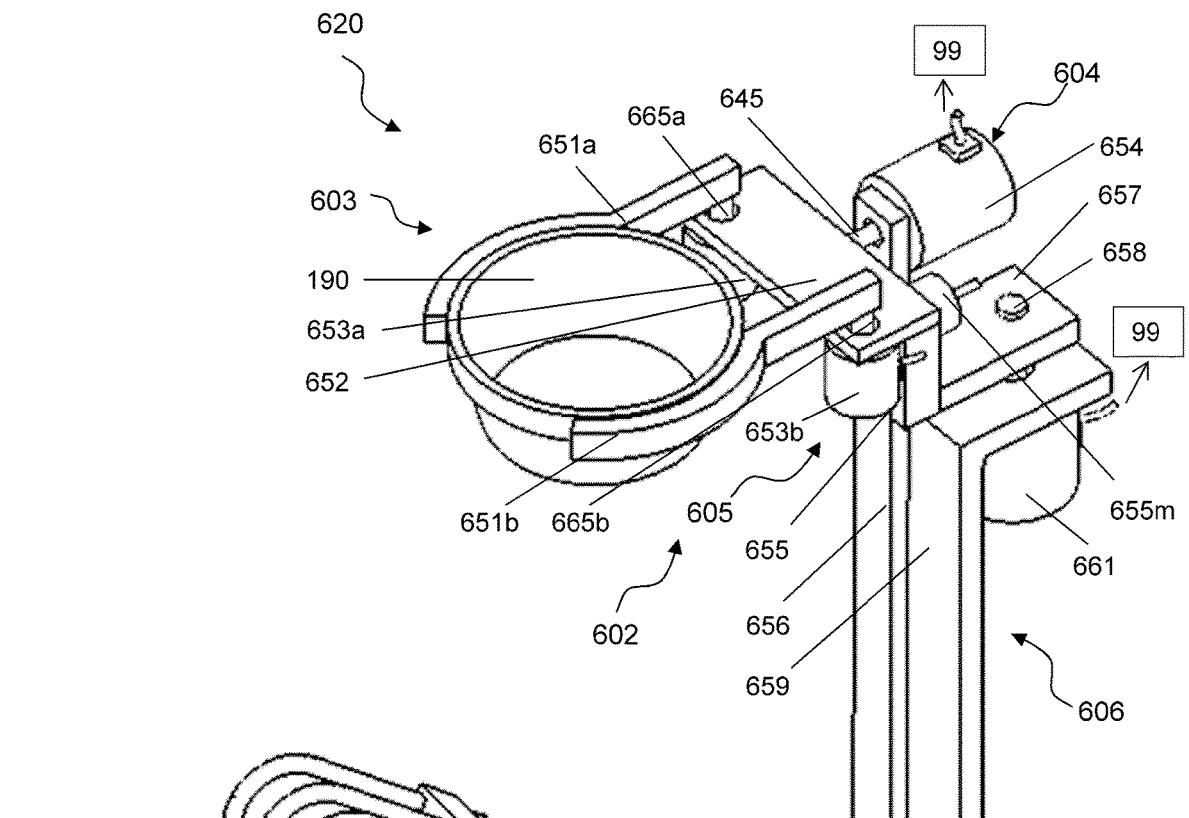
FIG. 14 shows an aerial view of a food dispensing apparatus.

Referring to FIG. 14, a food dispensing apparatus 620 comprises a gripping mechanism 603 comprising: a rigid component 652 referred to as a support component; grippers 651a and 651b which can optionally be rigid or elastic components; shafts 665a and 665b; motors 653a and 653b. Each of the motors 653a and 653b comprises a base component which is fixedly connected to the rigid component 652. The gripper 651a is rigidly or fixedly connected to the shaft 665a. The motor 653a can produce a rotation of the shaft 665a and hence of the gripper 651a around the axis of the shaft 665a relative to the rigid component 652. Similarly, the gripper 651b is rigidly or fixedly connected to the shaft 665b. The motor 653b can produce a rotation of the shaft 665b and hence of the gripper 651b around the axis of the shaft 665b relative to the rigid component 652. The motors 653a and 653b are configured to rotate the respective grippers 651a and 651b anti-synchronously around a pair of parallel axes. The gripper 651a or 651b is rotated between two end-positions. At some first end-positions, the grippers 651a and 651b may grip a cooking container 190 under the condition that the cooking container is placed in a certain position relative to the rigid component 652. At some second end-positions, the grippers 651a and 651b can release the cooking container 190. Here and in the following, a cooking container 190 is a container that can contain or otherwise hold food or food ingredients and it comprises a central (vertical) axis.

The food dispensing apparatus 620 further comprises motion mechanism 602 comprising: a rotational motion mechanism 604 referred to as a first motion sub-mechanism; a vertical motion mechanism 605 referred to as a second motion sub-mechanism; and a rotational motion mechanism 606 referred to as a third motion sub-mechanism. Said rotational motion mechanism 604 comprises: a shaft 645 referred to as a moving member, wherein the shaft 645 comprises a horizontal axis; and a motor 654 configured to drive a rotation of said shaft 645, wherein the motor 654 comprises a base component. Said vertical motion mechanism 605 comprises a stationary member 655; a moving member 656 which is constrained to move vertically relative to the stationary member 655; and a motor 655*m* configured to drive a motion of said moving member relative to said stationary member. Said rotational motion mechanism 606 comprises: a rigid component 659 referred to as a stationary member; a shaft 658 referred to as a moving member which is constrained to rotate relative to the stationary member around the axis of the shaft 658, wherein the shaft 658 comprises a vertical axis; and a motor 661 configured to drive a rotation of said moving member relative to said stationary member. The rigid component 652 of the gripping mechanism 603 is rigidly, fixedly, or otherwise connected to the shaft 645 so that the rotational motion mechanism 604 can produce a rotation of the shaft 645 and the rigid component 652 between two end-positions relative to the base component of the motor 654; wherein at the first end-position, the cooking container 190 gripped by the gripping mechanism 603 is in the upright position; wherein at the second end-position, the cooking container 190 gripped by the gripping mechanism 603 is turned through about 180 degrees to dispense the food or food ingredients into the cookware 11. The base component of the motor 654 is rigidly, fixedly, or otherwise connected to the moving member 656 so that the vertical motion mechanism 605 can produce a vertical motion in the moving member 656 and components attached to it between two end-positions. A connector 657 is rigidly, fixedly, or otherwise connected to the shaft 658 of the rotational motion mechanism 606 and the stationary member 655 so that the rotational motion mechanism 606 can produce a rotation of the connector 657 and components attached on it between two end-positions. The rigid component 659 is fixedly connected to the base component of the motor 661 and the floor of the building or the ground. The food dispensing apparatus 620 is configured to grip a cooking container 190 and transfer it via a combination of vertical motion, linear motion and rotational motion to another position. The motor 653*a*, 653*b*, 654, 655*m* and 661 are all connected to the computer system 99 of FIG. 1, so that the computer system 99 may control timings and speeds of their produced motions. The rigid component 659 may be referred to as the support component of the food dispensing apparatus 620.

Figure 15:
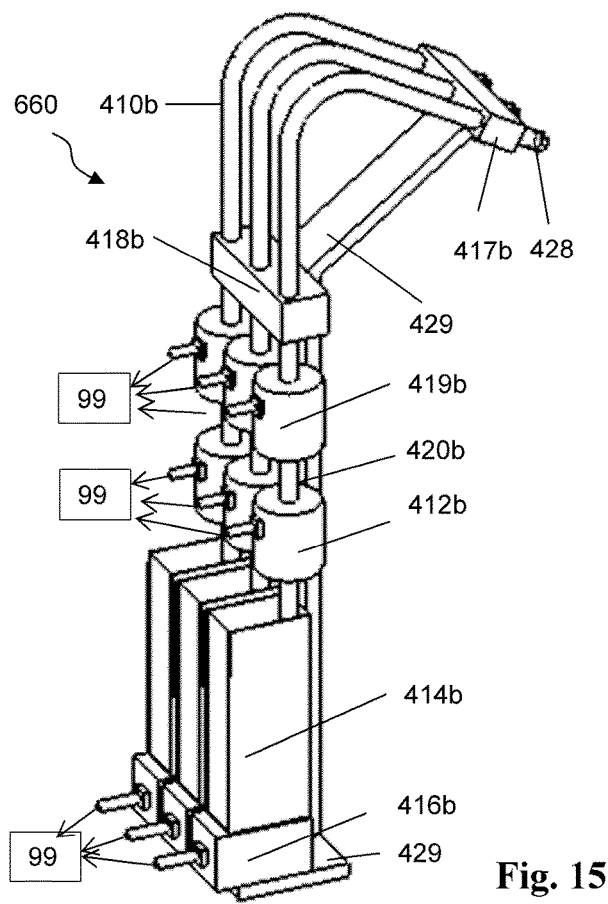
FIG. 15 shows an aerial view of a liquid dispensing apparatus.

Referring to FIG. 15, a liquid dispensing apparatus 660 comprises: a plurality of sprayers 428; a plurality of liquid pipes 410*b*, 420*b*; a plurality of liquid containers 414*b*; and a rigid component 429 referred to as a support component. Each liquid container 414*b* is configured to hold a liquid ingredient, e.g., cooking oil, vinegar, or water. Each liquid pipe 410*b* connects a sprayer 428 to a corresponding liquid pipe 420*b* and each liquid pipe 420*b* is inserted into a corresponding liquid container 414*b*, and a pump 412*b* which can pump liquid contained in the liquid container 414*b* to the outlet of the sprayer 428 wherein the liquid flow may be measured by a flowmeter 419*b*. Each liquid container 414*b* is positioned on an electronic scale 416*b* which can weigh the corresponding liquid container 414*b*. Connectors 417*b* and 418*b* are configured to fixedly connect the liquid pipes 410*b* to improve stability of the pipes. The connectors 417*b*, 418*b* and the base of each electronic scale 416*b* are all fixedly connected to the rigid component 429. The pumps 412*b*, flowmeters 419*b*, and electronic scales 416*b* are connected by wired or wireless means to the computer system 99 of FIG. 1, so that the computer system may control the timing and amount of liquid to be drawn from the corresponding liquid container. The liquid dispensing apparatus 660 can be used to dispense a liquid ingredient contained in a liquid container 414*b* into a cookware or cooking container.

Figure 16A:
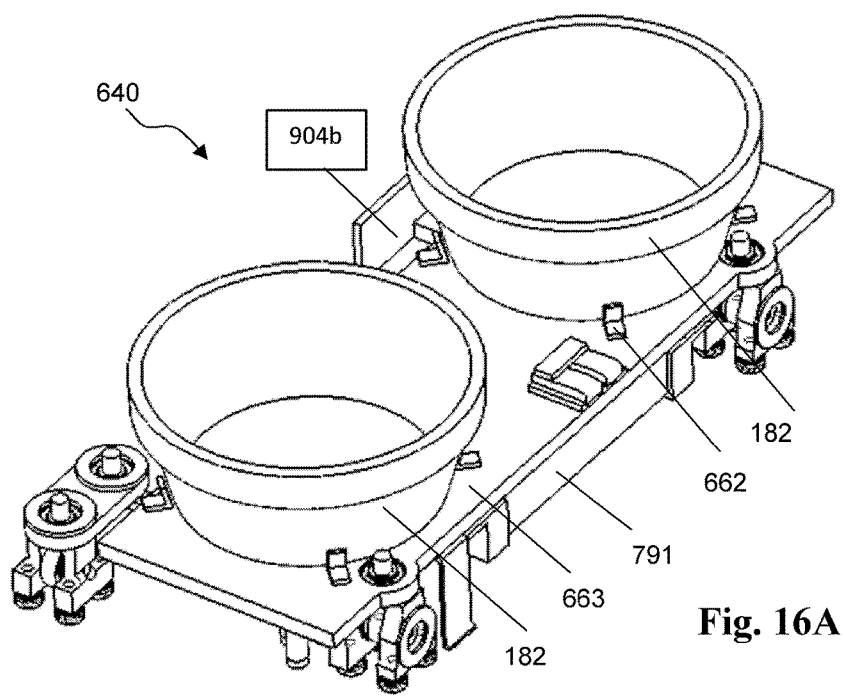
FIG. 16A shows an aerial view of a vehicle.

Referring to FIG. 16A, a vehicle 640 is similarly configured as the vehicle 790 except that: the support component 786 is substituted by a support component 663; the round container holders 785*a*, 785*b* and 785*c* are substituted by a plurality of container holders 662; and the computer 904 is substituted by a computer 904*b*. The other part numbers in the vehicle 640 are the same as the corresponding part numbers in the vehicle 790. The container holders 662 are configured to hold a food container 182 so that the movement of said food container 182 may be restricted or limited when the vehicle is moving. The computer 904*b* may control the operations of the electrical or electronic devices of the vehicle 640 by sending signals to said devices. The computer 904*b* may communicate with the computer system 99 of FIG. 1 via a wireless communication device.

Figure 16B:
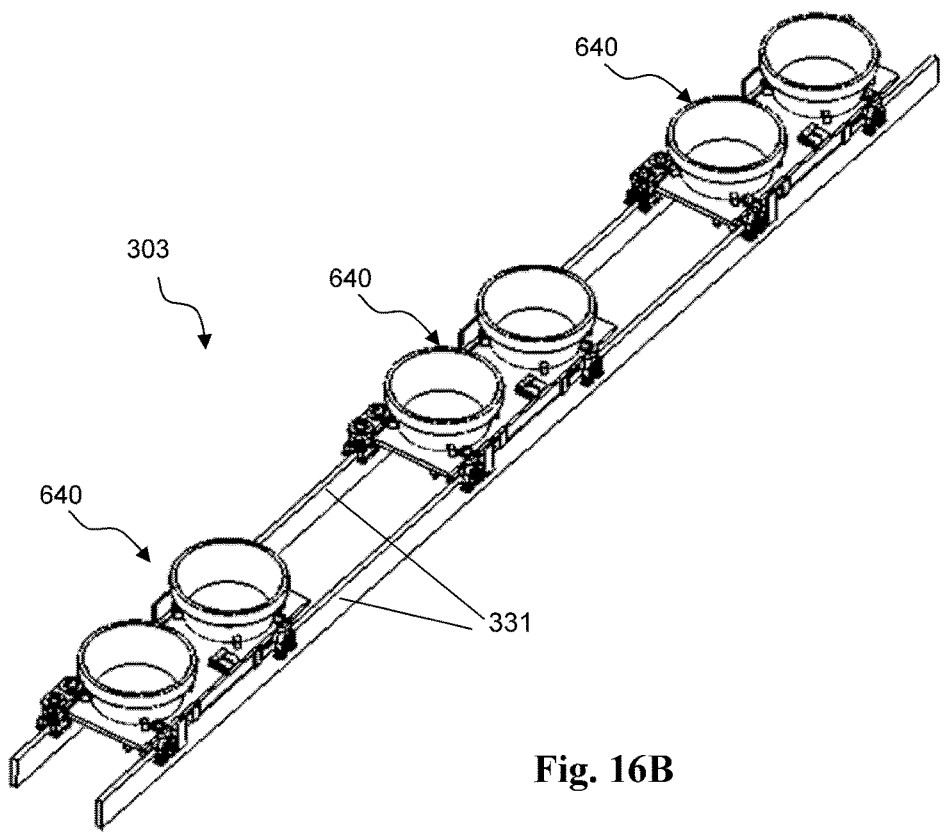
FIG. 16B shows an aerial view of a transport system comprising the vehicle of the FIG. 16A.

Referring to FIG. 16B, a transport system 303 comprises tracks each comprising pairs of mini rails 331 and a plurality of vehicles 640. Each mini rail 331 is fixedly connected to the floor of the building or the ground. The vehicles 640 and the food containers 182 held by the container holders 662 on the vehicles 640 may move along the mini-rails 331. The transport system 303 can transfer the food containers 182. The computer 904*b* is connected to the computer system 99 of FIG. 1 via wireless means, so that the computer system 99 may control the timing and speed of the vehicles 640.

It should be noted that the vehicles 640 may comprise additional components for the purpose of staying on the tracks.

It should be noted that the transport system 303 may comprise track switch mechanisms. The vehicles 640 may move on different mini-rails by means of a track switch mechanism.

Figure 17A:
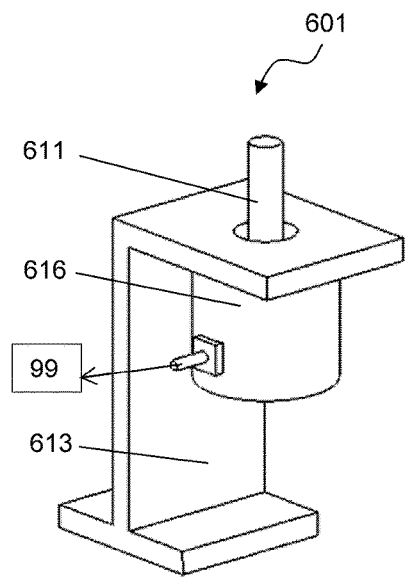
FIG. 17A shows an aerial view of a rotational motion mechanism.

Referring to FIG. 17A, a rotational motion mechanism 601 comprises: a support component 613; a shaft 611 (as a moving member) which is constrained to rotate relative to the support component 613 around the axis of the shaft 611; and a motor 616 which is configured to drive an intermittent rotation of the shaft 611 relative to the support component 613. The shaft 611 is rotated by the motor 611 from one angular position to another among a plurality of angular positions. The motor 616 is connected to the computer system 99 of FIG. 1 via wires, and the computer system 99 is configured to control the timing and speed of the motion of the motor 616. The axis of the shaft 611 is configured to be vertical or nearly vertical. The support component 613 is optionally fixedly connected to a building floor or to the ground.

Figure 17B:
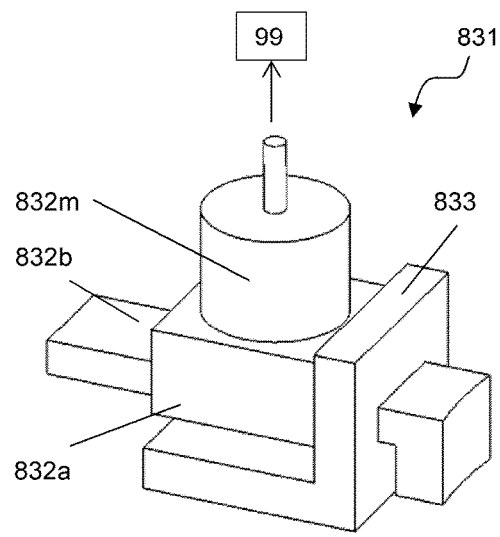
FIG. 17B shows an aerial view of a locking mechanism.

Referring to FIG. 17B, a locking mechanism 831 comprises: a stationary member 832*a*; a moving member 832*b* which is constrained to move linearly relative to the stationary member 832*a*; a motor 832*m* configured to drive a motion of said moving member relative to said stationary member; and a support component 833. The stationary member 832*a* is fixedly or rigidly connected to the support component 833, so that the motor 832*m* can drive a motion of the moving member 832*b* relative to the support component 833 between two end-positions: a first end-position and a second end-position. The motor 832*m* is connected to the computer system 99 of FIG. 1 via wires, so that the computer system 99 may control the timing and speed of the motor.

Figure 18A:
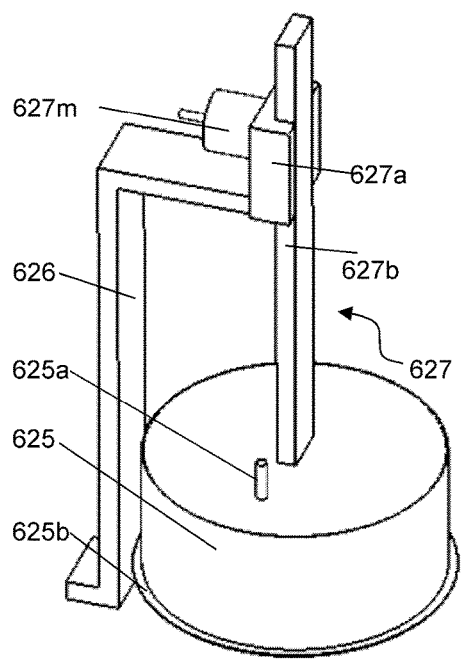
FIGS. 18A-18B show aerial views of an enclosure mechanism.
Figure 18B:
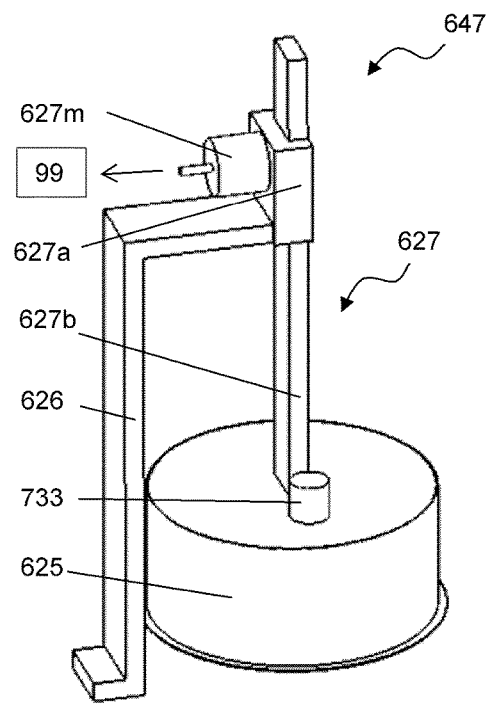

Referring to FIGS. 18A-18B, an enclosure mechanism 647 comprises: an enclosure component comprising a cap 625 with an edge 625*b*; a linear actuator 627; and a pressure limiting cap 733. The linear actuator 627 comprises: a base component 627*a*; a moving member 627*b* which is constrained to move vertically relative to the base component 627*a* between two end-positions; and a motor 627*m* configured to drive a motion of the moving member 627*b* relative to the base component 627*a*. The base component 627*a* is fixedly connected to a rigid component 626; and the moving member 627*b* is rigidly or fixedly connected to the cap 625, so that the linear actuator 627 can move the cap 625 vertically relative to the rigid component 626 between two end-positions: a first end-position which is lower; and a second end-position which is higher. The pressure limiting cap 733 is placed on an outlet 625*a* of the cap 625 and it covers the outlet 625*a* due to gravity. The linear actuator 627 is connected to the computer system 99 of FIG. 1 via wire or wireless, so that the computer system 99 may control timings and speeds of its produced motion.

The cap 625 is configured to help enclose a cooking chamber in the sense that the cap together with some other components (which may be outside of the enclosure mechanism 647) are configured to enclose the cooking chamber. The pressure limiting cap 733 is used to limit air flow out of the outlet 625*a* from the cooking chamber to maintain the pressure of the air or steam inside the cooking chamber. The steam with higher pressure can heat the food or food ingredients positioned in the cooking chamber faster. On the other hand, if the pressure in said cooking chamber is higher than a certain limit, then air can escape from the enclosed space through the outlet 625*a*, pushing the pressure limiting cap 733 up. Thus, the pressure limiting cap 733 can keep the pressure in said cooking chamber within a certain range.

Figure 18C:
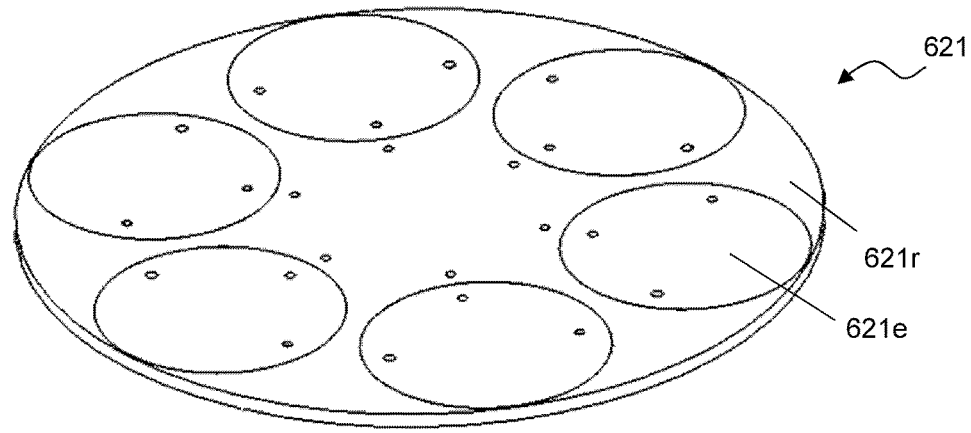
FIG. 18C shows a rotatable component.

Referring to FIG. 18C, a rotatable component 621 comprises a rigid component 621*r* and a plurality of first enclosure components 621*e* which are fixedly connected to the rigid component 621*r*. Each first enclosure component 621*e* comprises heat insulating material.

The cap 625 in the enclosure mechanism 647 (of FIG. 18A-18B) may be referred to as a second enclosure component.

Figure 18D:
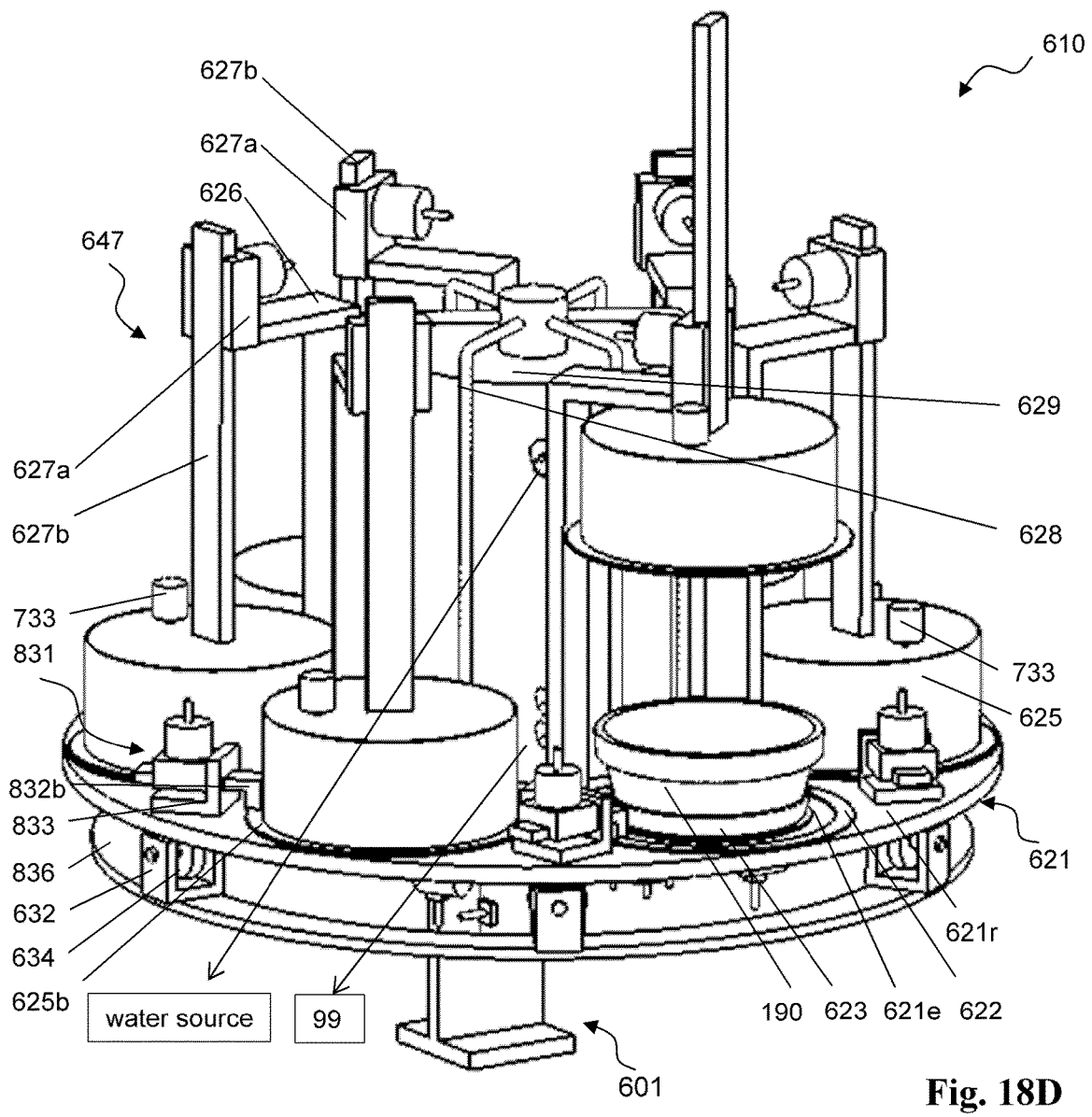
FIGS. 18D-18E show aerial views of a cooking apparatus comprising the rotational motion mechanism of FIG. 17A, a plurality of locking mechanisms of FIG. 17B, a plurality of enclosure mechanisms of FIGS. 18A-18B, and the rotatable component of FIG. 18C.
Figure 18E:
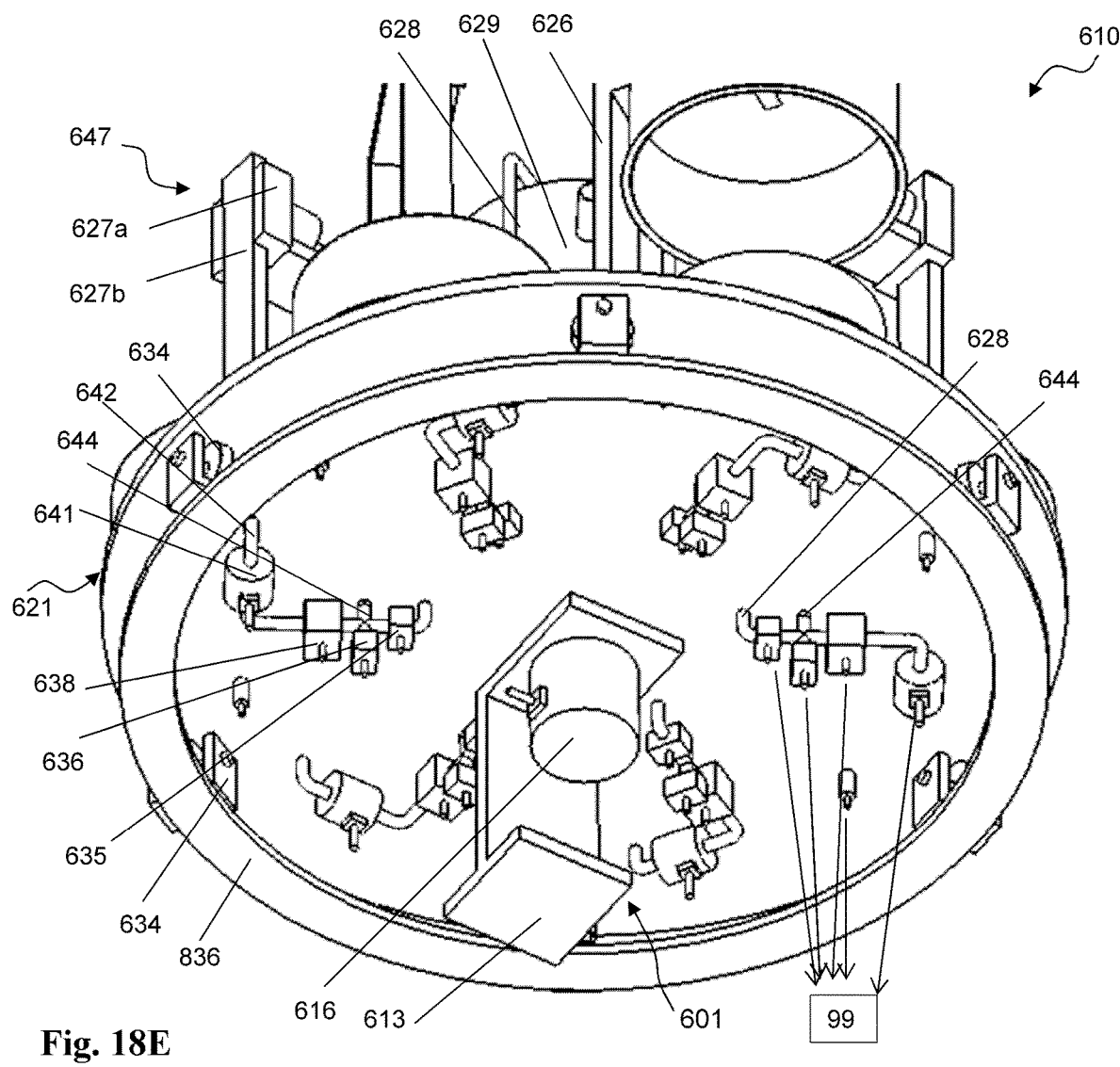

Referring to FIGS. 18D-18E, a cooking apparatus 610 comprises: a rotatable component 621 (as in FIG. 18C); and a rotational motion mechanism 601 (as in FIG. 17A). The shaft 611 of the rotational motion mechanism 601 is fixedly connected to the rigid component 621*r* of the rotatable component 621 so that the rotational motion mechanism 601 may produce an intermittent rotational motion of the rotatable component 621 around the axis of the shaft 611 wherein the axis of the shaft 611 is vertical. The rotatable component 621 may comprise a turntable but this is not a requirement.

A plurality of wheels 634 are mounted on a plurality of support components 632, which are rigidly or fixedly connected to a support component 836, and the support component 836 is optionally rigidly or fixedly connected to the floor of the building or the ground (the connection is not shown in figures but is easy to construct). The wheels 634 are used to touch and provide support to the rotatable component 621.

Corresponding to each first enclosure component 621*e* of the rotatable component 621, an enclosure mechanism 647 (as in FIGS. 18A-18B) is mounted on the rigid component 621*r* of the rotatable component 621, and a sealing ring 622 is fixedly connected to the first enclosure component 621*e*.

When the cap 625 of the enclosure mechanism 647 is moved to the first end-position (the lower position), the cap 625 touches on the corresponding sealing ring 622. The cap 625, the first enclosure component 621*e* of the rotatable component 621, and the sealing ring 622 are configured to enclose a cooking chamber. The sealing rings 622 comprise temperature resistant, elastic material. When the cap 625 is moved to the second end-position, the cooking chamber is opened.

A plurality of container holders 623 are fixedly connected to the rotatable component 621. Each container holder is positioned inside an above-described cooking chamber (when the corresponding cap 625 is at the first end-position); wherein the container holder 623 is configured to position or hold a cooking container 190 such that the movement of said cooking container 190 relative to the rotatable component 621 may be restricted or limited when the rotatable component is moved.

The cooking apparatus 610 further comprises: a steam generator 629; and a plurality of pipes 644 and 628 which connect the steam generator 629 to the interior of the above-described cooking chambers, such that (heated) steam can flow from the steam generator into the cooking chambers, wherein the steam flow to a said cooking chamber may be stopped or opened by a corresponding valve 635. Corresponding to each cooking chamber as described above, a pump 641 is configured to pump the air from the cooking chamber, through a corresponding pipe 642 (and through a corresponding pipe 644) and through a heater 638, then back into the cooking chamber, so that the air can be reheated by the heater 638. The steam in the cooking chamber can heat the food or food ingredients in the cooking container 190 in the cooking chamber to produce a semi-cooked food. Heat flow from said cooking chamber to the outside (other than the pipes shown in the figures) is limited or insulated. A pressure and temperature sensor 636 can detect the air pressure and temperature in the pipe 644 and hence in the cooking chamber.

The steam generator 629 comprises a water inlet which is connected to a water source by pipes. The steam generators 629, valves 635, pressure and temperature sensors 636, heaters 638, and air pumps 641 are connected by wires to the computer system 99 of FIG. 1, and the computer system 99 can control the steam generators 629, the heaters and air pumps, and can receive information from the pressure and temperature sensors 636.

A locking mechanism 831 (as in FIG. 17B) is used to brake the rotation of a cap 625 when the cap is moved to the first end-position (to enclose the corresponding cooking chamber). The support component 833 of the locking mechanism 831 is rigidly or fixedly connected to the rotatable component 621. As shown in FIG. 18D, when the cap 625 of an enclosure mechanism 647 is moved to the first end-position, the moving member 832*b* of the corresponding locking mechanism 831 may be moved to the first end-position to touch and press on the edge 625*b* of the cap 625. That way, the cap is firmly pressed onto the corresponding sealing ring 622, and the steam in the cooking chamber may not leak out from underneath the cap 625. If the moving member 832*b* is moved to the second end-position, the cap 625 can be rotated to open up the cooking chamber.

The support component 613 of the rotational motion mechanism 601 is referred to as to the (base) support component of the cooking apparatus 610.

It should be noted that the rotational motion mechanism 601 may produce an intermittent rotation of the rotatable component 621 and the accessories attached on it. The rotation angles may optionally be a constant.

It should be noted that the caps 625 may be substituted by other types of lids.

Figure 18F:
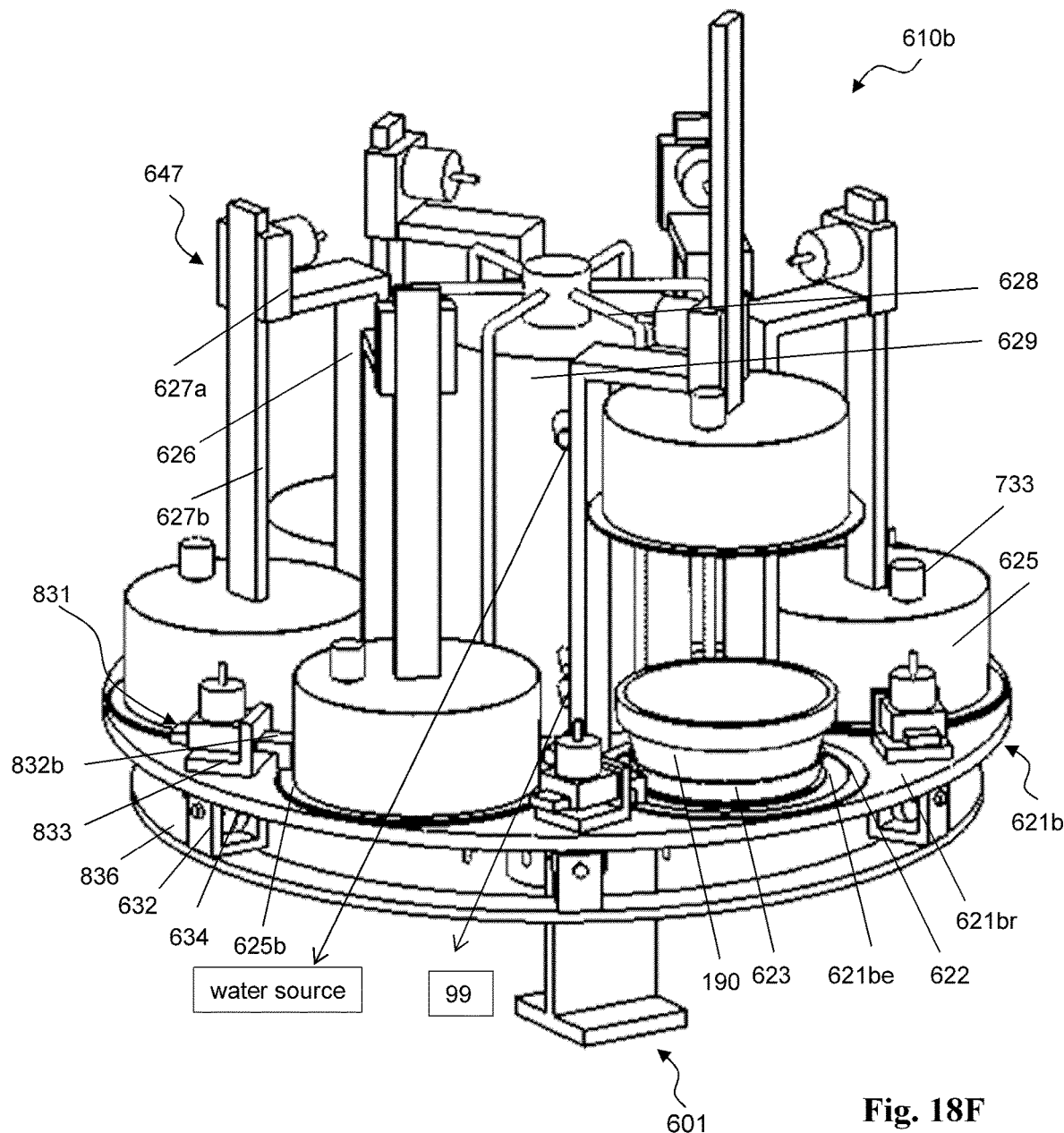
FIGS. 18F-18G show aerial views of another cooking apparatus.
Figure 18G:
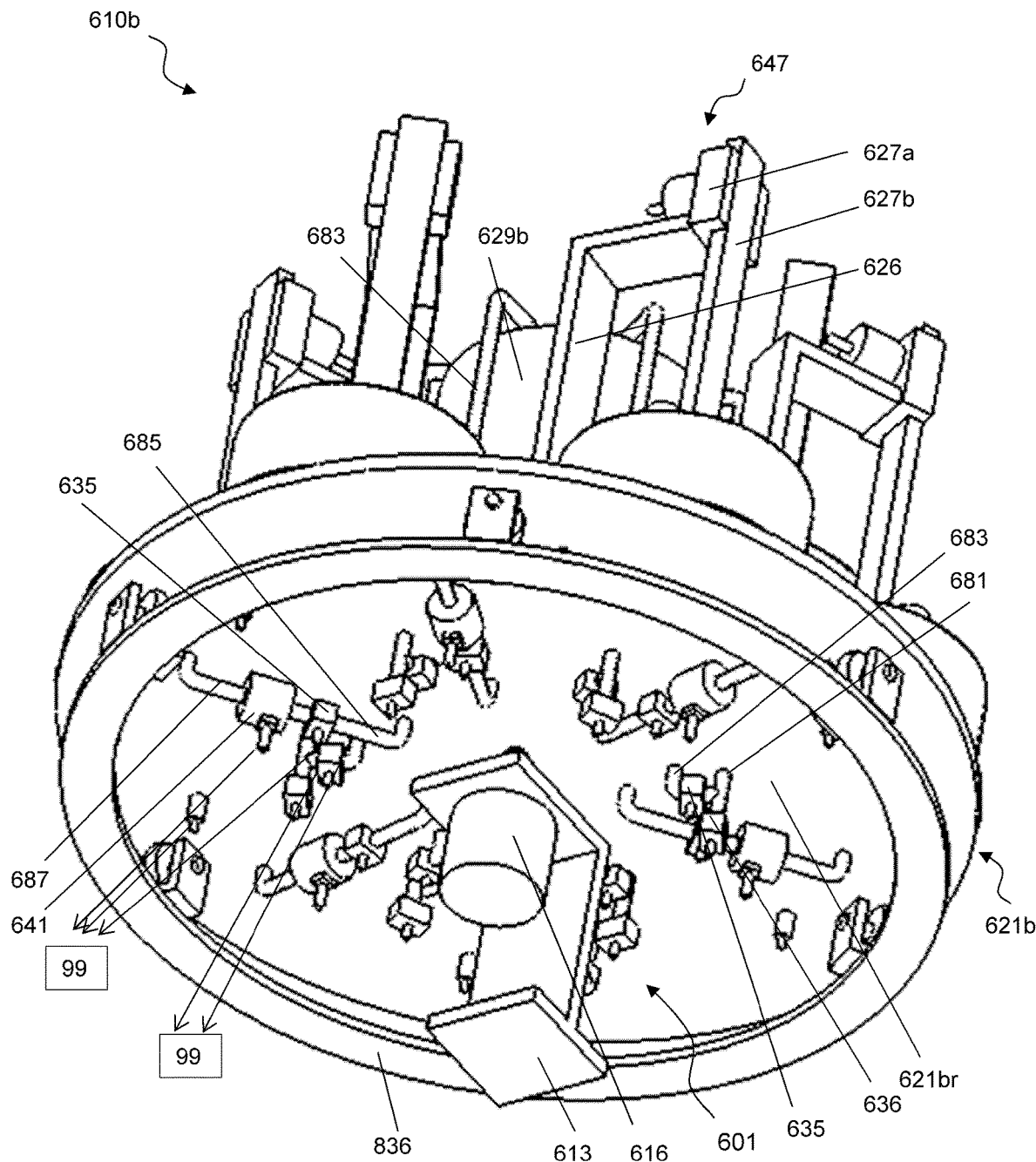

Referring to FIGS. 18F-18G, a cooking apparatus 610b is similarly configured as the cooking apparatus 610. The cooking apparatus 610b comprises: a rotatable component 621b; and a rotational motion mechanism 601 (as in FIG. 17A). The rotatable component 621b comprises a rigid component 621br and a plurality of first enclosure components 621be which are fixedly connected to the rigid component 621br. Each first enclosure component 621be comprises heat insulating material. The shaft 611 of the rotational motion mechanism 601 is fixedly connected to the rigid component 621br of the rotatable component 621b so that the rotational motion mechanism 601 may produce an intermittent rotational motion of the rotatable component 621b around the axis of the shaft 611 wherein the axis of the shaft 611 is vertical. The rotatable component 621b may comprise a turntable but this is not a requirement.

A plurality of wheels 634 are mounted on a plurality of support components 632, which are rigidly or fixedly connected to a support component 836; and the support component 836 is optionally rigidly or fixedly connected to the floor of the building or the ground (the connection is not shown in figures but is easy to construct). The wheels 634 are used to touch and provide support to the rotatable component 621b.

Corresponding to each first enclosure component 621be of the rotatable component 621b, an enclosure mechanism 647 (as in FIGS. 18A-18B) is mounted on the rigid component 621br of the rotatable component 621b, and a sealing ring 622 is fixedly connected to the first enclosure component 621be. When the cap 625 of the enclosure mechanism 647 is moved to the first end-position (the lower position), the cap 625 touches the corresponding sealing ring 622. The cap 625, the first enclosure component 621be of the rotatable component 621b, and the sealing ring 622 are configured to enclose a cooking chamber. The sealing rings 622 comprise temperature resistant, elastic material. When the cap 625 is moved to the second end-position, the cooking chamber is opened.

A plurality of container holders 623 are fixedly connected to the rotatable component 621b. Each container holder is positioned inside an above-described cooking chamber (when the corresponding cap 625 is at the first end-position); wherein the container holder 623 is configured to position or hold a cooking container 190 such that the movement of said cooking container 190 relative to the rotatable component 621b may be restricted or limited when the rotatable component is moved.

The cooking apparatus 610b further comprises: a steam generator 629b; and a plurality of pipes 681 and 683 which connect the steam generator 629b to the interior of the above-described cooking chambers, such that (heated) steam can flow from the steam generator into the cooking chambers; wherein the steam flow to a said cooking chamber may be stopped or opened by a corresponding valve 635. A pressure and temperature sensor 636 can detect the air pressure and temperature in a corresponding pipe 681 and hence in the corresponding cooking chamber. Corresponding to each cooking chamber as described above, a pump 641 can pump the air from the cooking chamber through corresponding pipes 687 and 685, and back into the steam generator 629b so the air can be reheated, wherein the air flow may be stopped or opened by a corresponding valve 635. The steam generator 629b comprises a water inlet which is connected to a water source by pipes. The steam generators 629b, valves 635, pressure and temperature sensors 636, and air pumps 641 are connected by wires to the computer system 99 of FIG. 1, and the computer system can control the steam generator 629b and pumps and can receive information from the pressure and temperature sensors 636

A locking mechanism 831 (as in FIG. 17B) is used to lock the rotation of each cap 625 when the cap is moved to the first end-position (to enclose the corresponding cooking chamber). The support component 833 of the locking mechanism 831 is rigidly or fixedly connected to the rotatable component 621b. As shown in FIG. 18F, when the cap 625 of an enclosure mechanism 647 is moved to the first end-position, the moving member 832b of the corresponding locking mechanism 831 may be moved to the first end-position to touch and press on the edge 625b of the cap 625. That way, the cap is firmly pressed onto the corresponding sealing ring 622; and the steam in the cooking chamber may not leak out from underneath the cap 625. If the moving member 832b is moved to the second end-position, the cap 625 can be rotated to open up the cooking chamber.

The support component 613 of the rotational motion mechanism 601 is referred to as to the (base) support component of the cooking apparatus 610b.

It should be noted that the rotational motion mechanism 601 may produce an intermittent rotation of the rotatable component 621b and the accessories attached on it. The rotation angles may optionally be a constant.

Figure 18H:
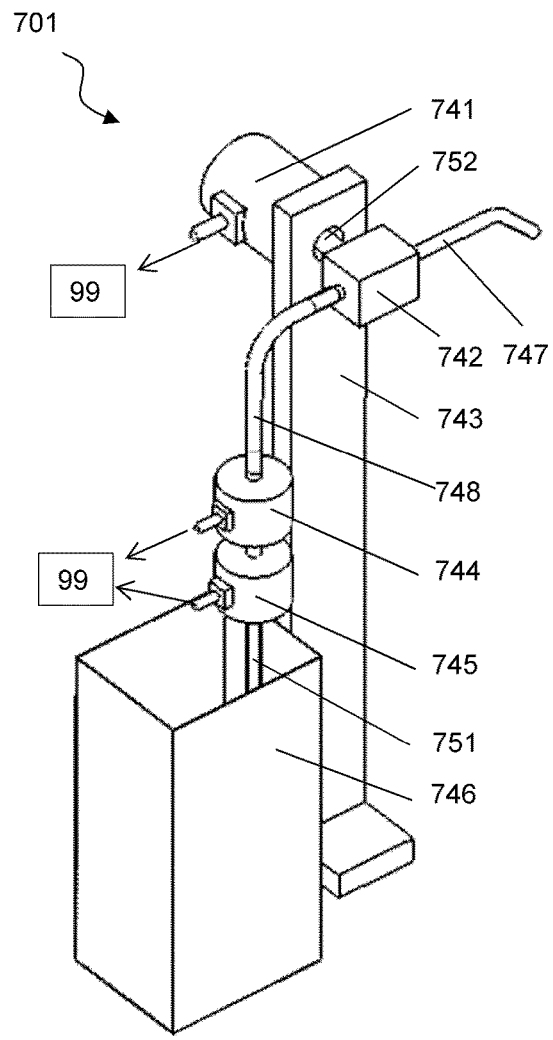
FIGS. 18H-18I show aerial views of a liquid dispensing apparatus.
Figure 18I:
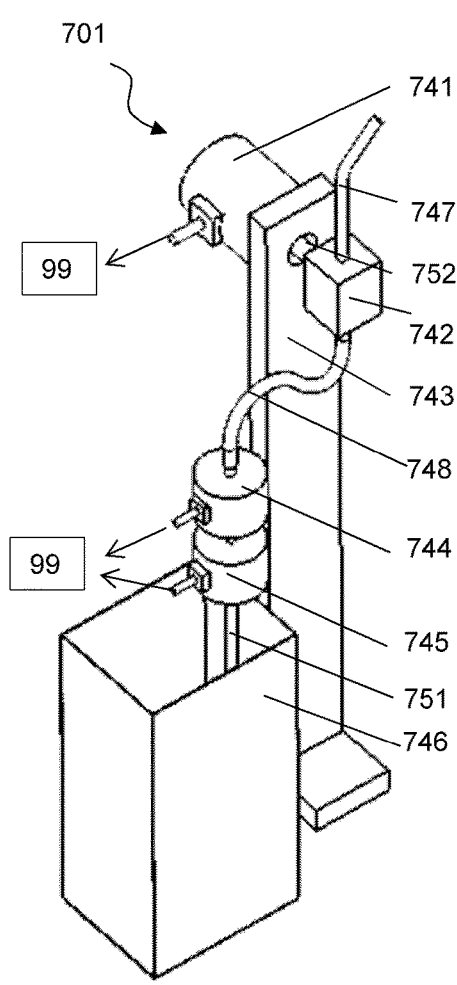

Referring to FIGS. 18H-18I, a liquid dispensing apparatus 701 comprises: a support component 743; a shaft 752, referred to as a moving member, which is constrained to rotate relative to the support component 743; and a motor 741 configured to drive a rotation of said moving member relative to said stationary member, wherein the motor 741 comprises a base component. The base component of the motor 741 is fixedly connected to the support component 743. A rigid component 742 is fixedly connected to the shaft 752. Thus, the rigid component 742 can be rotated with the shaft 752 by the motor 741 relative to the support component 743 around the axis of the shaft 752. The motor 741 is connected to the computer system 99 of FIG. 1, and the computer system 99 is configured to control timings and speeds of the motor 741.

The liquid dispensing apparatus 701 further comprises: inflexible pipes 747 and 751; a flexible pipe 748; and a liquid source 746. The pipe 751 is inserted into the liquid source 746. The flexible pipe 748 connects the pipe 747 to the pipe 751 and a pump 745 can pump liquid contained in the liquid source 746 to the outlet of the liquid pipe 747 wherein the liquid flow may be measured by a flowmeter 744. The flowmeter 744, the liquid source 746, and a base component of the liquid pump 745 are fixedly connected the support component 743 (or equivalently the floor of the building or the ground). The pipe 747 is fixedly connected to the rigid component 742 and the motor 741 is configured to produce a rotation of the pipe 747 between two end-positions: a first end-position; and a second end-position. The pump 745 and the flowmeter 744 are connected to the computer system 99, and the computer system can control the timing and amount of liquid to be drawn from the liquid source.

Figure 19:
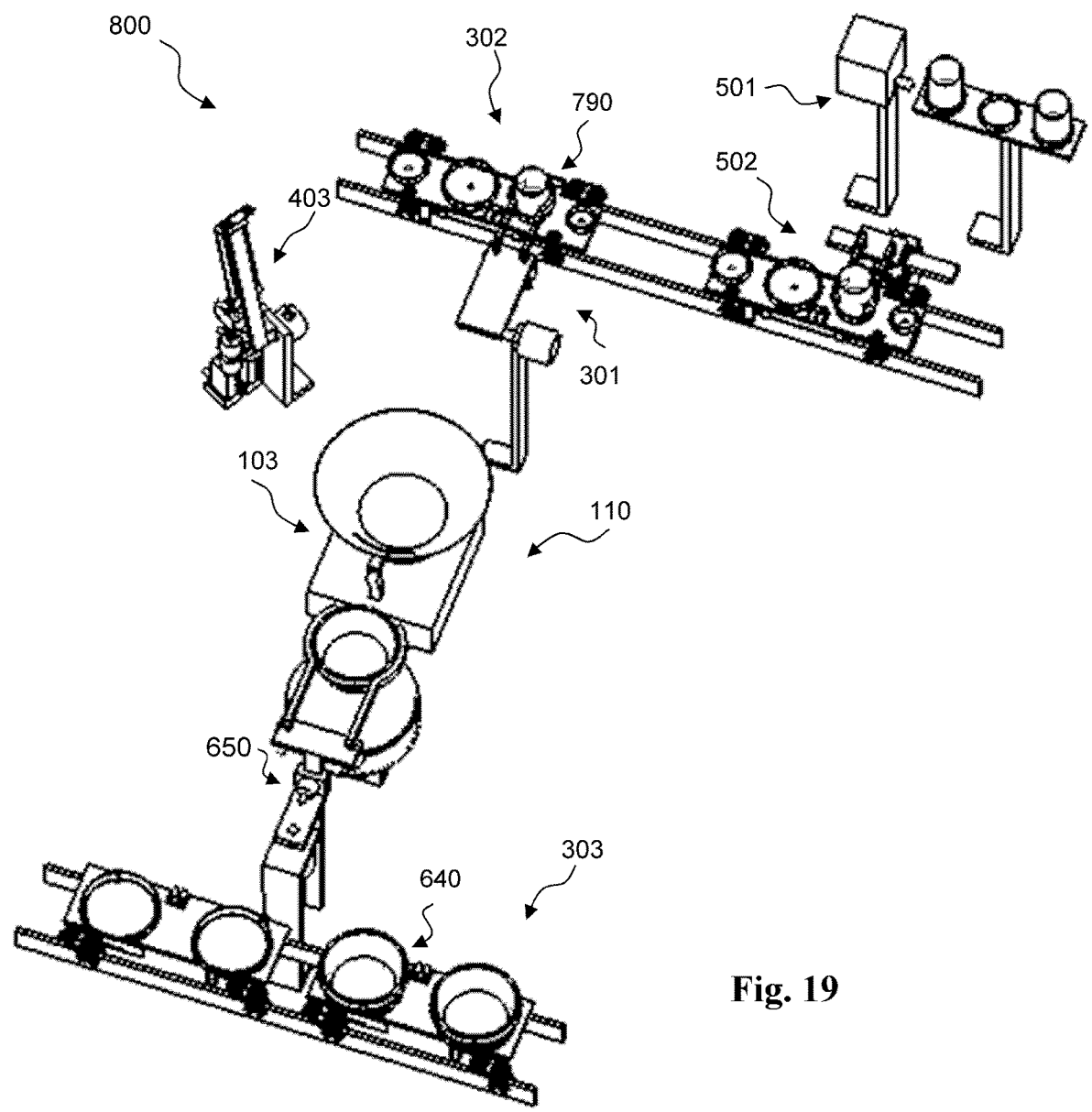
FIG. 19 shows an aerial view of a cooking sub-system.
Figure 20A:
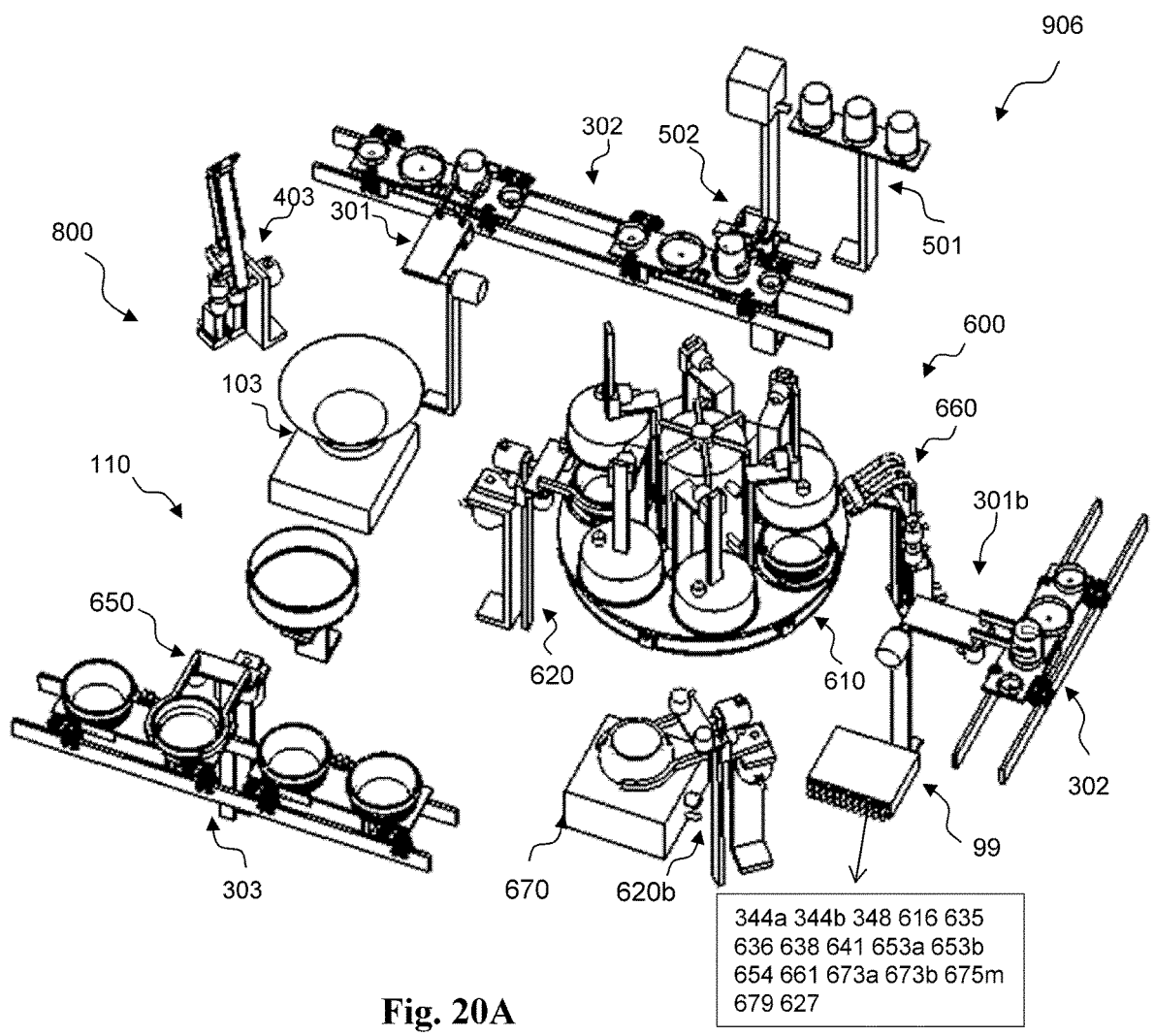
FIG. 20A shows an aerial view of a cooking system comprising the cooking sub-system of FIG. 19.
Figure 20B:
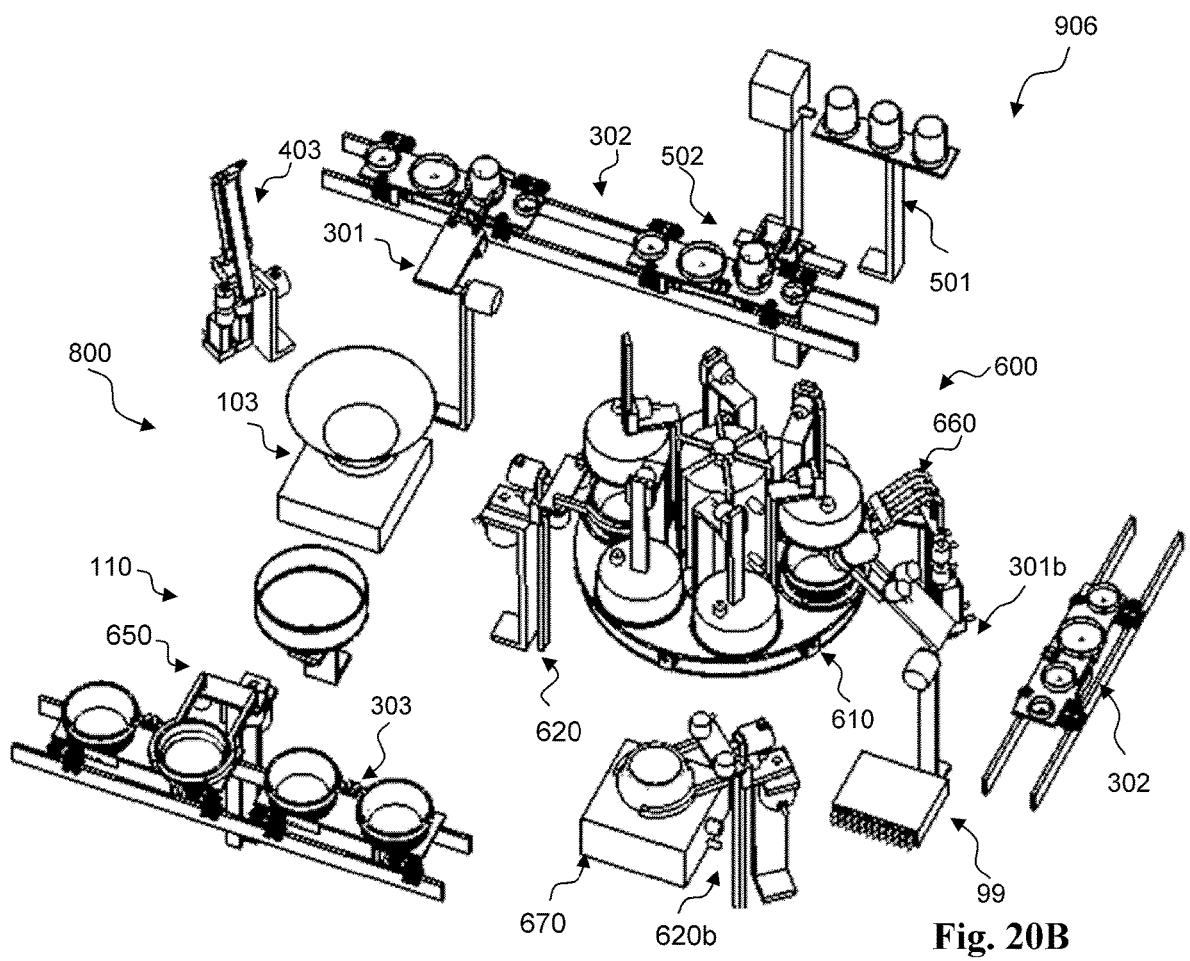
FIG. 20B shows an aerial view of the cooking system showing the dispensing of food or food ingredients from an ingredient container into a food container.
Figure 20C:
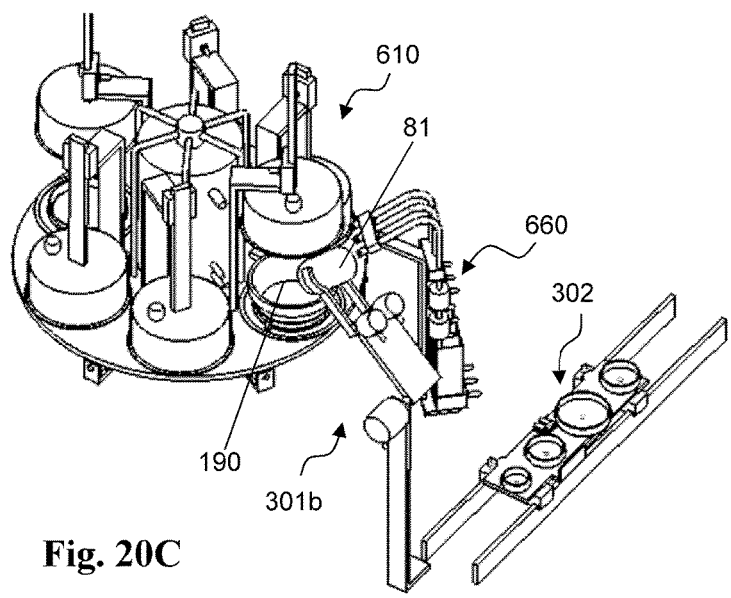
FIG. 20C shows a partial view of the cooking system.
Figure 21A:
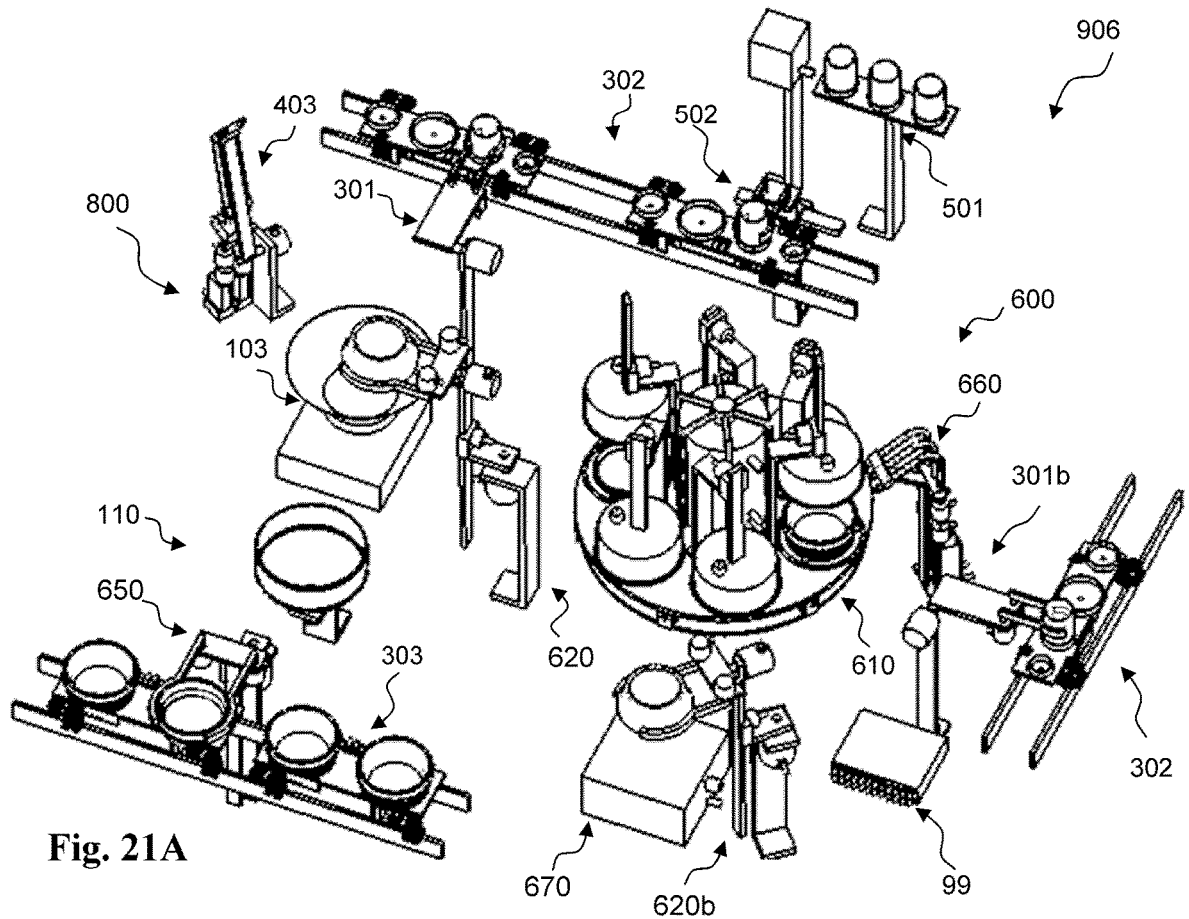
FIG. 21A shows an aerial view of the cooking system showing the dispensing of semi-cooked food from a food container into a cookware.
Figure 21B:
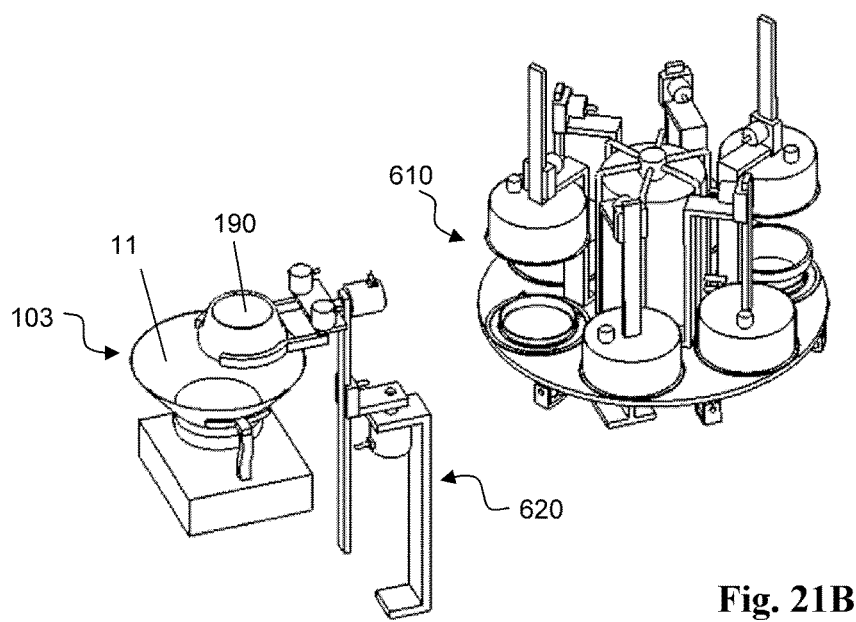
FIG. 21B shows a partial view of the cooking system.
Figure 22:
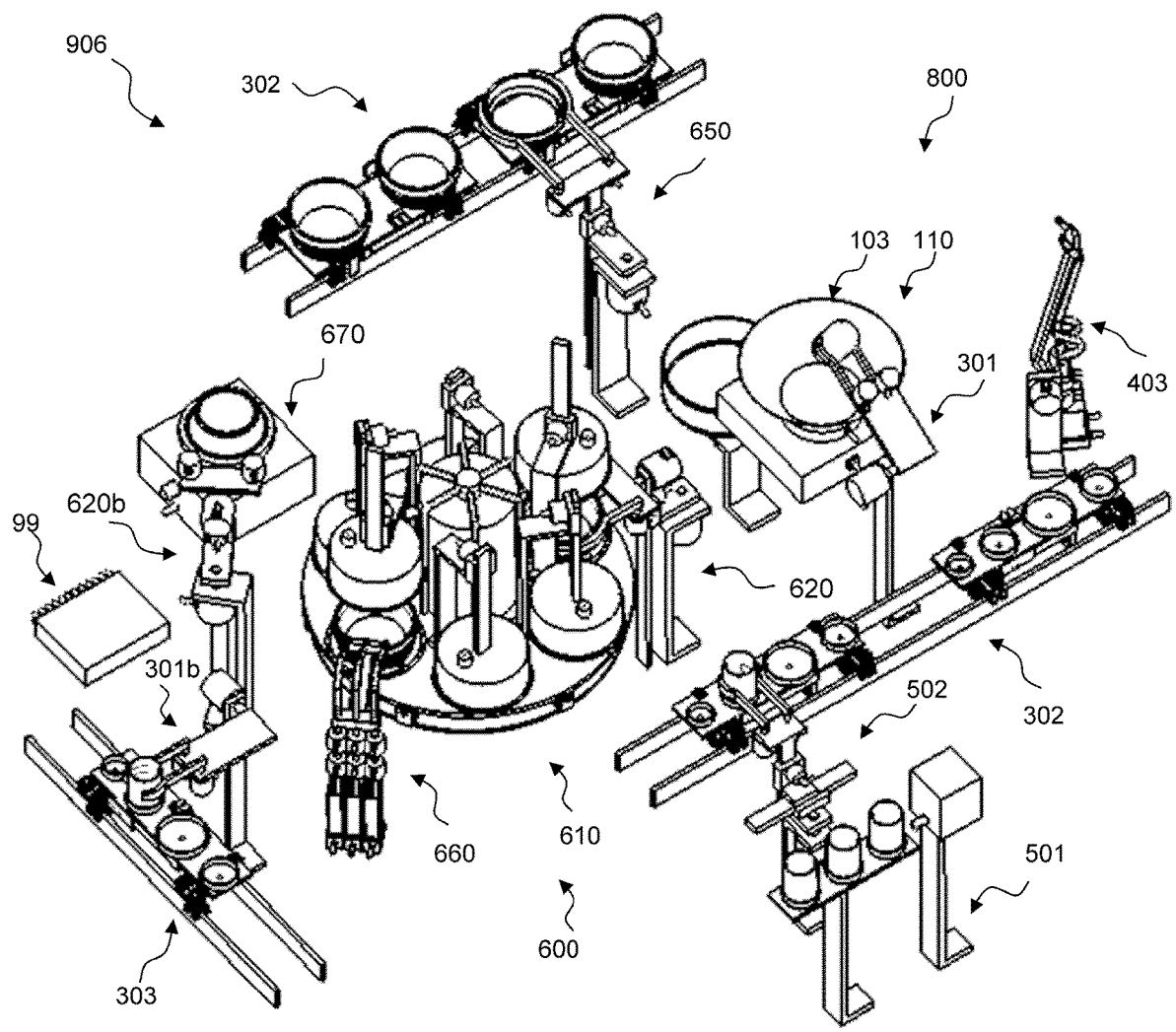
FIG. 22 shows an aerial view of the cooking system showing the dispensing of food or food ingredients from an ingredient container into the cookware.
Figure 23:
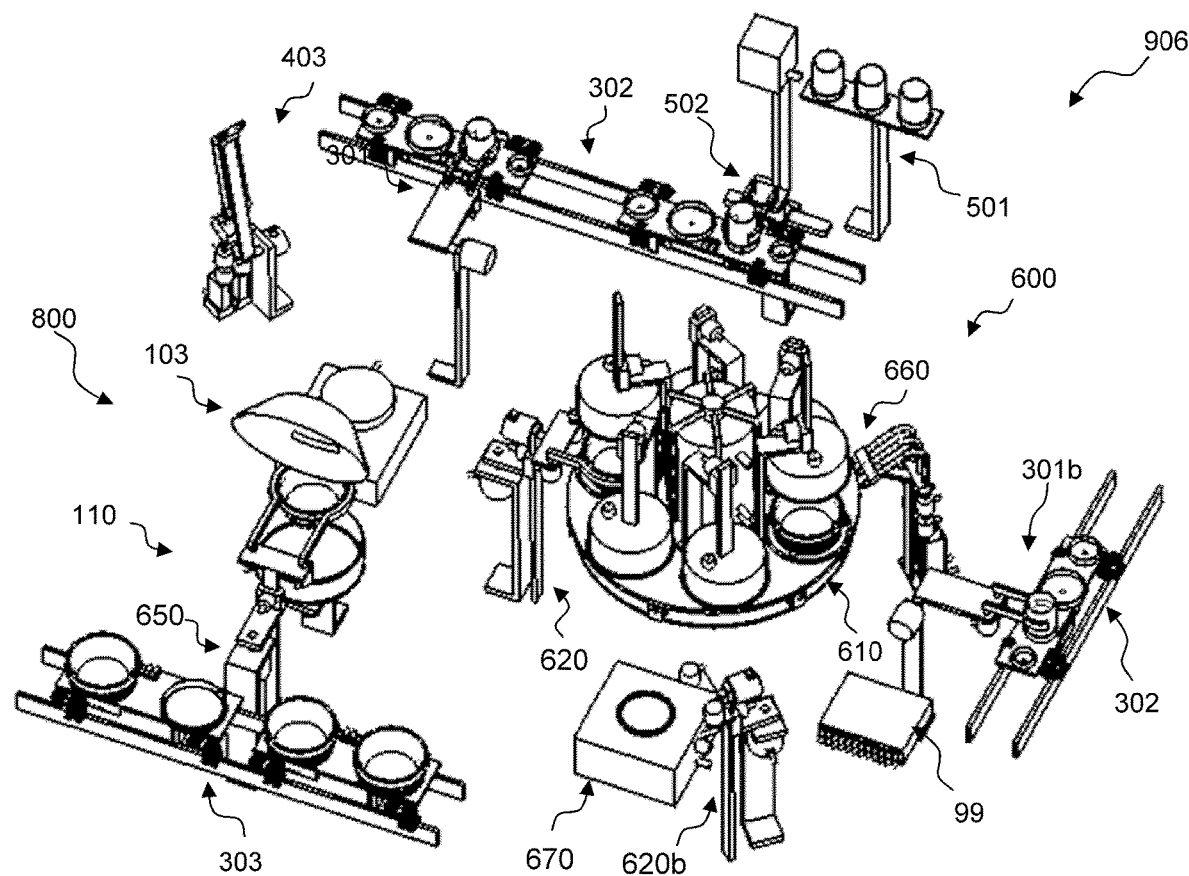
FIG. 23 shows an aerial view of the cooking system showing the dispensing of a cooked food from the cookware to a food container.

In some embodiments, referring to FIG. 19, a cooking sub-system 800 comprises: a transport system 302 (as in FIG. 9A); a cooking apparatus 110 (as in FIGS. 6B-6C); and a transport system 303 (as in FIG. 16B). The ingredient dispensing apparatus 301 of the cooking apparatus 110 is positioned next to the cooking apparatus 103 of the cooking apparatus 110. The ingredient dispensing apparatus 301 can grip and move an ingredient container from a vehicle 790 of the transport system 302 and then dispense food or food ingredients in said ingredient container into the cookware 11 of the cooking apparatus 103. The transfer apparatus 650 of the cooking apparatus 110 is positioned next to the cooking apparatus 103. The transfer apparatus 650 can grip a food container 182 from a vehicle 640 of the transport system 303 and move it to a receiving position relative to the support component of the cooking apparatus 103 to receive a cooked food from the cookware 11.

The cooking sub-system 800 further comprises: a liquid dispensing apparatus 403 (as in FIG. 7B); a transfer apparatus 502 (as in FIG. 12); and a storage 501 (as in FIG. 11) which may store a plurality of ingredient containers 81, which may contain or otherwise hold food or food ingredients. The liquid dispensing apparatus 403 is positioned next to the cooking apparatus 103 and can dispense liquid ingredients into the cookware 11. The transfer apparatus 502 may load an ingredient container 81 (which contains or otherwise holds food or food ingredients) from the storage 501 to a vehicle 790 of the transport system 302. The vehicle 790 may move the ingredient container to a location next to the cooking apparatus 103 to be gripped and held by the ingredient dispensing apparatus 301.

The cooking sub-system 800 may cook and transfer food or food ingredients as follows. The transfer apparatus 502 loads one or more ingredient containers 81 (which contain or otherwise hold food or food ingredients) from the storage 501 to a vehicle 790 of the transport system 302. Then, the vehicle 790 can transport the (one or more) ingredient containers to a location next to the cooking apparatus 103 so that the ingredient containers may be successively gripped and moved by the ingredient dispensing apparatus 301 to dispense food or food ingredients from the ingredient containers to the cookware 11 of the cooking apparatus 103, when said cookware 11 is already rotated to the upright position (or first end-position). The liquid dispensing apparatus 403 may dispense liquid ingredients into the cookware 11. As we will see below, another cooking apparatus may be used to produce a semi-cooked food which may be dispensed into the cookware 11 as well. Then, a cooked food is produced in the cookware 11 from the dispensed food or food ingredients, the dispensed liquid ingredients, and the semi-cooked food. The cooked food in the cookware can be dispensed into a food container 182, which is gripped by the transfer apparatus 650. The transfer apparatus 650 can then load the food container 182 to a vehicle 640 (of the transport system 303) which is moved to a certain position relative to the support component 678 of the transfer apparatus 650. The vehicle 640 can transport the food container 182 to a location that is closer to customers.

It should be noted that the cooking sub-system 800 may further comprise a cleaning apparatus. The cookware 11 may be cleaned by the cleaning apparatus after the cooked food is dispensed. See U.S. patent application Ser. No. 17/069, 707 for examples of the cleaning apparatus. The entire contents of the application are hereby incorporated herein. There are many known cleaning apparatuses that can be used for the function of the cleaning apparatus.

In some embodiments, referring to FIGS. 20A-24B, a cooking system 906 comprises a cooking sub-system 800 (as in FIG. 19) and a cooking apparatus 600 wherein the cooking apparatus 600 comprises: a food dispensing apparatus 620 (as in FIG. 14); a cooking apparatus 610 (as in FIGS. 18D-18E); a liquid dispensing apparatus 660 (as in FIG. 15); and an ingredient dispensing apparatus 301*b*; wherein the ingredient dispensing apparatus 301*b* is an identical copy of the ingredient dispensing apparatus 301 but is positioned next the cooking apparatus 610. The part numbers in the mechanism 301*b* are the same as the corresponding parts of the mechanism 301. In the cooking apparatus 600, the ingredient dispensing apparatus 301*b* is positioned next to the cooking apparatus 610. The ingredient dispensing apparatus 301*b* can grip and move an ingredient container from a vehicle 790 of the transport system 302 of the cooking sub-system 800 to dispense food or food ingredients from said ingredient container into one of the cooking containers 190 of the cooking apparatus 610; and the ingredient container is returned to the vehicle after the food or food ingredients are dispensed. The food dispensing apparatus 620 is positioned between the cooking apparatus 103 of the cooking sub-system 800 and the cooking apparatus 610, to move a cooking container 190 which is positioned or otherwise held by a container holder 623 (of the cooking apparatus 610) to dispense a semi-cooked food from the cooking container 190 into the cookware 11 (of the cooking apparatus 103). The liquid dispensing apparatus 660 is positioned next the cooking apparatus 610 to dispense liquid ingredients into a cooking container 190 of the cooking apparatus 610.

The cooking system 906 further comprises: a container moving apparatus 620*b*; a food container cleaning mechanism 670 (described below); and a computer system 99 (as in FIG. 1); wherein the container moving apparatus 620*b* is an identical copy of the food dispensing apparatus 620 (as in FIG. 14) and is positioned next to the cooking apparatus 610. The part numbers in the container moving apparatus 620*b* are the same as the corresponding parts of the food dispensing apparatus 620. The container moving apparatus 620*b* can grip and move a cooking container 190 from the cooking apparatus 610 and turn the cooking container 190 (optionally by 180 degrees) to a certain cleaning position so that the cooking container 190 can get cleaned by the food container cleaning mechanism 670. Then, the cleaned cooking container 190 can be moved back to the rotatable component 621 of the cooking apparatus 610.

In the cooking system 906, when the rotatable component 621 of the cooking apparatus 610 (of the cooking apparatus 600) is rotated by the rotational motion mechanism 601 to a certain position, one or more of the following processes may be completed: (1) a linear actuator 627 moves the corresponding cap 625 to the second end-position so that the ingredient dispensing apparatus 301*b* may dispense food or food ingredients into a cooking container 190 which is positioned at, or held by, the container holder 623 corresponding to said linear actuator 627; (2) said linear actuator 627 moves said cap 625 to the first end-position so the food or food ingredients in said cooking container 190 is heated with steam generated by the steam generator 629; (3) the rotatable component 621 is rotated to a certain position and said linear actuator 627 moves said cap 625 to the second end-position so that the food dispensing apparatus 620 can dispense a semi-cooked food from said cooking container 190 to the cookware 11 of the cooking apparatus 103; and then the food dispensing apparatus moves said cooking container 190 to said container holder on the rotatable component 621; (4) the rotatable component 621 is rotated to a position so that the container moving apparatus 620*b* can move said cooking container 190 to the food container cleaning mechanism 670 to get cleaned and then returned to said holder on the rotatable component 621.

The cooking system 906 may cook a food by applying the same steps as the cooking sub-system 800 except that a semi-cooked food produced by the cooking apparatus 600 can be dispensed into the cookware 11 wherein the semi-cooked food may be used as an ingredient for the cooking apparatus 103.

The computer system 99 is connected to the mechanisms and devices 16, 344a, 344b, 348, 616, 627, 629, 635, 636, 638, 641, 653a, 653b, 654, 661, 673a, 673b, 675m, 679, 501, and 502. The computer system 99 is also connected to the transport systems 302 and 303 to control the movements of the vehicles of the transport systems 302 and 303.

It should be noted that in the cooking system 906, the cooking apparatus 610 may be substituted by the cooking apparatus 610b.

As shown in FIG. 24A, the following tasks are performed by the computer system 99 prior to the operation of the cooking system 906.

In Step 921, the computer system 99 stores (in the computer system's memory) a program, configured to send or receive signals to and from the motors, actuators, inductive stoves, temperature sensors and pumps of the cooking system 906.

In Step 922, a database is installed in the computer system 99.

In Step 923, each of the cooking apparatuses, liquid dispensing apparatus, ingredient dispensing apparatuses, cleaning apparatus, food container cleaning mechanism, food dispensing apparatus, transfer apparatus, transport system is assigned a unique ID. The computer system 99 stores the IDs of these apparatuses and mechanisms.

In Step 924, the computer system 99 stores the information of the structure of each vehicle of the transport system 302 and each vehicle of the transport system 303, including the ingredient container types that can be placed on the container holders of the vehicle 790.

In Step 925, the computer system 99 stores a program for controlling the transport systems 302 and 303. The program may be used to control a vehicle 790 of the transport system 302 so that the vehicle 790 may move and stop at a pre-scheduled time at a position near a cooking apparatus of the cooking system 906, where an ingredient container on a given holder of the vehicle 790 is at a dispensing position relative to the cooking apparatus. The program may be used to control a vehicle 640 of the transport system 303 so that the vehicle 640 may move and stop at a pre-scheduled time at a position near a transfer apparatus of the cooking system 906, where the container holders of the vehicle 640 are at a transferring position near the transfer apparatus.

In Step 926, the computer system 99 stores a list of food items which may be cooked by the cooking system 906.

In Step 927, for each food item in the list of Step 926, the computer system 99 stores a cooking program configured to control the motors, actuators, inductive stoves, pumps and devices in the cooking system 906.

In Step 928, for each food item in the list of Step 926, the computer system 99 stores types and quantities of food or food ingredients, relative timing of their dispensing and the respective ID of the destination cooking apparatus for each ingredient to be dispensed into; wherein the relative timing refers to the timing relative to the timing of the program of Step 927 corresponding to the food item. Food or food ingredients contained in an ingredient container is to be dispensed into a cookware or a cooking container.

As shown in FIG. 24B, the following tasks are routinely performed by the computer system 99 during the operation of the cooking system 906.

In Step 931, the computer system 99 takes an order of a food item. The order may be placed by a person either at the computer system 99, or at a computer which sends the order to the computer system 99.

In Step 932, for the ordered food item of Step 931, the computer system 99 finds the information on the types and quantities of the ingredients needed for cooking the ordered food item.

Such information was stored by the computer system 99 in Step 928.

In Step 933, the computer system 99 locates the ingredient containers that contain the food or food ingredients found in Step 932. The food or food ingredients may be dispensed from some larger containers into said ingredient containers. Alternatively, food or food ingredients may already be in the ingredient containers, and their locations already stored in the memories of the computer system 99.

In Step 934, the computer system 99 schedules the cooking of the ordered food item at the cooking system 906. The schedule includes the timing for running the program of Step 927 corresponding to the ordered food item. The schedule also includes the timing of dispensing of the food or food ingredients from each ingredient container into a respective cooking container or a cookware of the cooking system 906, in accordance with the stored information by the computer system 99 in Step 928.

In Step 935, the computer system 99 controls the transport system 302 so that each ingredient container of Step 932 may be moved and stopped per the schedule of Step 934.

In Step 936, the computer system 99 runs the program of Step 927 corresponding to the ordered food item, according to the schedule of Step 934, to send or receive signals to or from the motors, actuators, inductive stoves, temperature sensors and pumps of the cooking system 906.

After all these steps, the cooking of the food item, including dispensing of the cooked food to a food container, is complete.

Figure 25A:
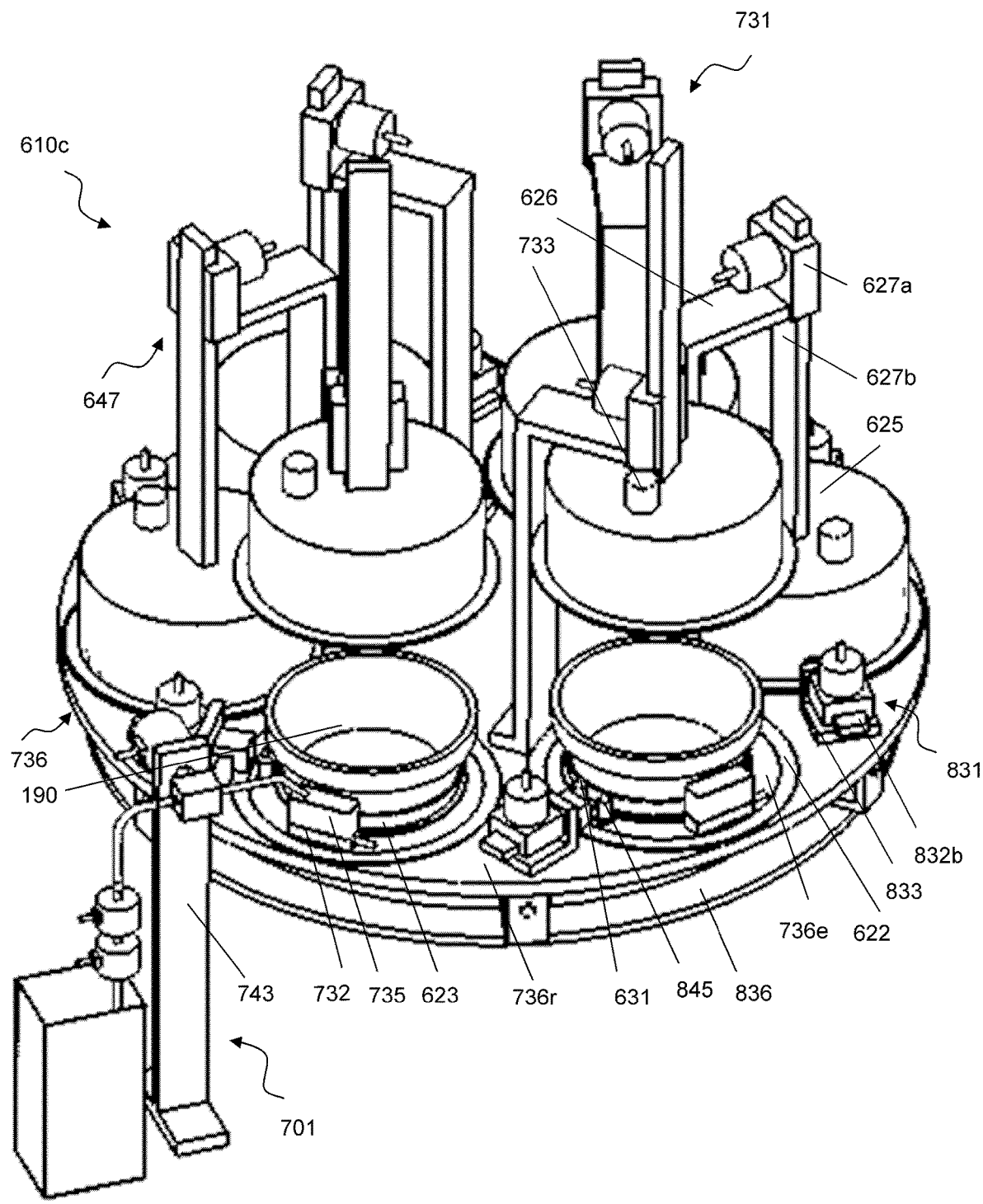
FIGS. 25A-25C show aerial views of a cooking apparatus comprising: the rotational motion mechanism of FIG. 17A; a plurality of locking mechanisms of FIG. 17B; a plurality of enclosure mechanisms of FIGS. 18A-18B; and a liquid dispensing apparatus of FIGS. 18H-18I.
Figure 25B:
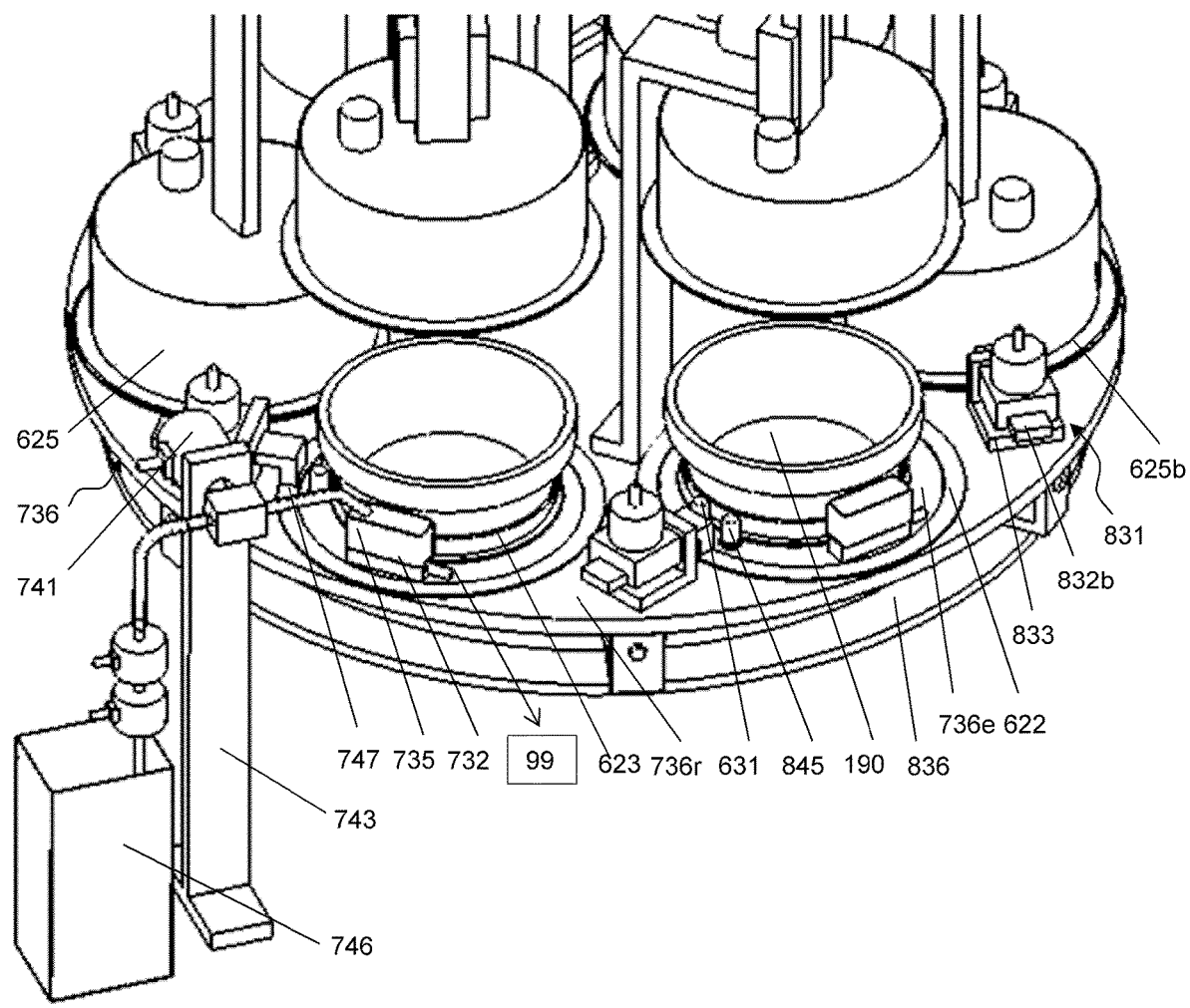
Figure 25C:
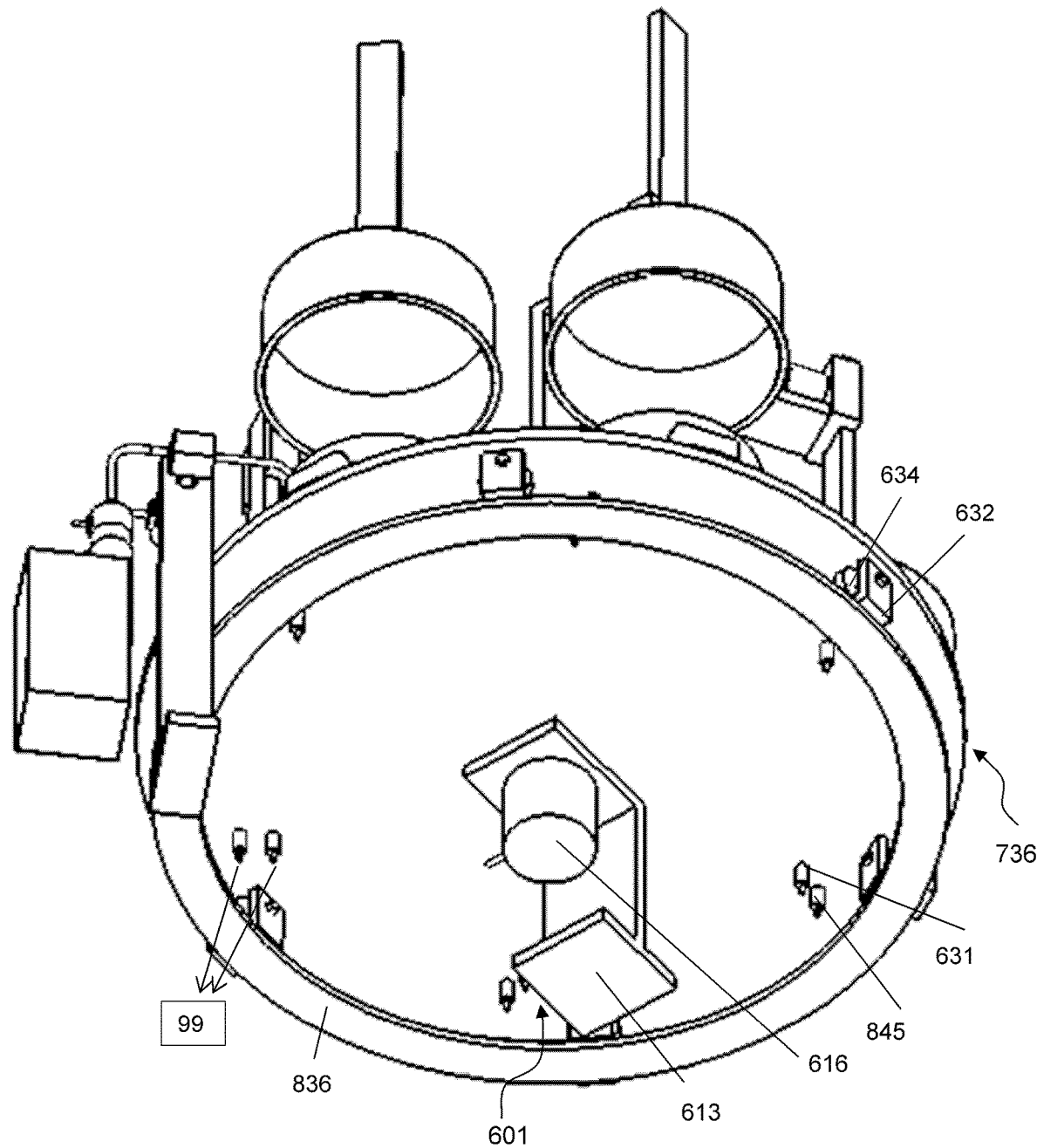

Referring to FIGS. 25A-25B, a cooking apparatus 610c comprises: a rotatable component 736; and a rotational motion mechanism 601 (as in FIG. 17A). The rotatable component 736 comprises a rigid component 736r and a plurality of first enclosure components 736e which are fixedly connected to the rigid component 736r. Each first enclosure component 736e comprises heat insulating material. The shaft 611 of the rotational motion mechanism 601 is fixedly connected to the rigid component 736r of the rotatable component 736, so that the rotational motion mechanism 601 may produce an intermittent rotation of the rotatable component 736 around the axis of the shaft 611 wherein the axis of the shaft 611 is vertical. The rotatable component 736 may comprise a turntable but this is not a requirement.

A plurality of wheels 634 are mounted on a plurality of support components 632, which are rigidly or fixedly connected to a support component 836; and the support component 836 is optionally rigidly or fixedly connected to the floor of a building or the ground (the connection is not shown in figures but is easy to construct). The wheels 634 are used to touch and provide support to the rotatable component 736.

Corresponding to each first enclosure component 736e of the rotatable component 736, an enclosure mechanism 647 (as in FIGS. 18A-18B) is mounted on the rigid component 736r of the rotatable component 736, and a sealing ring 622 is fixedly connected to the first enclosure component 736e. When the cap 625 of the enclosure mechanism 647 is moved to the first end-position (the lower position), the cap 625 touches on the corresponding sealing ring 622. The cap 625, the first enclosure component 736e of the rotatable component 736, and the sealing ring 622 are configured to enclose a cooking chamber. The sealing rings 622 comprise temperature resistant, elastic material. When the cap 625 is moved to the second end-position, the cooking chamber is opened.

A plurality of container holders 623 are fixedly connected to the rotatable component 736. Each container holder is positioned inside an above-described cooking chamber (when the corresponding cap 625 is at the first end-position), wherein the container holder 623 is configured to position or hold a cooking container 190 such that the movement of said cooking container 190 relative to the rotatable component 736 may be restricted or limited when the rotatable component is moved.

Corresponding to each first enclosure component 736e, a heating device 732 is fixedly mounted on the first enclosure component 736e, and a liquid container 735 is fixedly connected to the heating device 732. The heating device 732 is configured to heat the liquid (e.g., water) in the liquid container 735 to produce steam. The steam can heat the food or food ingredients in the cooking container 190 in the cooking chamber to produce a semi-cooked or cooked food. Next to each container holder 623, a humidity sensor (e.g., a hygrometer) 631 and a pressure sensor 845 are mounted on the rotatable component 736. The humidity sensor 631 can detect the temperature and humidity level of the air in the corresponding cooking chamber. The pressure sensor 845 can detect the air pressure in said cooking chamber. The humidity sensors 631 are connected to the computer system 99 of FIG. 1 by wired or wireless means and the computer system 99 can receive the information from the humidity sensors 631. The pressure sensors 845 are connected to the computer system 99 by wired or wireless means and the computer system 99 can receive the information from the pressure sensors 845. The sealing rings 622 are configured to be heat resistant.

A locking mechanism 831 (as in FIG. 17B) is used to lock the rotation of each cap 625 when the cap is moved to the first end-position (to enclose the corresponding cooking chamber). The support component 833 of the locking mechanism 831 is rigidly or fixedly connected to the rotatable component 736. As shown in FIG. 25B, when the cap 625 of an enclosure mechanism 647 is moved to the first end-position, the moving member 832b of the corresponding locking mechanism 831 may be moved to the first end-position to touch and press on the edge 625b of the cap 625. That way, the cap is firmly pressed onto the corresponding seal 623 and the steam in the cooking chamber may not leak out from underneath the cap 625. If the moving member 832b is moved to the second end-position, the cap 625 can be rotated to open up the cooking chamber.

The cooking apparatus 610c further comprises a liquid dispensing apparatus 701 (as in FIGS. 18H-18I). The relative positions of the support component 743 of the liquid dispensing apparatus 701 and the support component 613 of the rotational motion mechanism 601 are fixed. When one of the liquid containers 735 is rotated by the rotational motion mechanism 601 to a certain position and the corresponding linear actuator 627 has already moved the corresponding cap 625 to the second end-position, the liquid dispensing apparatus 701 can rotate the pipe 747 to the first end-position where the outlet of the pipe 747 is right above said liquid container 735. The liquid pump 745 of the liquid dispensing apparatus 701 can pump liquid from the liquid source 746 into said liquid container 735. The liquid pump 745 and the flowmeter 744 are connected to the computer system 99, and the computer system can control the speed, timing and amount of liquid to be drawn from the liquid source.

For the purpose of the present patent application, a heating device is meant to be a heater. A heater can be a burner, a stove, or any other device which can generate heat for the purpose of cooking. A stove can be an electric stove, a gas stove, an oil stove, an inductive stove, a light-wave stove, or a microwave stove, etc.

Figure 26:
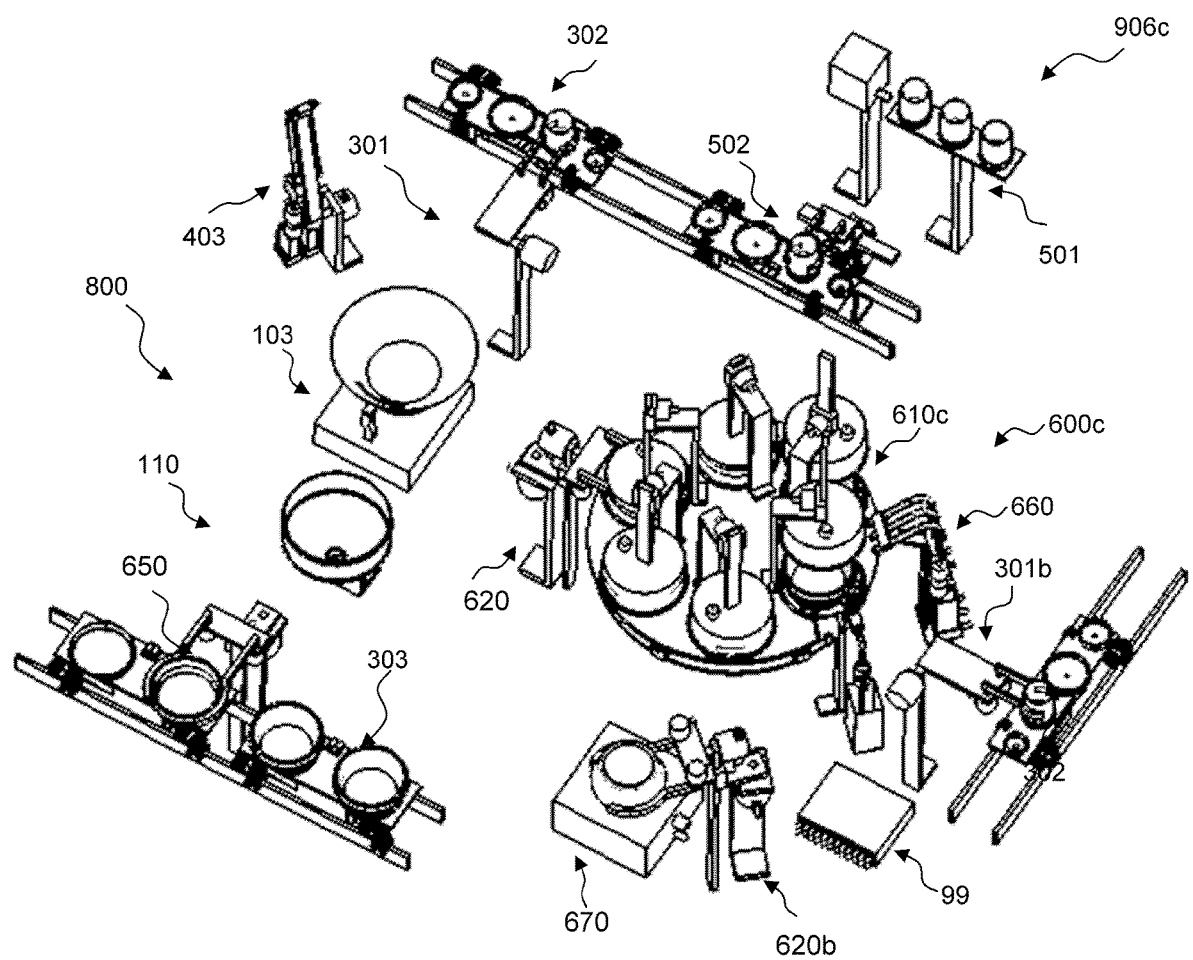
FIG. 26 shows an aerial view of a cooking system.

In some embodiments, referring to FIG. 26, a cooking system 906c is similarly configured as the cooking system 906. The cooking system 906c comprises: a cooking sub-system 800 (as in FIG. 19); a cooking apparatus 600c (to be described below); a container moving apparatus 620b (as described above); a food container cleaning mechanism 670 (as described above); and a computer system 99 (as in FIG. 1). The cooking apparatus 600c is the same as the cooking apparatus 600 except that the cooking apparatus 610 is substituted by a cooking apparatus 610c, as follows. The cooking apparatus 600c comprises: a food dispensing apparatus 620 (as in FIG. 14); a cooking apparatus 610c (as in FIG. 25A); a liquid dispensing apparatus 660 (as in FIG. 15); and an ingredient dispensing apparatus 301b. In the cooking apparatus 600c, the ingredient dispensing apparatus 301b is positioned next the cooking apparatus 610. The ingredient dispensing apparatus 301b can grip and move an ingredient container from a vehicle 790 of the transport system 302 of the cooking sub-system 800 to dispense food or food ingredients from said ingredient container into one of the cooking containers 190 of the cooking apparatus 610c and the ingredient container is moved back to the vehicle after the food or food ingredients are dispensed. The food dispensing apparatus 620 is positioned between the cooking apparatus 103 of the cooking apparatus 110 of the cooking sub-system 800 and the cooking apparatus 610c. The food dispensing apparatus 620 can grip and move a cooking container 190 positioned or otherwise held by a container holder 623 (of the cooking apparatus 610c) to dispense semi-cooked food from the cooking container 190 into the cookware 11 of the cooking apparatus 103. The liquid dispensing apparatus 660 is positioned next the cooking apparatus 610c to dispense liquid ingredients into a cooking container 190 of the cooking apparatus 610c. The container moving apparatus 620b is positioned next to the food container cleaning mechanism 670. The container moving apparatus 620b can grip and move a cooking container 190 from the cooking apparatus 610c and turn the container 190 to a certain cleaning position so that the cooking container 190 can get cleaned by the food container cleaning mechanism 670. Then, the cleaned cooking container 190 can be moved back to the rotatable component 736 of the cooking apparatus 610c. The computer system 99 is connected to the electric or electronic components of the apparatuses or mechanisms in the cooking system 906c so that the computer system 99 may communicate with and/or control said components by known techniques.

In the cooking system 906c, when the rotatable component 736 of the cooking apparatus 600c is rotated by the rotational motion mechanism 601 to a certain position, one or more of the following processes may be completed: (1) a linear actuator 627 moves the corresponding cap 625 to the second end-position so that the ingredient dispensing apparatus 301b may dispense food or food ingredients into a cooking container 190 which is positioned at, or held by, the container holder 623 corresponding to said linear actuator 627 and the liquid dispensing apparatus 660 may dispense liquid ingredients into said cooking container 190 and the liquid dispensing apparatus 701 may dispense liquid into a corresponding liquid container 735; (2) said linear actuator 627 moves said cap 625 to the first end-position so the food or food ingredients in said cooking container 190 is heated with steam generated by the corresponding heating device 732; (3) the rotatable component 736 is rotated to a certain position and said linear actuator 627 moves said cap 625 to the second end-position so that the food dispensing apparatus 620 can dispense a semi-cooked food from said cooking container 190 to the cookware 11 of the cooking apparatus 103 and then the food dispensing apparatus moves said cooking container 190 to said container holder on the rotatable component 736; (4) the rotatable component 736 is rotated to a position so that the container moving apparatus 620b can move said cooking container 190 to the food container cleaning mechanism 670 to get cleaned and then returned to said container holder on the rotatable component 736.

The cooking system 906c may cook a food by applying the same steps as the cooking sub-system 800 except that a semi-cooked food produced by the cooking apparatus 600c can be dispensed into the cookware 11 wherein the semi-cooked food may be used as an ingredient for the cooking apparatus 103.

Figure 27A:
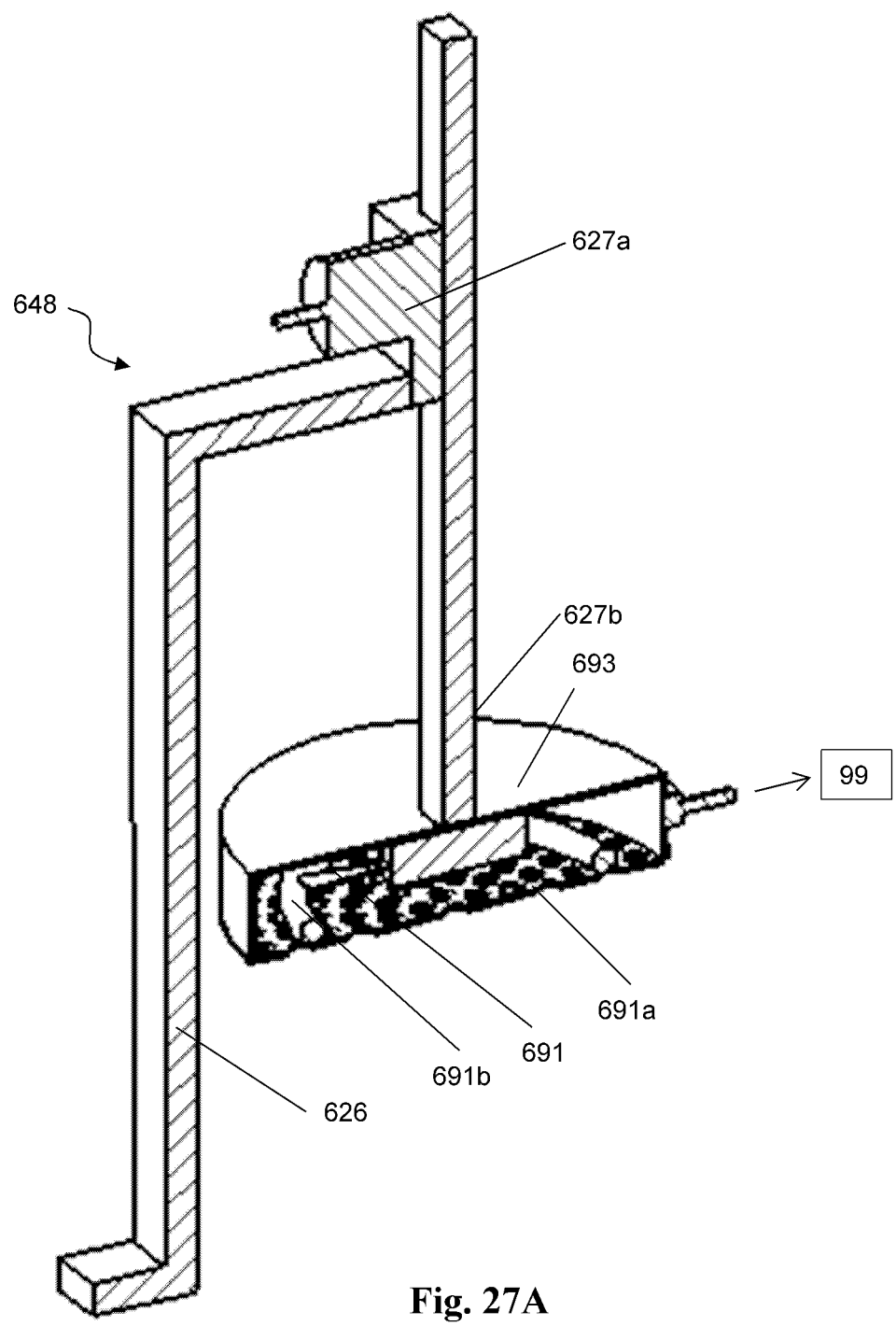
FIG. 27A shows an aerial view of an enclosure mechanism.

Referring to FIG. 27A, an enclosure mechanism 648 comprises: a lid or other enclosure member 693; a heating device 691; a support component 626; and a linear actuator 627. The heating device 691 comprises: a circular halogen lamp 691a; a fan 691b; and a temperature sensor. The heating device 691 is fixedly connected to the lid or enclosure member 693. The base component 627a of the linear actuator 627 is fixedly connected to the support component 626. The moving member 627b of the linear actuator 627 is fixedly connected to the lid or enclosure member 693. Thus, said linear actuator 627 can move the lid or enclosure member 693 vertically between two end-positions: a first end-position which is lower; and a second end-position which is higher.

Figure 27B:
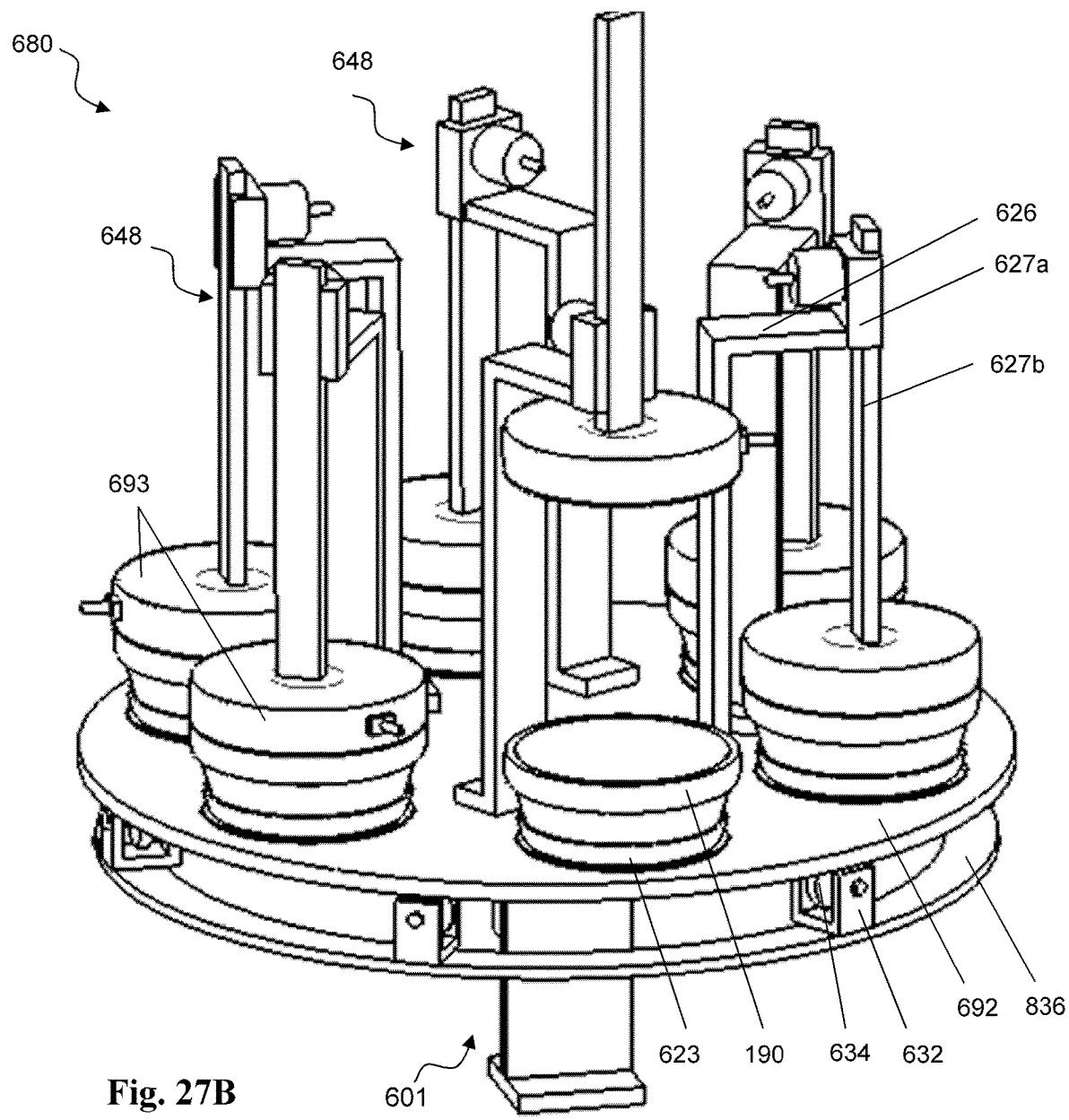
FIG. 27B shows an aerial view of a cooking apparatus comprising a plurality of enclosure mechanisms of FIG. 27A and the rotational motion mechanism of FIG. 17A.

Referring to FIG. 27B, a cooking apparatus 680 comprises: a rotatable component 692 comprising a rigid component; and a rotational motion mechanism 601 (as in FIG. 17A). The shaft 611 of the rotational motion mechanism 601 is fixedly connected to the rotatable component 692, so that the rotational motion mechanism 601 may produce an intermittent rotation of the rotatable component 692 around the axis of the shaft 611 wherein the axis of the shaft 611 is vertical. The rotation produced by the rotational motion mechanism 601 is configured to be an intermittent motion from one position to another, among a plurality of positions. The rotational motion mechanism 601 may be referred to as an intermittent motion mechanism.

The rotatable component 692 may comprise a turntable but this is not a requirement.

A plurality of wheels 634 are mounted on a plurality of support components 632, which are rigidly or fixedly connected to a support component 836, and the support component 836 is optionally rigidly or fixedly connected to the floor of a building or the ground (the connection is not shown in figures but is easy to construct). The wheels 634 are used to touch and provide support to the rotatable component 692.

The cooking apparatus 680 further comprises: a plurality of enclosure mechanisms 648 which are mounted on the rotatable component 692; a plurality of container holders 623 which are fixedly connected to the rotatable component 692. The container holder 623 is configured to hold a cooking container 190 so that the movement of said cooking container 190 relative to the rotatable component 692 may be restricted or limited when the rotatable component is moved. The support component 626 of each enclosure mechanism 648 is fixedly connected to the rotatable component 692. The enclosure mechanisms 648 may be cyclically and symmetrically positioned around the rotational axis of the rotatable component 692 (although this is not a strict requirement). When the lid or enclosure member 693 of one of the enclosure mechanisms 648 is moved to the first end-position (the lower position), the lid or enclosure member 693 is configured to touch on a cooking container 190 (hold by a corresponding container holder 623) by the corresponding linear actuator 627. The lid or enclosure member 693, together with the cooking container 190 can enclose a cooking chamber. The cooking chamber may be heated by the heating device 691 of the enclosure mechanisms 648. The heat flow from said cooking chamber to the outside is restricted, limited, and/or insulated so food may be efficiently heated inside the cooking chamber. The fan 691b of the heating device 691 may help distribute heat in said cooking chamber. The temperature sensor of the heating device 691 may detect the temperature in the cooking chamber. When the lid or enclosure member 693 is moved to the second end-position (or a higher position), the cooking chamber is opened.

The support component 613 of the rotational motion mechanism 601 is referred to as to the (base) support component of the cooking apparatus 680.

It should be noted that the rotational motion mechanism 601 may produce an intermittent rotation of the rotatable component 692. The rotation angles may optionally be a constant.

The heating device 691 is sometimes called a light wave heating device.

It should be noted the heating devices 691 may be substituted by other types of devices that can produce heat.

Figure 28:
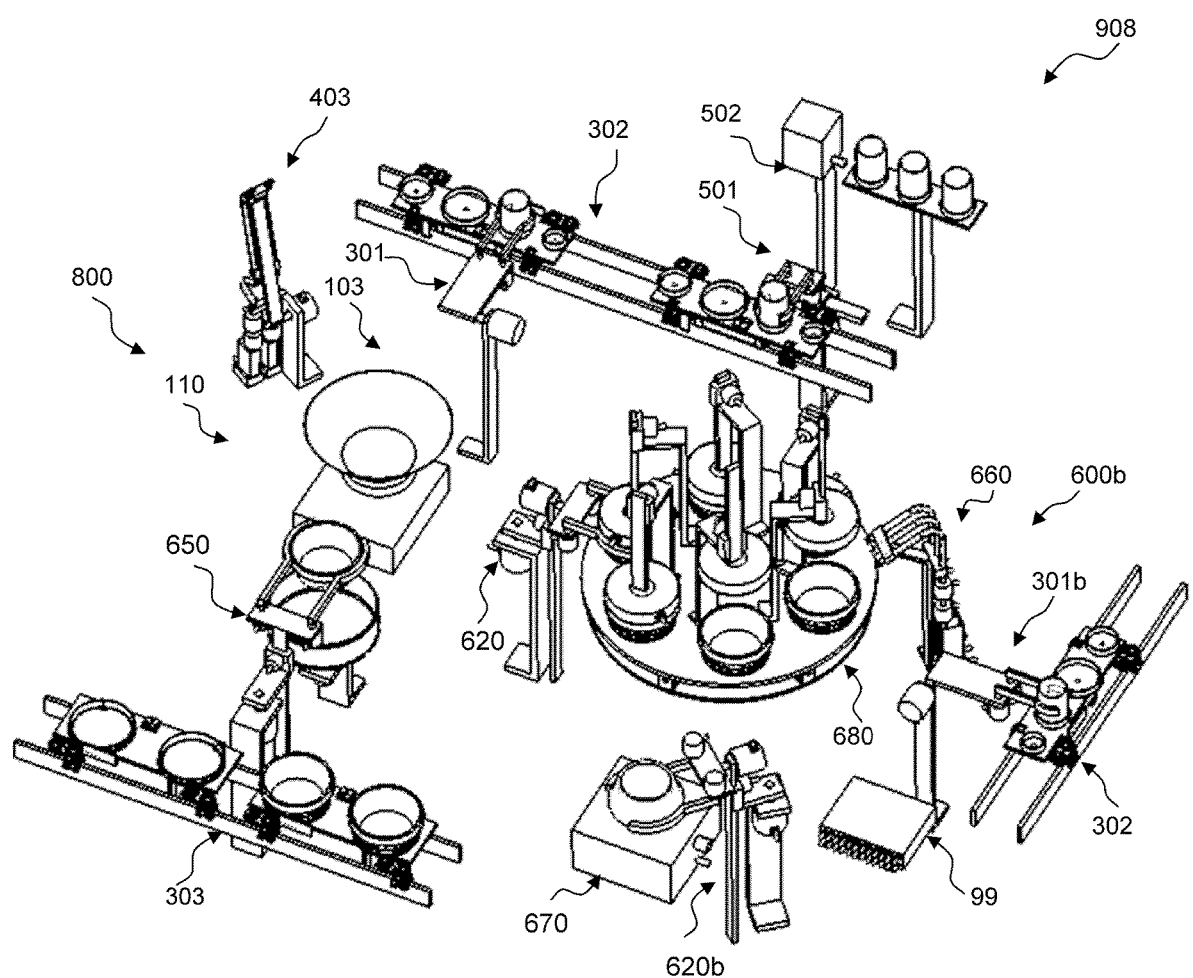
FIG. 28 shows an aerial view of a cooking system.

In some embodiments, referring to FIG. 28, a cooking system 908 is similarly configured as the cooking system 906. The cooking system 908 comprises: a cooking sub-system 800 (as in FIG. 19); a cooking apparatus 600b (to be described below); a container moving apparatus 620b (as described above); a food container cleaning mechanism 670 (as described above); and a computer system 99 (as in FIG. 1). The cooking apparatus 600b is the same as the cooking apparatus 600 except that the cooking apparatus 610 is substituted by a cooking apparatus 680, as follows. The cooking apparatus 600b comprises: a food dispensing apparatus 620 (as in FIG. 14); a cooking apparatus 680 (as in FIG. 27B); a liquid dispensing apparatus 660 (as in FIG. 15); and an ingredient dispensing apparatus 301b. The ingredient dispensing apparatus 301b is positioned next to the cooking apparatus 680. The ingredient dispensing apparatus 301b can grip and move an ingredient container from a vehicle 790 of the transport system 302 of the cooking sub-system 800 to dispense food or food ingredients from said ingredient container into one of the cooking containers 190 of the cooking apparatus 680. The food dispensing apparatus 620 is positioned between the cooking apparatus 103 and the cooking apparatus 680. The food dispensing apparatus 620 can grip and move a cooking container 190 positioned or otherwise held by a container holder 623 (of the cooking apparatus 680) to dispense semi-cooked food from the cooking container 190 into the cookware 11 of the cooking apparatus 103. The liquid dispensing apparatus 660 is positioned next the cooking apparatus 680. The liquid dispensing apparatus 660 can dispense liquid ingredients into a cooking container 190 of the cooking apparatus 680. The container moving apparatus 620b is positioned next to the food container cleaning mechanism 680. The container moving apparatus 620b can grip and move a cooking container 190 from the cooking apparatus 680 and turn the cooking container 190 to a certain cleaning position so that the cooking container 190 can get cleaned by the food container cleaning mechanism 670. Then, the cleaned cooking container 190 can be moved back to the rotatable component 692 of the cooking apparatus 680. The computer system 99 is connected to the electric or electronic components of the apparatuses or mechanisms in the cooking system 906 so that the computer system 99 may communicate with and/or control said components by known techniques.

In the cooking system 908, when the rotatable component 692 of the cooking apparatus 600b is rotated by the rotational motion mechanism 601 to a certain position, one or more of the following processes may be completed: (1) a linear actuator 627 moves the corresponding lid or enclosure member 693 to the second end-position so that the ingredient dispensing apparatus 301b may dispense food or food ingredients into a cooking container 190 which is positioned at, or held by, the container holder 623 corresponding to said linear actuator 627; (2) said linear actuator 627 moves said lid or enclosure member 693 to the first end-position so the food or food ingredients in said cooking container 190 is heated by the heating device 691; (3) said linear actuator 627 moves said lid or enclosure member 693 to the second end-position so that the food dispensing apparatus 620 can dispense a semi-cooked food from said cooking container 190 to the cookware 11 of the cooking apparatus 103 and then the food dispensing apparatus moves said cooking container 190 to said container holder on the rotatable component 692; (4) the rotatable component 692 is rotated to a position so that the container moving apparatus 620b can grip and move said cooking container 190 to the food container cleaning mechanism 670 to get cleaned and then returned to said container holder on the rotatable component 692.

The cooking system 908 may cook a food by applying the same steps as the cooking sub-system 800 except that a semi-cooked food produced by the cooking apparatus 600b can be dispensed into the cookware 11 wherein the semi-cooked food may be used as an ingredient for the cooking apparatus 103.

Figure 29A:
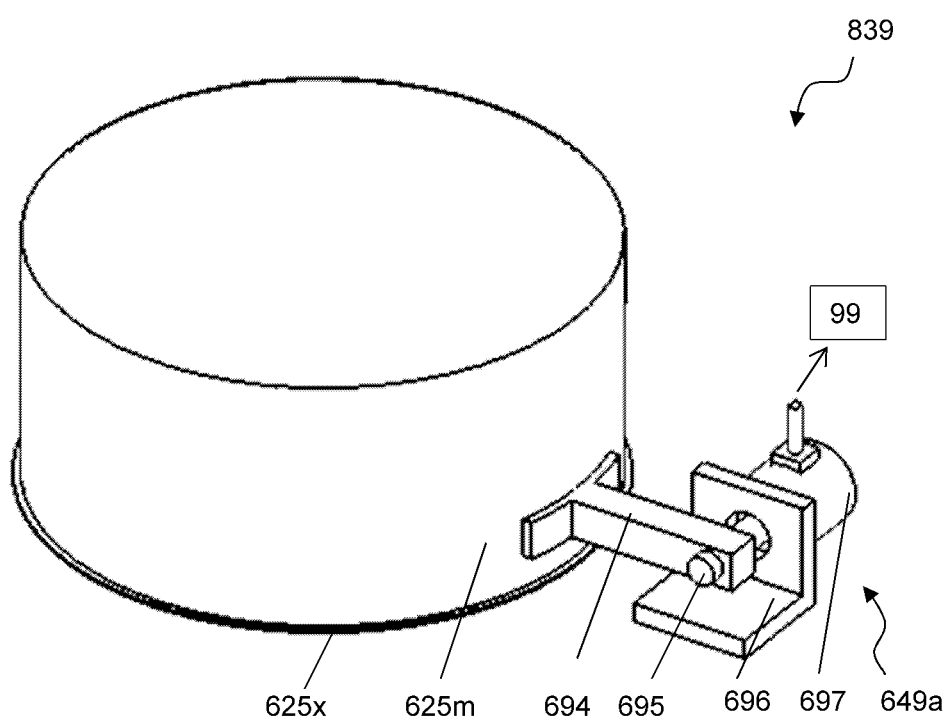
FIG. 29A shows an aerial view of an enclosure mechanism.

Referring to FIG. 29A, an enclosure mechanism 839 comprises: an enclosure component comprising a cap 625m with an edge 625x; and a rotational motion mechanism 649a. The rotational motion mechanism 649a comprises: a stationary member 696; a shaft 695 referred to as a moving member which is constrained to rotate relative to the stationary member 696 around the axis of the shaft 695 between two end-positions; and a motor 697 configured to drive a rotation of the shaft 695 relative to the stationary member 696. The shaft 695 is fixedly connected to the cap 625m by a connector 694, so that the rotational motion mechanism 649a can produce a rotation of the cap 625m relative to the stationary member 696 around the axis of the shaft 695 between two end-positions. The rotational motion mechanism 649a is connected to the computer system 99 of FIG. 1 via wire or wireless, so that the computer system 99 may control timings and speeds of its produced motion.

Figure 29B:
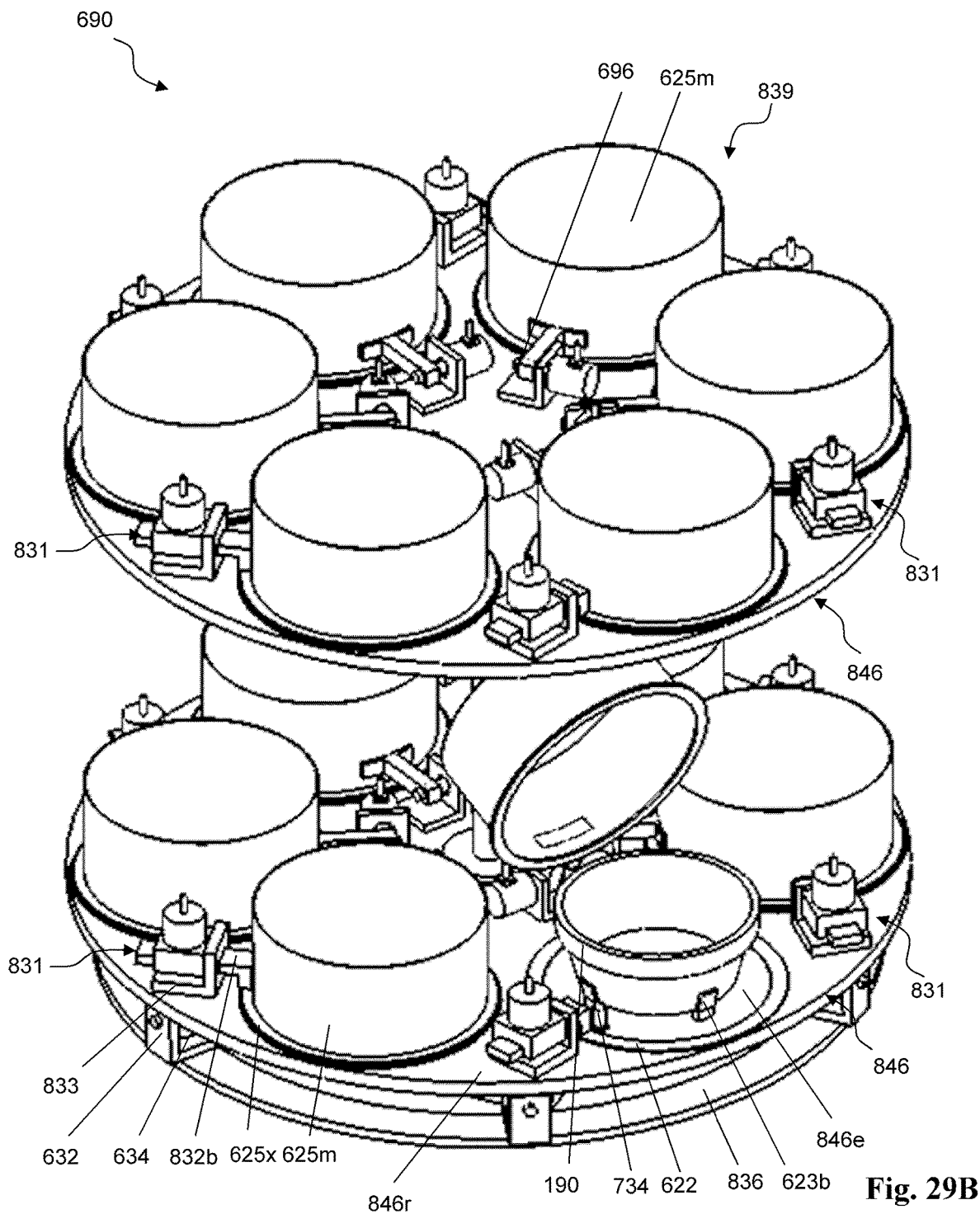
FIG. 29B-29C show aerial views of a cooking apparatus comprising a plurality of enclosure mechanisms of FIG. 29A, and a plurality of locking mechanisms of FIG. 17B.
Figure 29C:
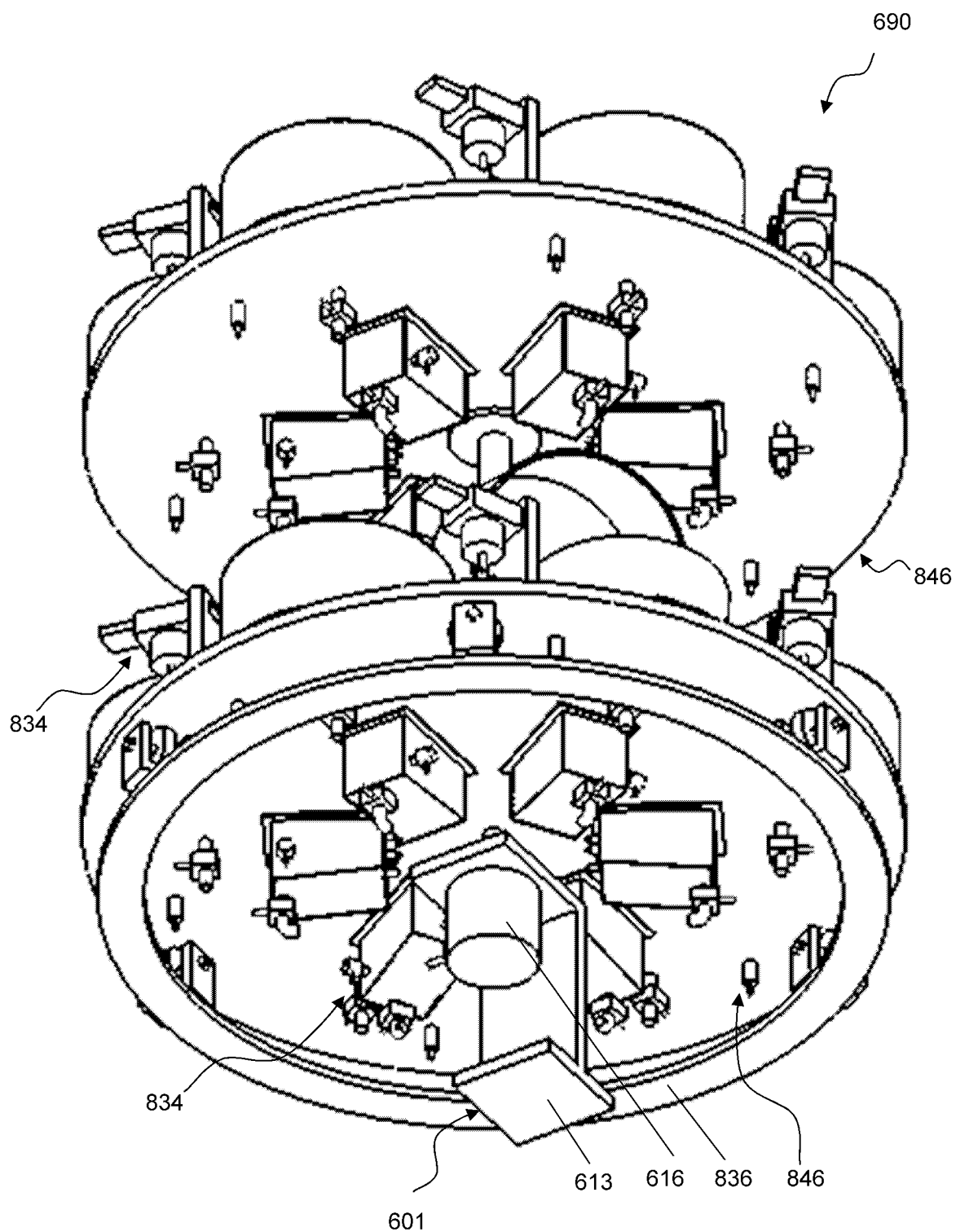
Figure 29D:
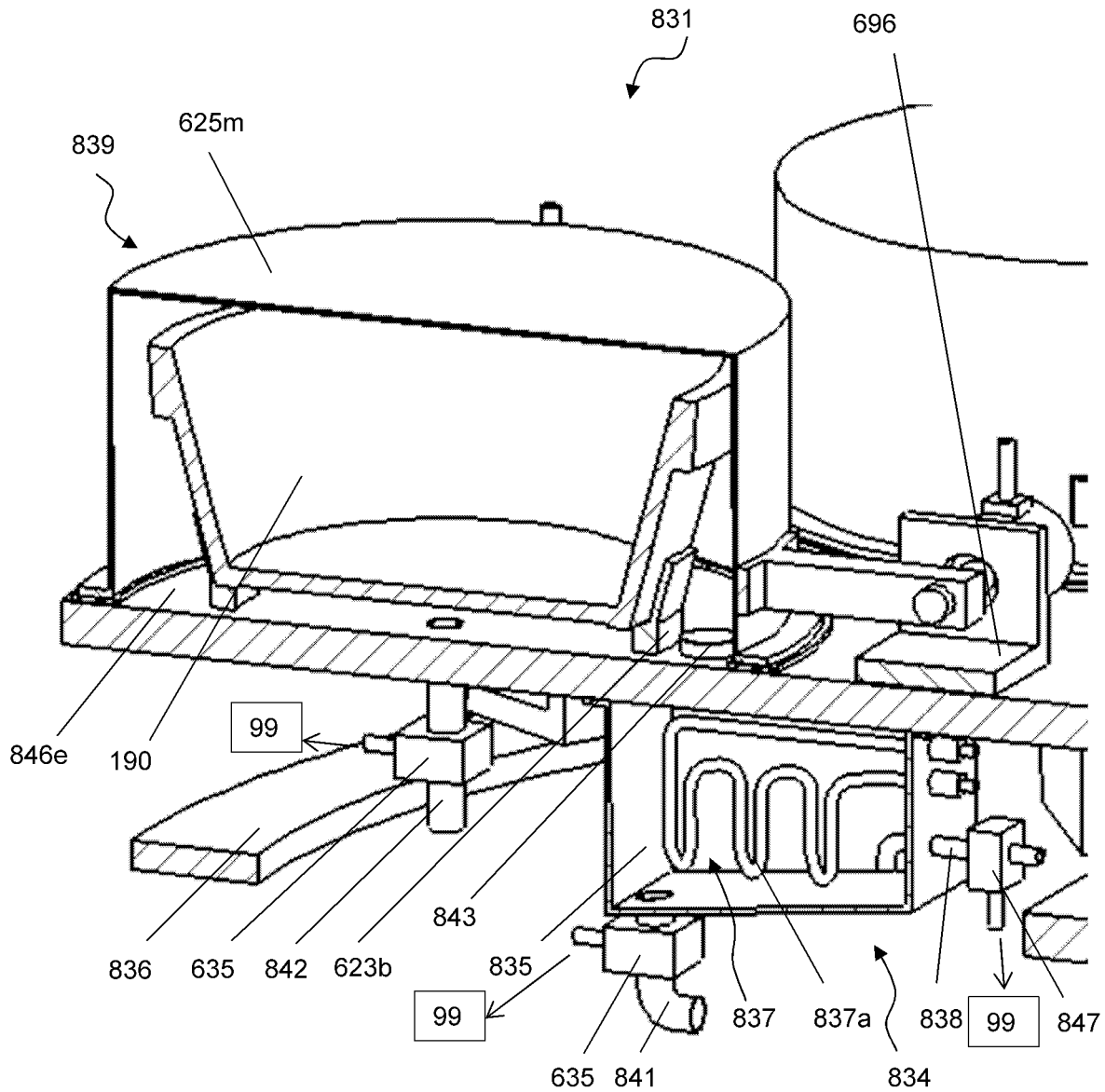
FIG. 29D shows a cutting view of parts of the cooking apparatus.

Referring to FIGS. 29B-29D, a cooking apparatus 690 comprises: a plurality of rotatable components 846 which are respectively positioned at different levels (the figures show two rotatable components 846 but there can be more in some applications), wherein said rotatable components 846 are fixedly or rigidly connected to each other; and a rotational motion mechanism 601 (as in FIG. 17A). Each of the rotatable components 846 comprises a rigid component 846r and a plurality of first enclosure components 846e which are fixedly connected to the rigid component 846r. Each first enclosure component 846e comprises heat insulating material. The rotatable components 846 are directly or indirectly fixedly connected to the shaft 611 of the rotational motion mechanism 601, so that the rotational motion mechanism 601 may produce an intermittent rotation of the rotatable components 846 around the axis of the shaft 611 wherein the axis of the shaft 611 is vertical. The rotatable component 846 may comprise a turntable but this is not a requirement.

A plurality of wheels 634 are mounted on a plurality of support components 632 which are rigidly or fixedly connected to the support component 836; and the support component 836 is optionally rigidly or fixedly connected to the floor of a building or the ground (the connection is not shown in figures but is easy to construct). The wheels 634 are used to touch and provide support to the lowest one of the rotatable components 846.

Corresponding to each first enclosure component 846e of the rotatable component 846, an enclosure mechanism 839 (as in FIG. 29A) is mounted on the rigid component 846r of the rotatable component 846, and a sealing ring 622 is fixedly connected to the first enclosure component 846e. When the cap 625m of the enclosure mechanism 839 is rotated to the first end-position (the lower position), the cap 625m touches on the corresponding sealing ring 622. The cap 625m, the first enclosure component 846e of the rotatable component 846, and the sealing ring 622 are configured to enclose a cooking chamber. When the cap 625m is rotated to the second end-position, the cooking chamber is opened. The enclosure mechanisms 839 and sealing rings 622 which are mounted on a same rotatable component 846 may optionally be cyclically and symmetrically positioned around the axis of the shaft 611. The cap 625m in the enclosure mechanism 839 may be referred to as a second enclosure component.

A plurality of container holders 623b are fixedly connected to the rotatable components 846. Each container holder is positioned inside an above-described cooking chamber (when the corresponding cap 625m is at the first end-position); wherein the container holder 623b is configured to position or hold a cooking container 190 such that the movement of said cooking container 190 relative to the rotatable component 846 may be restricted or limited when the rotatable component is moved Next to each container holder 623b, a pressure and temperature sensor 734 is mounted on the rotatable component 846. The sensor 734 can detect the air pressure and temperature in the cooking chamber. The sensor 734 is connected to the computer system 99 of FIG. 1 by wired or wireless means and the computer system 99 can receive the information from the sensor 734.

Below each enclosure component 846e (and the corresponding cooking chamber), a corresponding steam generator 834 is fixedly connected to the rotatable component 846, wherein the steam generator 834 comprises: a liquid container 835 configured to contain water; a heating device 837 comprising a tube 837a configured to heat the water in the liquid container. Some resistance coils are embedded inside the tube 837a wherein the resistance coils are connected to an electricity source by wires. The computer system 99 is configured to control the heating device 837. A water pipe 838 connects the liquid container 835 to a water source, and water may flow from the water source to the liquid container 835 through the water pipe 838, and the water flow is controlled by a valve 847. A water pipe 841 connects the liquid container 835 to a sewage or a wastewater tank, so that the wastewater in the liquid container 835 may flow to a sewage or a wastewater tank; wherein the wastewater flow may be stopped or opened by a valve 635. Water contained in the liquid container 835 can be heated by the heating device 837 to produce steam, resulting in higher temperature, high moisture level, and higher pressure inside the liquid container 835. The space between the top edge of the liquid container 835 and the cap 625m and/or the rotatable component 846 is sealed in such a way that the air cannot escape from the inside of the liquid container 835 to the outside.

A passage 843 connects the inside of the liquid container 835 to the corresponding cooking chamber above the steam generator 834 (see FIG. 29D). The steam produced by the steam generator 834 can freely flow into the cooking chamber through the passage 843 in order to heat the food or food ingredients in the cooking container 190 which is positioned in the cooking chamber; and a steamed food may be produced from the food or food ingredients. The air flow from the cooking chamber to the outside is sealed except through the passage 843.

A locking mechanism 831 (as in FIG. 17B) is used to lock the rotation of each cap 625m when the cap is moved to the first end-position (to enclose the corresponding cooking chamber). The support component 833 of the locking mechanism 831 is rigidly or fixedly connected to the rotatable component 846. As shown in FIG. 29B, when the cap 625m of an enclosure mechanism 839 is rotated to the first end-position, the moving member 832b of the corresponding locking mechanism 831 may be moved to the first end-position to touch and press on the edge 625x of the cap 625m. That way, the cap is firmly pressed onto the sealing ring 622; and the steam in the cooking chamber may not leak from underneath the cap 625m. If the moving member 832b is moved to the second end-position, the cap 625m can be rotated to open up the cooking chamber.

It should be noted that in the cooking apparatus 690, any of the locking mechanisms 831 may be substituted by an electromagnetic lock, or another type of lock.

Figure 30:
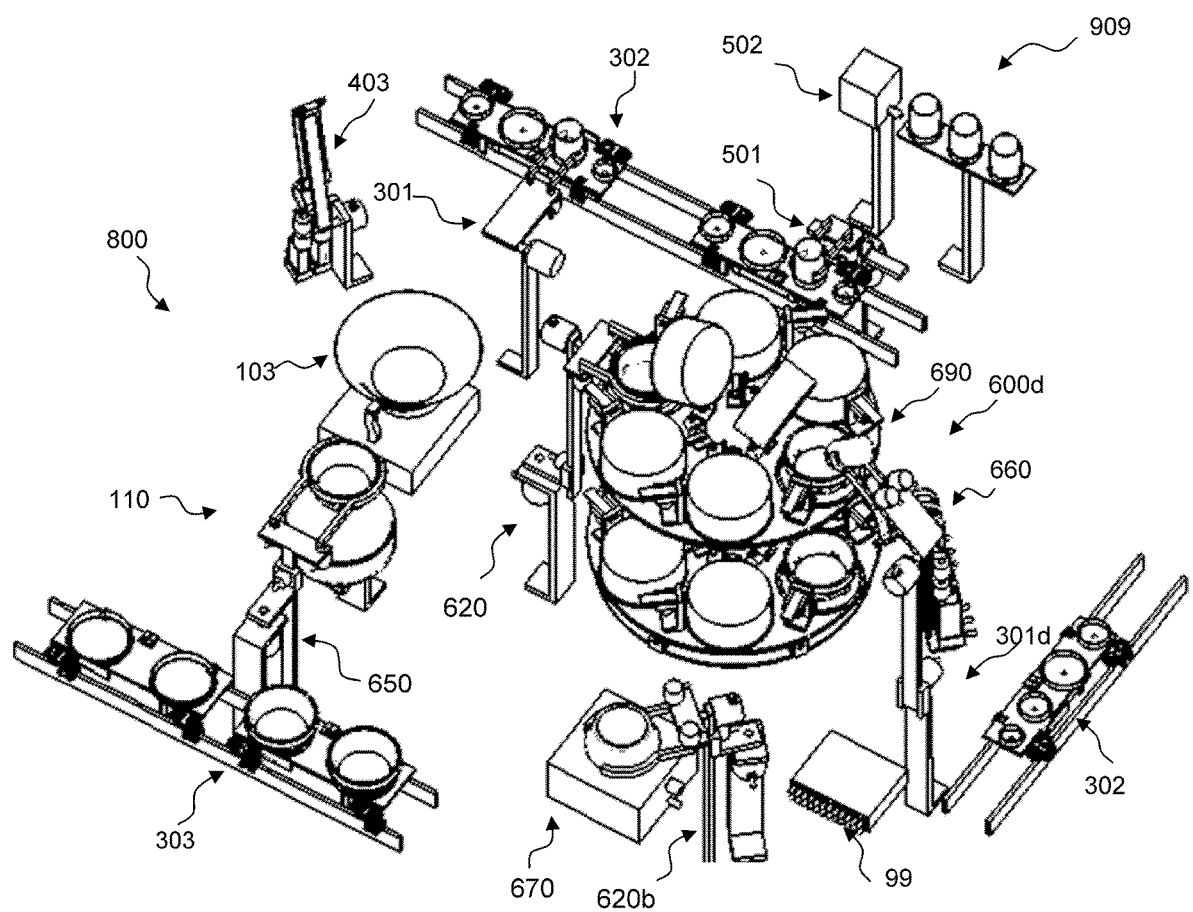
FIG. 30 shows an aerial view of a cooking system.

In some embodiments, referring to FIG. 30, a cooking system 909 is similarly configured as the cooking system 906. The cooking system 909 comprises: a cooking sub-system 800 (as in FIG. 19); a cooking apparatus 600d (explained below); a container moving apparatus 620b (as in FIG. 14); a food container cleaning mechanism 670 (as described above); and a computer system 99 (as in FIG. 1). The cooking apparatus 600d comprises: a food dispensing apparatus 620 (as in FIG. 14); a cooking apparatus 690 (as in FIG. 29C-29D); a liquid dispensing apparatus 660 (as in FIG. 15); and an ingredient dispensing apparatus 301d (as in FIG. 6D). In the cooking apparatus 600d, the ingredient dispensing apparatus 301d is positioned next to the cooking apparatus 690. The ingredient dispensing apparatus 301d can grip and move an ingredient container from a vehicle 790 of the transport system 302 of the cooking sub-system 800 to dispense food or food ingredients from said ingredient container into one of the cooking containers 190 of the cooking apparatus 690. The food dispensing apparatus 620 is positioned between the cooking apparatus 103 and the cooking apparatus 690. The food dispensing apparatus 620 can move a cooking container 190 positioned or otherwise held by a container holder 623b (of the cooking apparatus 690) to dispense semi-cooked food from the cooking container 190 into the cookware 11 of the cooking apparatus 103. The liquid dispensing apparatus 660 is positioned next to the cooking apparatus 690 to dispense liquid ingredients into a cooking container 190 of the cooking apparatus 690. The container moving apparatus 620b is positioned next to the cooking apparatus 690. The container moving apparatus 620b can grip and move a cooking container 190 from the cooking apparatus 690 and turn the container 190 to a certain cleaning position so that the cooking container 190 can get cleaned by the food container cleaning mechanism 670. Then, the cleaned cooking container 190 can be moved back to the rotatable component 846 of the cooking apparatus 690. The computer system 99 is connected to the electric or electronic components of the apparatuses or mechanisms in the cooking system 909 so that the computer system 99 may communicate with and/or control said components by known techniques.

In the cooking system 909, when the rotatable components 846 of the cooking apparatus 600d is rotated by the rotational motion mechanism 601 to a certain position, one or more of the following processes may be completed: (1) a rotational motion mechanism 649a rotates the corresponding cap 625m to the second end-position so that the ingredient dispensing apparatus 301d may dispense food or food ingredients into a cooking container 190 which is positioned at, or held by, the container holder 623b corresponding to said rotational motion mechanism 649a; (2) said rotational motion mechanism 649a rotates said cap 625m to the first end-position so that the food or food ingredients in said cooking container 190 can be heated; (3) the rotatable component 846 is rotated to a certain position, and said rotational motion mechanism 649a rotates said cap 625m to the second end-position so that the food dispensing apparatus 620 can dispense a semi-cooked food from said cooking container 190 to the cookware 11 of the cooking apparatus 103; and then the food dispensing apparatus moves said cooking container 190 to said container holder on the rotatable component 846; (4) the rotatable component 846 is rotated to a position so that the container moving apparatus 620b can grip and move said cooking container 190 to the food container cleaning mechanism 670 to get cleaned and then returned to said container holder on the rotatable component 846.

The cooking system 909 may cook a food by applying the same steps as the cooking sub-system 800 except that a semi-cooked food produced by the cooking apparatus 600d can be dispensed into the cookware 11 wherein the semi-cooked food may be used as an ingredient for the cooking apparatus 103.

Figure 31A:
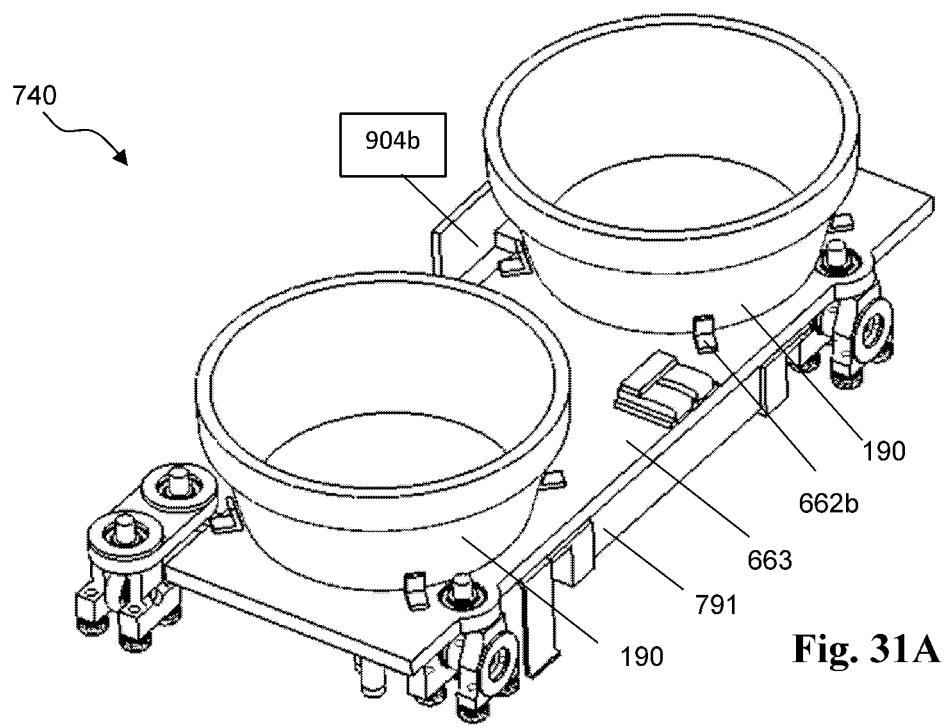
FIG. 31A shows an aerial view of a vehicle.

Referring to FIG. 31A, a vehicle 740 is the same as the vehicle 640 (as in FIG. 16A) except that the container holders 662 are substituted by container holders 662b. The other part numbers in the vehicle 740 are the same as the corresponding part numbers in the vehicle 640. The container holders 662b are configured to position or hold a cooking container 190 so that the movement of said cooking container 190 may be restricted or limited when the vehicle is moving. The computer 904b of the vehicle 740 may control the operations of the electrical or electronic devices of the vehicle 740 by sending signals to the electrical or electronic device. The computer 904b may communicate with the computer system 99 of FIG. 1 via a wireless communication device.

Figure 31B:
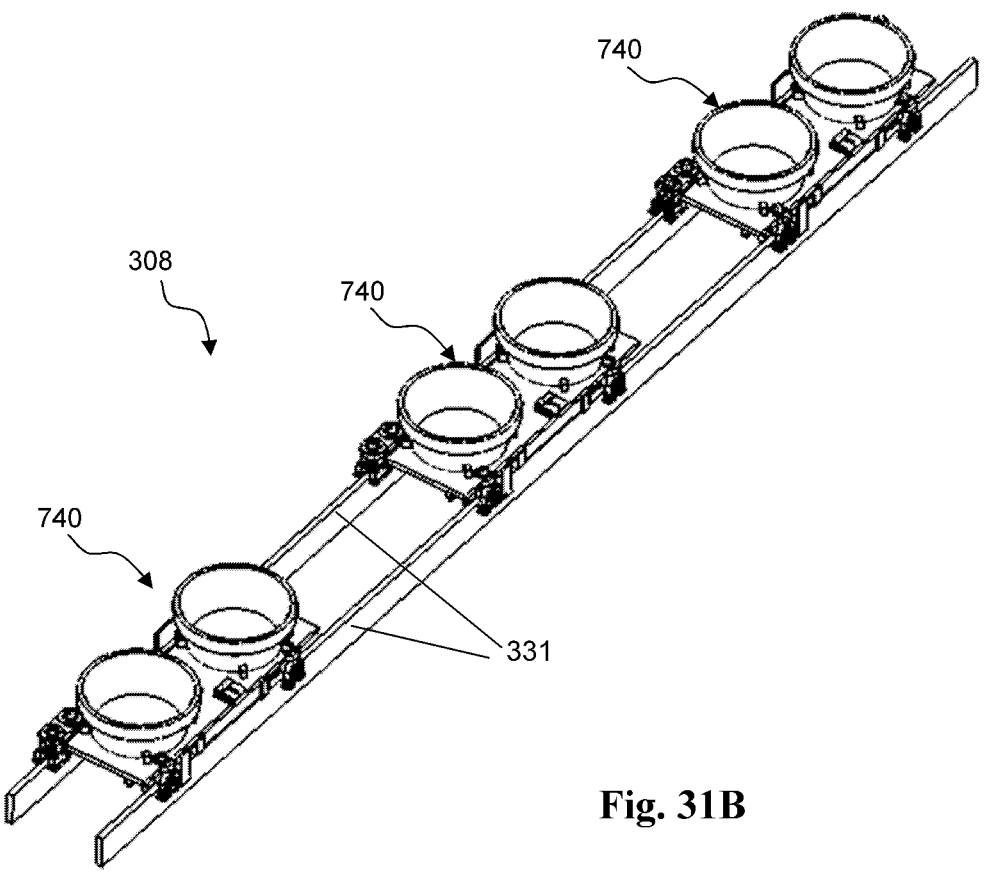
FIG. 31B shows an aerial view of a transport system comprising the vehicle of the FIG. 31A.

Referring to FIG. 31B, a transport system 308 further comprises a plurality of vehicles 740 and mini-rails 331. The vehicles 740 and the cooking containers 190 held by the container holders 662 on the vehicles 740 may move along the mini-rails 331. The transport system 308 can transfer cooking containers 190. The computer 904*b* is connected to the computer system 99 of FIG. 1 via wireless means, so that the computer system 99 may control the timing and speed of the vehicles 740.

It should be noted that the vehicles 740 may comprise additional components for the purpose of staying on the track.

Figure 32:
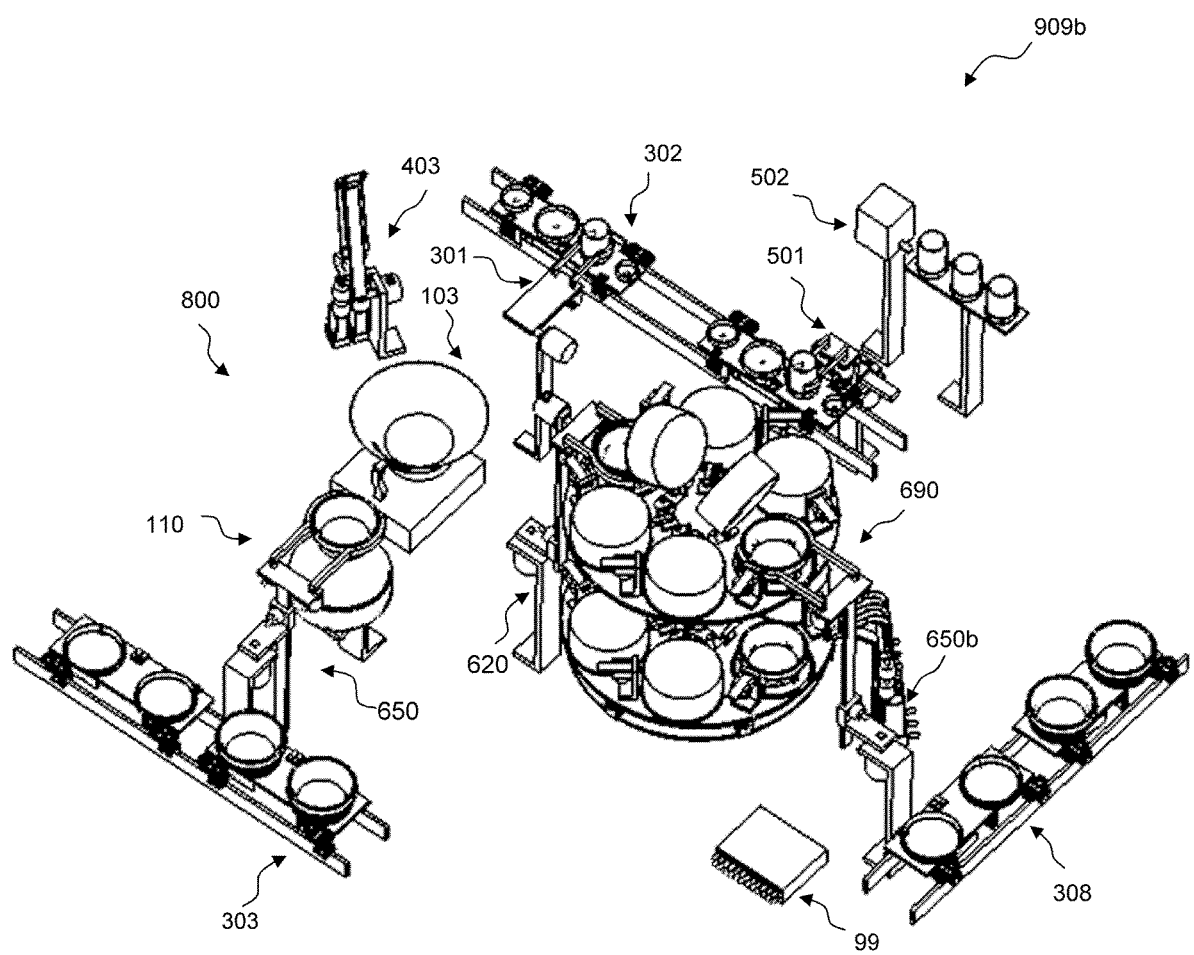
FIG. 32 shows an aerial view of a cooking system comprising the transport system of FIG. 31B.

In some embodiments, referring to FIG. 32, a cooking system 909*b* is similarly configured as the cooking system 909. The cooking system 909*b* comprises: a cooking sub-system 800 (as in FIG. 19); a cooking apparatus 690 (as in FIGS. 29C-29D); a transport system 308 (as in FIG. 31B); a transfer apparatus 650*b* (as described below); and a computer system 99 (as in FIG. 1). The transfer apparatus 650*b* is an identical copy of the transfer apparatus 650 (as in FIG. 5) but is positioned between the cooking apparatus 690 and the transport system 308. The transfer apparatus 650*b* can grip a cooking container 190 (which contains or holds food or food ingredients) from a vehicle 740 of the transport system 308 and move it to a container holder 623*b* of the cooking apparatus 690. The food dispensing apparatus 620 is positioned between the cooking apparatus 103 and the cooking apparatus 690. The food dispensing apparatus 620 can grip and move a cooking container 190 on one of the container holders 623*b* of the cooking apparatus 690 to dispense semi-cooked food from the cooking container 190 into the cookware 11 of the cooking apparatus 103. The computer system 99 is connected to the electric or electronic components of the apparatuses or mechanisms in the cooking system 909 so that the computer system 99 may communicate with and/or control said components by known techniques.

In the cooking system 909*b*, when the rotatable components 846 of the cooking apparatus 690 are rotated by the rotational motion mechanism 601 to a certain position, one or more of the following processes may be completed: (1) a rotational motion mechanism 649*a* rotates the corresponding cap 625*m* to the second end-position so that the transfer apparatus 650*b* can grip and move a cooking container 190 contained food or food ingredients from a vehicle 740 of the transport system 308 to the corresponding container holder 623*b* of the cooking apparatus 690; (2) said rotational motion mechanism 649*a* rotates said cap 625*m* to the first end-position so the food or food ingredients in said cooking container 190 can be heated; (3) the rotatable component 846 is rotated to a position and said rotational motion mechanism 649*a* rotates the cap 625*m* to the second end-position, so that the food dispensing apparatus 620 can dispense a semi-cooked food from said cooking container 190 to the cookware 11 of the cooking apparatus 103; and then the food dispensing apparatus moves said cooking container 190 to said container holder on the rotatable component 846; (4) the rotatable component 846 is rotated to a position so that the transfer apparatus 650*b* can grip and move said cooking container 190 to a container holder of a vehicle 740.

The cooking system 909*b* may cook a food by applying the same steps as the cooking sub-system 800 except that a semi-cooked food produced by the cooking apparatus 690 can be dispensed into the cookware 11 wherein the semi-cooked food may be used as an ingredient for the cooking apparatus 103.

It should be noted that the transport system 302, 303 and 308 in the above cooking systems may comprise a single system or a plurality of disconnected sub-systems. The transport system may comprise different types of vehicles. The ingredient containers may be configured differently for different types or quantities of ingredients. It should be noted that the transport system 302, 303 and 308 may be combined into one transfer system.

It should be noted that the transport system 302, 303 and 308 may be substituted by other transport system to move ingredient containers; e.g., a transport system comprising a cyclic motion mechanism, a turntable, a chain fixed to chair wheels, a robot arm, or a conveyor mechanism, etc.

The transport system may be substituted by any transport system disclosed in U.S. patent application Ser. Nos. 16/517,705 and 16/997,933. The entire contents of the applications are incorporated herein by reference.

The cooking apparatus 600, 600*b*, 600*c*, 600*d*, or 690 may be referred to as a first cooking apparatus. The cooking apparatus 110 may be referred to as a second cooking apparatus.

The cooking apparatus 610, 610*b*, 610*c*, 680, or 690 may also be referred to as a first cooking apparatus.

The food dispensing apparatus 620 may be referred to as a first food dispensing apparatus.

For the purpose of the present application, a locking mechanism can be any lock or brake that is configured to stop a lid (or other object) from moving when the lid is arrived at a certain working position. It should be noted that the locking mechanisms 831 can function as locks. The locking mechanisms 831 may be substituted by other types of locks or brakes.

In the cooking systems, the ingredient dispensing apparatuses 301 and 301*b* may be configured differently. The container holders 785*a* of the transport system 302 which are next to different ingredient dispensing apparatuses may be configured to have different sizes. The ingredient containers 81 on different holders may be configured to have different sizes. The transport system 302 may comprise two or more sub-systems which are not connected with each other, and the vehicles may be configured differently on different sub-systems.

The ingredient dispensing apparatuses 301 and 301*b* may be combined into one. The ingredient dispensing apparatuses may be substituted by mechanisms each comprising a robot arm.

It should be noted that the ingredient dispensing apparatuses 301 and 301*b*, the food dispensing apparatus 620, and the container moving apparatus 620*b* may be substituted by other type of dispensing apparatus, such as the robotic apparatus 222 (of FIG. 4F), which is a combination of robot arm and robot fingers. Similarly, the motion mechanism 104 of the cooking apparatus 103 may be substituted by the robot arm 218 (of FIG. 2E) where the moving member 217*b* is fixedly connected to the cookware 11. The transfer apparatus 650 may be substituted by the robotic apparatus 222.

It should be noted that the drawings in the present patent application are schematic and may not be well scaled. The distances between various mechanisms and apparatuses may not be drawn in good scale. The 3-dimensional positioning of various mechanisms and apparatuses in a cooking system may be done in various other ways.

A motor may be an AC or DC motor, stepper motor, servo motor, inverter motor, pneumatic or hydraulic motor, etc. A motor may optionally further comprise a speed reducer, encoder, and/or proximity sensor, A motor is said to drive a rotation of a shaft, if the rotation produced by the motor can induce the rotation of the shaft directly or indirectly via connection of shafts (e.g., by coupling), via mechanical transmission, and/or via other means.

As explained previously, the cap 625 (of an enclosure mechanism 647) at the first end-position and some other components are configured to enclose a cooking chamber in some of the cooking apparatuses. We may alternatively say that the cap 625 at the first end-position is configured to help enclose the cooking chamber.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A rigid component described in the present patent application can be any type of solid component which has some degree of rigidity in an application, and there is no strict or quantitative requirement for the degree of rigidity. It should be noted that there is no perfect rigid component in our world, as there are always elastic, thermal, and other deformations in any physical subject. A rigid component may comprise one or more of the following: a bar, a tube, a beam, a plate, a board, a frame, a structure, a bearing housing, a shaft. A rigid component can be made by metal such as steel or aluminum, or a mixture of metals, an alloy, a reasonably rigid plastic, some wood, or by other materials, or by a combination of different types of materials.

Similarly, a rigid connection of two or more components can be a connection which has some degree of rigidity in an application, and there is no strict quantitative requirement for the degree of rigidity. A rigid connection may be a welding of two or more metal components. A rigid connection may be a bolting of two or more components; and so on. Clearly, a typical connection of a shaft and a bearing housing by a bearing (and accessories), for example, is not a rigid connection, since the shaft can rotate relative to the bearing housing.

Most common bearings are ball bearings and roller bearings. However, a bearing in the present patent application can be of any type.

A support component described in the present patent application can be any type of rigid component. A support component may be moved or fixed relative to the floor of the building or the ground.

Only a few examples and implementations are described. Other implementations, variations, modifications and enhancements to the described examples and implementations may be made without deviating from the spirit of the present invention. For example, the term cookware is used to generally refer to a device for containing or holding food or food ingredients during cooking. For the purpose of present patent application, a cookware can be a wok, a pot, a pan, a basket, a bowl, a dish, a container, a board, a rack, a net, a mesh, or any object used to contain or otherwise hold food or food ingredients during a cooking process. The cooking also is not limited to any particular ethnic styles. The cooking may include but is not limited to: frying (including stir frying), steaming, boiling, roasting, baking, smoking, microwaving etc. The cooking apparatus may or may not use a heater.

Similarly, a food container, ingredient container, or container, can be a bowl, a plate, a cup, a jar, a bottle, a flat board, a basket, a net, a wok, a pan, or any object used to contain or otherwise hold a food or food ingredients. A container can have a rather arbitrary geometric shape. It is possible that different ingredient containers may have different shapes. It is possible that different food containers may have different shapes. It is possible that different cooking containers may have different shapes. It is possible that different cookware may have different shapes.

An enclosure component is meant to be a solid. A plurality of solids may be shaped to enclose a space; and in this case the solids may be referred to as enclosure components. A container and a lid can be examples of enclosure components as the lid and the container may enclose a space, often referred to as the interior of the container. The lid may optionally have the shape of a cap, but this is not a requirement in any sense. The caps described above may be substituted by other shapes. A flat board and a cap may enclose a space, often referred to as the interior of the cap. Two caps with similarly shaped edges (wherein the caps are positioned against each other along the edges) may also enclose a space. The walls, the floor, the ceiling, the windows, and the doors of a typical room (in a building) are also enclosing components which may together enclose a space, often referred to as the inside of the room.

A gripper is a device used to touch and grip an object such as a container. A gripper can be a rigid or elastic object as in FIGS. 4A-4E. In this patent application, a gripper may be pneumatic gripper, which is an actuating device that uses compressed air as power to pinch or grip an object. A gripper may be a vacuum chuck.

A gripping mechanism can be any mechanism that can be used to grip an object. A gripping mechanism may optionally comprise a gripper such as a vacuum chuck. A gripping mechanism may optionally comprise a plurality of rigid or elastic grippers which are moved to grip an object. A gripping mechanism may optionally comprise a robot hand. In fact, a robot hand may be used as a gripping mechanism for our purposes.

A motion mechanism can be any mechanism that can be used to produce a movement of an object, which may be a component of the motion mechanism or an object that is rigidly or fixedly connected to a component of the motion mechanism. A motion mechanism may produce a linear motion of a component. A motion mechanism may produce a rotation of a component. A motion mechanism may comprise a robot arm. A motion mechanism may be a combination motion mechanism comprising a plurality of motion sub-mechanisms. A motion mechanism may comprise: a crank rod mechanism; eccentric motion mechanism; etc. A motion mechanism may comprise one or more of the following parts: motor; encoder; shaft; coupling; bearing housing; bearings and accessories; gear and rack; screw rod and screw nut; cylinder; hydraulic cylinder; electromagnet; cam; eccentric shaft; Geneva mechanism, etc. Motion mechanisms can be more complex, and the motions produced by a motion mechanism can be a planar motion, a spherical motion, an oscillatory or vibratory motion; see e.g., U.S. patent application Ser. Nos. 16/997,196, 15/706, 136 (in this application a motion mechanism may be referred to as a transport mechanism), Ser. Nos. 15/801,923, and 15/798,357. The entire contents of the above applications are hereby incorporated herein by reference.

It should be noted that the linear motion produced by the linear motion mechanism may be a linear motion between two end-positions or a linear motion with multiple stop positions. Any robot arm may be used as a motion mechanism for our purposes.

The rotational motion mechanism 601 in the above described cooking systems may be substituted by other type of intermittent motion mechanism, such as, an intermittent linear motion mechanism which can produce a linear motion from one position to another among a plurality of positions, an intermittent motion mechanism comprising a plurality of moving members (such as mini vehicles) which can move on a linear or curved track from position to position among a plurality of positions (e.g., stations) wherein each moving member carries a container holder 623 or 623b, etc.

A transfer apparatus can be any apparatus that can be used to transfer an object (such as a container) from one position to another. A transfer apparatus may comprise: a gripping mechanism comprising a support component and one or more grippers; and a combination motion mechanism which is a combination of a plurality of motion sub-mechanisms, said combination motion mechanism being configured to move the support component of the gripping mechanism. A transfer apparatus may comprise a robot arm and a gripping mechanism. A robotic apparatus comprising a combination of a robot arm and a robot hand may be used as a transfer apparatus for our purposes.

An ingredient dispensing apparatus can be any apparatus that can be used to dispense food or food ingredients from an ingredient container into a cookware. A typical dispensing apparatus of food or food ingredients may comprise: a gripping mechanism configured to grip an ingredient container, and a motion mechanism configured to move a (support) component of gripping mechanism. There are more examples in U.S. Pat. No. 10,455,987 and U.S. patent application Ser. No. 15/798,357. In particular, a robotic apparatus comprising a robot hand and robot arm may be used as an ingredient dispensing apparatus. This is often used in prior art.

A food dispensing apparatus can be any apparatus that can be used to dispense a cooked (or semi-cooked) food from a cookware into another container. A food dispensing apparatus may comprise a motion mechanism which moves the cookware. A food dispensing apparatus may alternatively comprise a robotic apparatus comprising a robot arm and a robot hand that moves the cookware, and this is often the case when the cookware is not fixedly attached to another (relatively heavy) mechanism.

There is a difference between transfer apparatus and ingredient (or food) dispensing apparatus, as follows. A dispensing apparatus needs to turn (or rotate) a gripped container upside down or by some angle of say, 90 to 180 degrees, to dispense the food or food ingredients contained in the container to another container. In comparison, a transfer apparatus does not need to turn (or rotate) a gripped container, since the food or food ingredients are not to be dispensed from the container. Indeed, it is advantageous (though not always a strict requirement) for the transfer apparatus to keep the gripped container in some upright or nearly upright position, to not let the food or food ingredients drop out. Even if the container is sealed by a lid, there is no need for the food or food ingredients to touch the lid.

Each vertical motion mechanism as described above may be substituted by a motion mechanism which can produce a linear or non-linear motion in an upward or downward direction, where an upward direction needs not to be exactly vertical. It can have an inclination angle between 0 and 90 degrees. Same applies to each horizontal motion mechanism described above.

A liquid dispensing apparatus can be any apparatus that can be used to dispense a liquid ingredient from a container into a cookware. A liquid dispensing apparatus may comprise liquid pipes, a liquid pump, a valve, and/or flow sensors, etc. There are more examples in U.S. Pat. No. 10,455,987.

A cooking apparatus can be any apparatus comprising a cookware. A cooking apparatus may optionally further comprise a motion mechanism configured to move the cookware. The motion mechanism may optionally comprise a motion sub-mechanism configured to move the cookware to stir food or food ingredients in the cookware. The motion mechanism may optionally comprise a motion sub-mechanism configured to move the cookware to dispense a cooked (or semi-cooked) food from the cookware. A cooking apparatus may optionally comprise a transfer apparatus configured to move the cookware. Said transfer apparatus may optionally grip and turn the cookware as to dispense a cooked (or semi-cooked) food from the cookware. Examples of cooking apparatuses are given in U.S. Pat. No. 10,455,987 and U.S. patent application Ser. Nos. 16/997,196, 15/706,136, 16/155,895, 15/801,923, and 15/869,805, the entire disclosures of which are hereby incorporated herein by reference.

A cleaning apparatus can be any apparatus that can be used to clean an object, e.g., a funnel, or a container such as cookware, food container, or ingredient container. A cleaning apparatus comprises a liquid source (e.g., tap water, or a water tank) and a liquid pipe for the liquid to flow from the source to the object; wherein the liquid flow may be controlled by a valve, a liquid pump, and/or by other known techniques; wherein the liquid may be referred to as a cleaning liquid, such as hot water, for the purpose of cleaning the object. In some applications, the liquid may be sprayed on the object at high speed, but this is not a requirement. A cleaning apparatus may optionally further comprise a stirrer which is rotated to stir the cleaning liquid in the object, e.g., a container, which is cleaned by the cleaning apparatus. A cleaning apparatus may optionally comprise a motion mechanism configured to move the water pipes and stirrers away from or towards the object, which is cleaned or to be cleaned by the cleaning apparatus.

A transport system can be any system that can be used to transfer a container (such as an ingredient container, a food container, a cookware, or a cooking container). In some applications (but not always), a transport system can move a container after said container is placed on a member of the transport system. For example, a transport system may include a plurality of vehicles each configured to carry and transport a container; wherein the vehicles may optionally move on rail tracks. A transport system may optionally comprise a rotating turntable, or a cyclic motion mechanism, a chain, and/or a belt. Examples of transport system are given in U.S. Pat. No. 10,455,987 and U.S. patent application Ser. Nos. 15/798,357, 16/997,933, and 16/155,895, the entire disclosures of which are hereby incorporated herein by reference. A transport system may only comprise a transfer apparatus.

A container holder is a solid which has an adequate shape to position or hold a container of a certain shape.

A "container holder configured to position or hold a container" may be any solid which has the shape to (steadily) position the container or to (steadily) hold the container. For example, if the container is a bowl, then a table, a horizontally placed net, or a ring of a matching shape, a platform, a device consisting of two properly placed parallel sticks, can be a container holder configured to position or hold the bowl. In other applications, a "container holder configured to position or hold a container" may be a device or mechanism that can be moved to position or hold the container. Thus, a gripping mechanism which can grip the container may also be considered a container holder configured to hold the container.

A container transfer apparatus can be any transfer apparatus used to move a container to a (different) member of a transport system. The container transfer apparatus can optionally be a part of said transport system.

A heater for the purpose of cooking in the known technique may substitute any stove and heater disclosed in the present application. A heater can be a stove, a burner, a steam generator, a microwave, an inductive stove, a lightwave heater.

In our patent application, a computer system may or may not comprise a network. A computer system may be a single computer in some simpler applications.

A loading apparatus can be any transfer apparatus used to move a container to a (different) member of a transport system. The loading apparatus can optionally be a part of said transport system.

Control by a computer or computer system of a motor, an actuator, a heater, or electrical or electronic devices are by known techniques.

It should be noted that a cooking system may comprise several different motion mechanisms. For the purpose of our patent application, if a first apparatus (or equipment) is different from a second apparatus (or equipment), then a motion mechanism of the first apparatus is implicitly different from a motion mechanism of the second apparatus. For example, we may say that "a second cooking apparatus comprises a motion mechanism and a first cooking apparatus comprises a motion mechanism." Such words should be compared with: "a first vehicle (e.g., a truck) comprises a motor and a second vehicle (e.g., a car) comprises a motor." Implicitly, the motor of the second vehicle is a different motor than the motor of the first vehicle; and the two motors may or may not have the same configuration. Thus, in plain meanings, the motion mechanism of the first cooking apparatus is a different motion mechanism than the motion mechanism of the second cooking apparatus. Different motion mechanisms may or may not have the same design and configuration. The same comment applies to various gripping mechanisms, various support components, various motors, and/or various grippers, etc.

Implicitly, the motion mechanism of an enclosure mechanism is different from the intermittent motion mechanism 601 used to move the rotatable component and the container holders as described above.

Generally speaking, components belonging to different equipment are implicitly not the same mechanism, even if they have the same design and configuration and/or they are referred to by the same words (e.g., gripping mechanism).

What is claimed is:

1. A cooking system comprising:
a first cooking apparatus comprising:
a plurality of container holders each configured to position or hold a cooking container wherein the cooking container is used to contain or hold one or more foods or food ingredients, wherein the plurality of container holders are rigidly or fixedly connected to each other;
a first motion mechanism configured to move the plurality of container holders, said first motion mechanism comprising a motor; and
corresponding to each said container holder, an enclosure mechanism comprising:
a lid or enclosure member; and
a second motion mechanism configured to move the lid or enclosure member between a first end-position and a second end-position, said second motion mechanism comprising a motor, an actuator, or other driving mechanism;
wherein the lid or enclosure member, if stopped at the first end-position, is configured to form part of the boundary of a cooking chamber such that the container holder is positioned inside the cooking chamber;
a second cooking apparatus comprising a cookware configured to contain or otherwise hold one or more foods or food ingredients; and
a food dispensing apparatus configured to move the cooking container positioned or held by one of the container holders of the first cooking apparatus to dispense the foods or food ingredients from the cooking container to the cookware of the second cooking apparatus, said food dispensing apparatus comprising:
a gripping mechanism comprising a support component and one or more grippers, said gripping mechanism being configured to grip the cooking container; and
a third motion mechanism configured to move the support component of the gripping mechanism, said third motion mechanism comprising a motor or other driving mechanism.

2. The cooking system of claim 1, wherein the second cooking apparatus comprises an ingredient dispensing apparatus configured to move an ingredient container to dispense one or more food ingredients into the cookware, wherein the ingredient container is used to contain or hold the food ingredients prior to the dispensing, said ingredient dispensing apparatus comprising:
a gripping mechanism comprising a support component and one or more grippers, said gripping mechanism being configured to grip the ingredient container; and
a fourth motion mechanism configured to move the support component of the gripping mechanism, said fourth motion mechanism comprising a motor or other driving mechanism.

3. The cooking system of claim 2, further comprising a transport system configured to move a container, wherein the container is used to contain or hold one or more foods or food ingredients, wherein the transport system comprises a vehicle, a rotating turntable, a cyclic motion mechanism comprising a motor, a chain, a belt, a robot, a rack, a rail track, or a transfer apparatus, wherein the transfer apparatus comprises one or more grippers, a robot finger, a robot arm, a robot hand, a motion mechanism comprising a motor, a gear and rack, the combination of a screw and a nut, or the combination of a chain and a sprocket.

4. The cooking system of claim 3, wherein the transport system comprises a vehicle.

5. The cooking system of claim 1, wherein the first cooking apparatus further comprises a steam generator configured to produce steam to heat the foods or food ingredients container or held by the cooking container which is positioned inside one of the cooking chambers.

6. The cooking system of claim 1, wherein the first cooking apparatus further comprises a plurality of heaters, one corresponding to each of the container holders; wherein each said heater is configured to heat the foods or food ingredients that are contained or held by the cooking container which is positioned or held by the corresponding container holder.

7. The cooking system of claim 1, wherein the first cooking apparatus further comprises an ingredient dispensing apparatus configured to move an ingredient container to dispense one or more food ingredients from the cooking container which is positioned or held by one of the container holders of the first cooking apparatus, wherein the ingredient container is used to contain or hold the food ingredients prior to the dispensing, said ingredient dispensing apparatus comprising:
  a gripping mechanism comprising a support component and one or more grippers, said gripping mechanism being configured to grip the ingredient container; and
  a fifth motion mechanism configured to move the support component of the gripping mechanism, said fifth motion mechanism comprising a motor or other driving mechanism.

8. The cooking system of claim 1, wherein said first cooking apparatus comprises a liquid dispensing apparatus configured to dispense a liquid to the cooking container which is positioned or held by one of the container holders, said liquid dispensing apparatus comprising a liquid pipe, a liquid container, and/or a pump.

9. The cooking system of claim 1, wherein the gripping mechanism of the food dispensing apparatus comprises one or more robot fingers and the third motion mechanism of the food dispensing apparatus comprises a robot arm.

10. The cooking system of claim 1, wherein said second cooking apparatus comprises a sixth motion mechanism configured to move said cookware to stir, mix or distribute foods or food ingredients held in said cookware, said sixth motion mechanism comprising a motor.

11. The cooking system of claim 1, further comprising a plurality of ingredient containers, wherein each of the plurality of ingredient containers is configured to contain or otherwise hold food or food ingredients; wherein the first cooking apparatus further comprises an ingredient dispensing apparatus configured to move one of said ingredient containers and to dispense food or food ingredients from the ingredient container to one of the cooking containers which is positioned at, or held by, one of the container holders of the first cooking apparatus, said ingredient dispensing apparatus comprising:
  a gripping mechanism comprising a support component and one or more grippers, said gripping mechanism being configured to grip the ingredient container; and
  a motion mechanism configured to move the support component of the gripping mechanism, said motion mechanism comprising a motor or other driving mechanism.

12. The cooking system of claim 1, wherein the second cooking apparatus comprises a seventh motion mechanism comprising a motor, said seventh motion mechanism being configured to move the cookware as to dispense a cooked food from the cookware to a food container, wherein the food container is used to contain or hold the cooked food.

13. A cooking system comprising:
  a first cooking apparatus comprising:
    a plurality of container holders each configured to position or hold a cooking container wherein the cooking container is used to contain or hold one or more foods or food ingredients; wherein the plurality of container holders are rigidly or fixedly connected to each other;
    a first motion mechanism configured to move the container holders, said first motion mechanism comprising a motor; and
  corresponding to each said container holder, an enclosure mechanism comprising:
    a lid or enclosure member; and
    a second motion mechanism configured to move the lid or enclosure member between a first end-position and a second end-position, said second motion mechanism comprising a motor, an actuator, or other driving mechanism;
    wherein the lid or enclosure member, if stopped at the first end-position, is configured to form part of the boundary of a cooking chamber such that the container holder is positioned inside the cooking chamber;
  a transfer apparatus configured to move the cooking container to and from one of the container holders of the first cooking apparatus, said transfer apparatus comprising:
    a gripping mechanism comprising a support component and one or more grippers, said gripping mechanism being configured to grip said cooking container; and
    a third motion mechanism configured to move the support component of the gripping mechanism, said third motion mechanism comprising a motor or other driving mechanism.

14. The cooking system of claim 13, wherein the plurality of container holders are configured to be positioned at two or more different heights.

15. The cooking system of claim 13, wherein the first cooking apparatus further comprises a steam generator configured to produce steam to heat the foods or food ingredients that are contained or held by the cooking container which is positioned inside said cooking chamber.

16. The cooking system of claim 13, wherein the first cooking apparatus further comprises a plurality of heaters, one corresponding to each container holder; wherein each said heater is configured to directly or indirectly heat the foods or food ingredients in the cooking container which is positioned or held by the corresponding container holder.

17. The cooking system of claim 13, wherein the motion produced by the first motion mechanism of the first cooking system is configured to be a rotation.

18. A cooking system comprising:
  a first cooking apparatus comprising:
    a plurality of container holders each configured to position or hold a cooking container wherein the cooking container is used to hold one or more foods or food ingredients, wherein the plurality of container holders are rigidly or fixedly connected to each other, wherein the container holders are positioned at two or more different heights;
    a first motion mechanism configured to move the container holders, said first motion mechanism comprising a motor;
  corresponding to each said container holder, an enclosure mechanism comprising:
    a lid or enclosure member; and
    a second motion mechanism configured to move the lid or enclosure member between a first end-position and a second end-position, said second motion mechanism comprising a motor, an actuator, or other driving mechanism; and
  an ingredient dispensing apparatus configured to move an ingredient container as to dispense one or more food ingredients to the cooking container which is positioned at or held by one of the plurality of container holders, said ingredient dispensing apparatus comprising:

a gripping mechanism comprising a support component and one or more grippers, said gripping mechanism being configured to grip the ingredient container; and a third motion mechanism configured to move the support component of the gripping mechanism, said third motion mechanism comprising a motor or other driving mechanism;

wherein the lid or enclosure member, if stopped at the first end-position, is configured to form part of the boundary of a cooking chamber such that the container holder is positioned inside the cooking chamber.

19. The cooking system of claim 18; wherein the first cooking apparatus further comprises a plurality of heaters, one corresponding to each of the container holders; wherein each said heater is configured to directly or indirectly heat the foods or food ingredients in the cooking container which is positioned or held by the corresponding container holder.

20. The cooking system of claim 18, wherein the motion produced by the first motion mechanism of the first cooking system is configured to be a rotation.

* * * * *